United States Patent [19]

Bechtel et al.

[11] Patent Number: 5,451,822

[45] Date of Patent: Sep. 19, 1995

[54] ELECTRONIC CONTROL SYSTEM

[75] Inventors: Jon H. Bechtel; David J. Schmidt, both of Holland, Mich.

[73] Assignee: Gentex Corporation, Zeeland, Mich.

[21] Appl. No.: 670,258

[22] Filed: Mar. 15, 1991

[51] Int. Cl.$^6$ .............................................. G02F 1/17
[52] U.S. Cl. ................................... 307/9.1; 315/82; 359/265; 359/267
[58] Field of Search ............... 359/265, 267, 275, 603, 359/608, 884; 250/214 Al, 208.4; 307/10.1, 10.7, 10.8; 318/DIG. 2; 315/82; 364/424.05; 340/785

[56] References Cited

U.S. PATENT DOCUMENTS

| | | | |
|---|---|---|---|
| 4,015,137 | 3/1977 | Kniesly et al. | 307/10.8 |
| 4,443,057 | 4/1984 | Bauer et al. | 359/265 |
| 4,508,875 | 4/1985 | Kishida et al. | 525/308 |
| 4,622,843 | 11/1986 | Hormel | 73/1 E |
| 4,793,690 | 12/1988 | Gahan et al. | 359/604 |
| 4,886,960 | 12/1989 | Molyneux et al. | 250/209 |
| 4,896,030 | 1/1990 | Miyaji | 250/206 |
| 4,902,108 | 2/1990 | Byker | 359/265 |
| 4,917,477 | 4/1990 | Bechtel et al. | 359/267 |
| 4,953,305 | 9/1990 | Vanlente et al. | 33/356 |
| 5,148,014 | 9/1992 | Lynam et al. | 250/214 AL |
| 5,220,317 | 6/1993 | Lynam et al. | 340/785 |

*Primary Examiner*—Steven L. Stephan
*Assistant Examiner*—Aditya Krishnan
*Attorney, Agent, or Firm*—Malcolm R. McKinnon

[57] ABSTRACT

An electronic control system for controlling automotive vehicle vision related equipment including an electrochromic rearview mirror comprising an electrochromic variable reflectance member the reflectivity of which varies as a function of electrical signal levels applied thereto, and an electrically energizable vehicle headlamp, the system including ambient light sensing means, glare causing light sensing means and sky light sensing means, each of said light sensing means being effective to generate an electrical signal indicative of the sensed light level, the system also including microprocessor means operable to apply electrical control signal levels to the electrochromic variable reflectance member to change the reflectivity thereof as a function of sensed ambient and glare causing light levels, the system also including means to effect energization of the vehicle headlamp as a function of the sensed sky light level. The system may also include means to effect energization of the vehicle headlamp as a function of the actuation of the vehicle windshield wiper.

17 Claims, 36 Drawing Sheets

SIMPLIFIED CIRCUIT

FIG. 1. SIMPLIFIED CIRCUIT

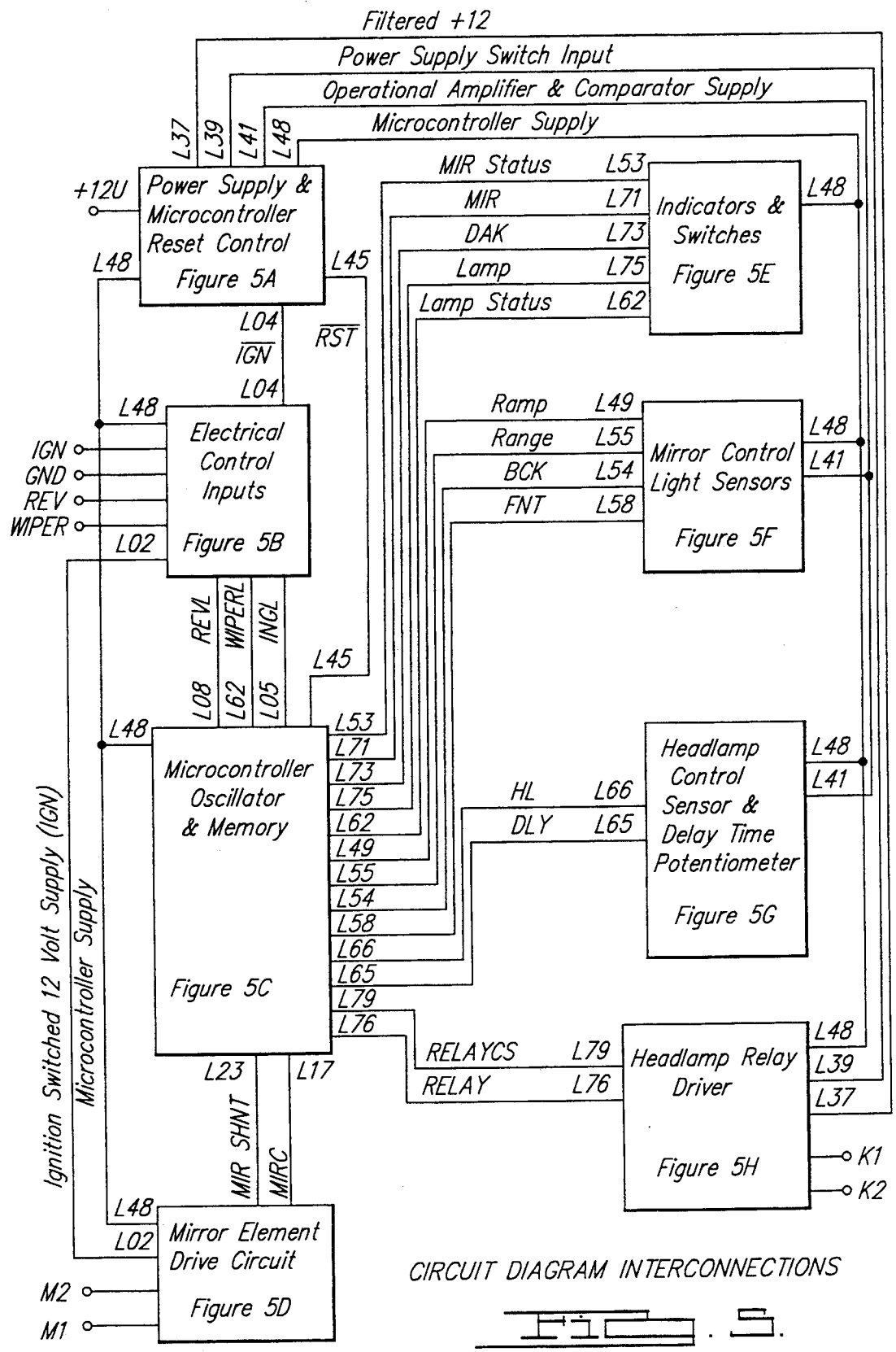
FIG. 5. CIRCUIT DIAGRAM INTERCONNECTIONS

POWER SUPPLY & MICROCONTROLLER RESET CONTROL

ELECTRICAL CONTROL INPUTS

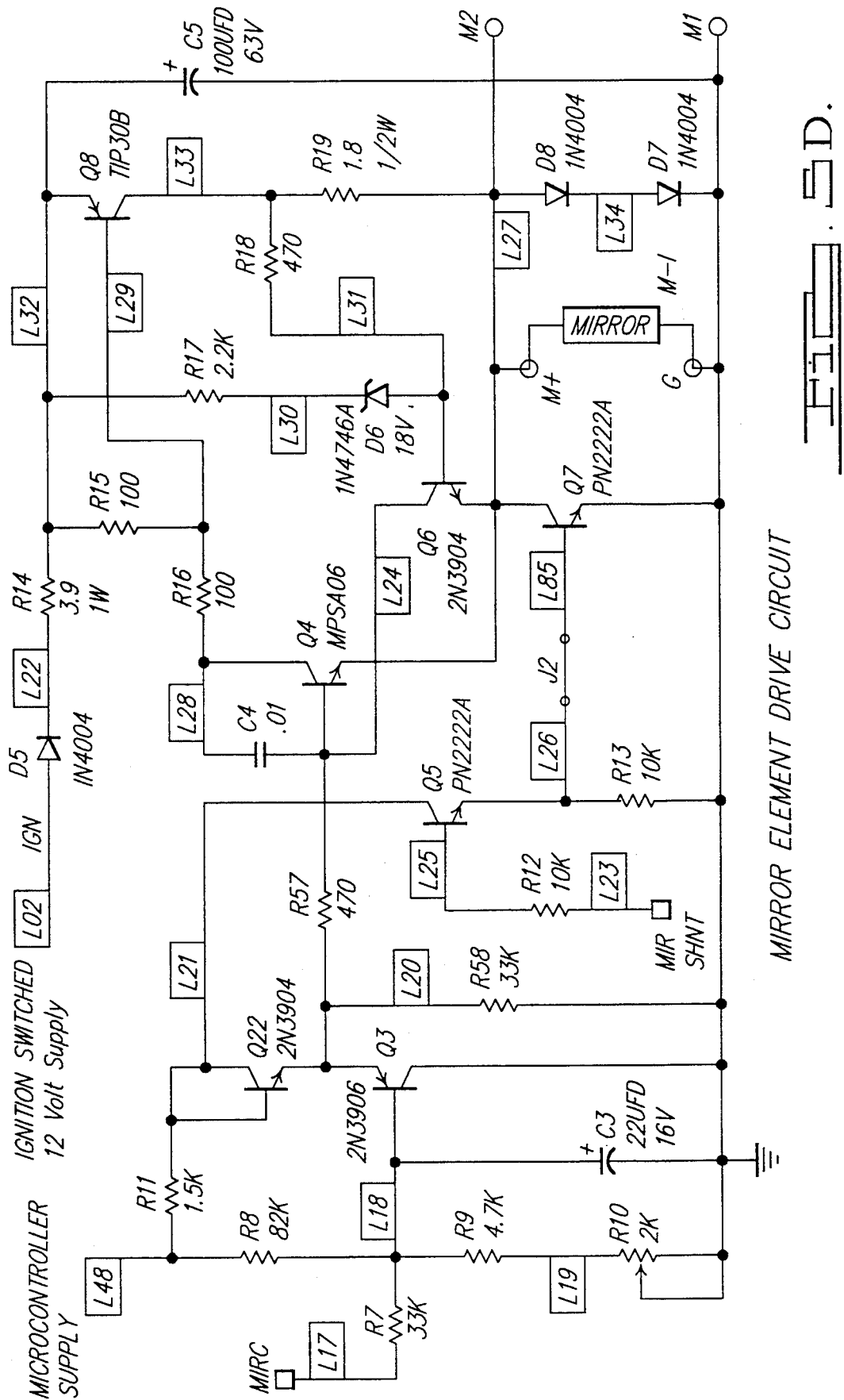

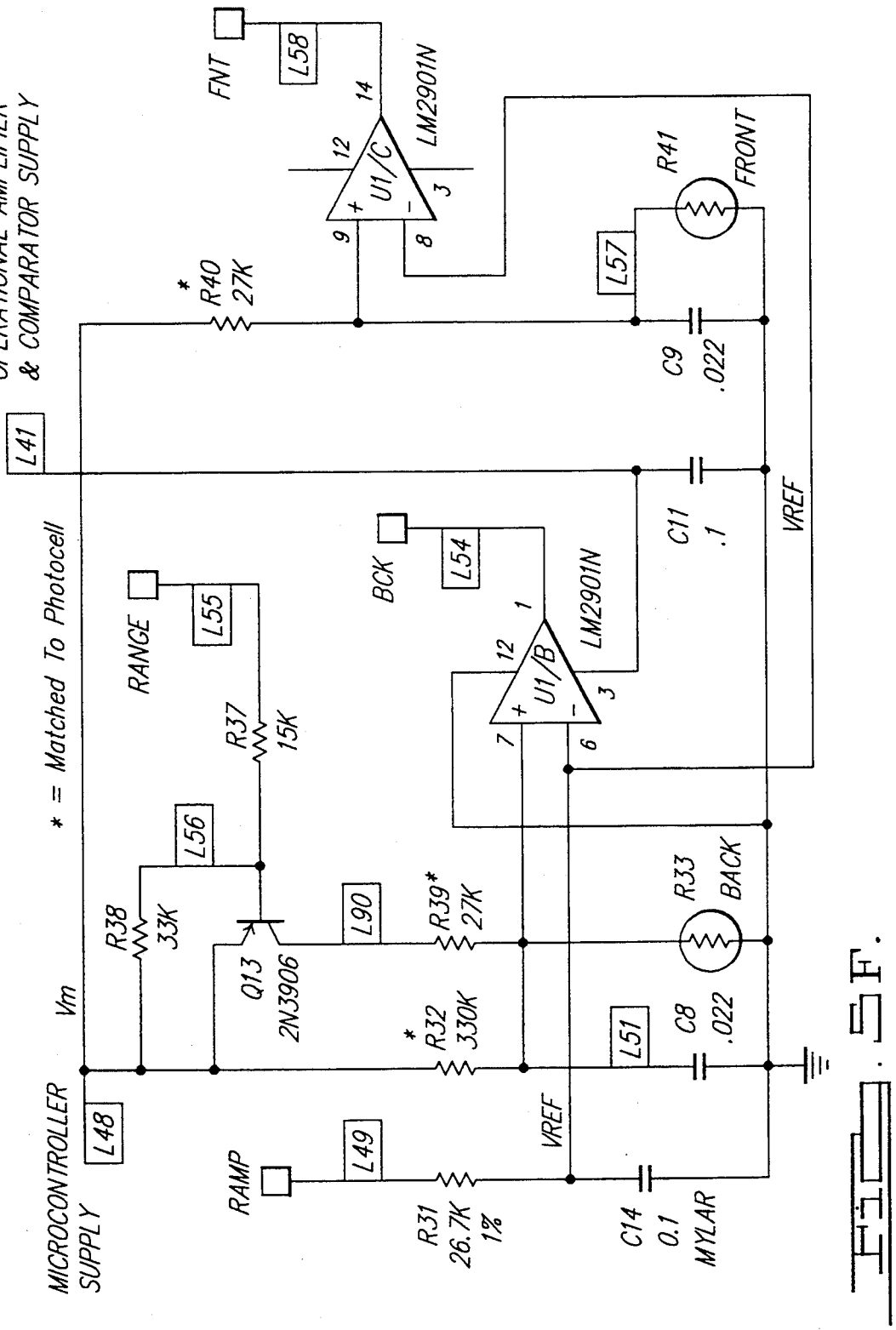

HEADLAMP CONTROL SENSOR & DELAY TIME POTENTIOMETER

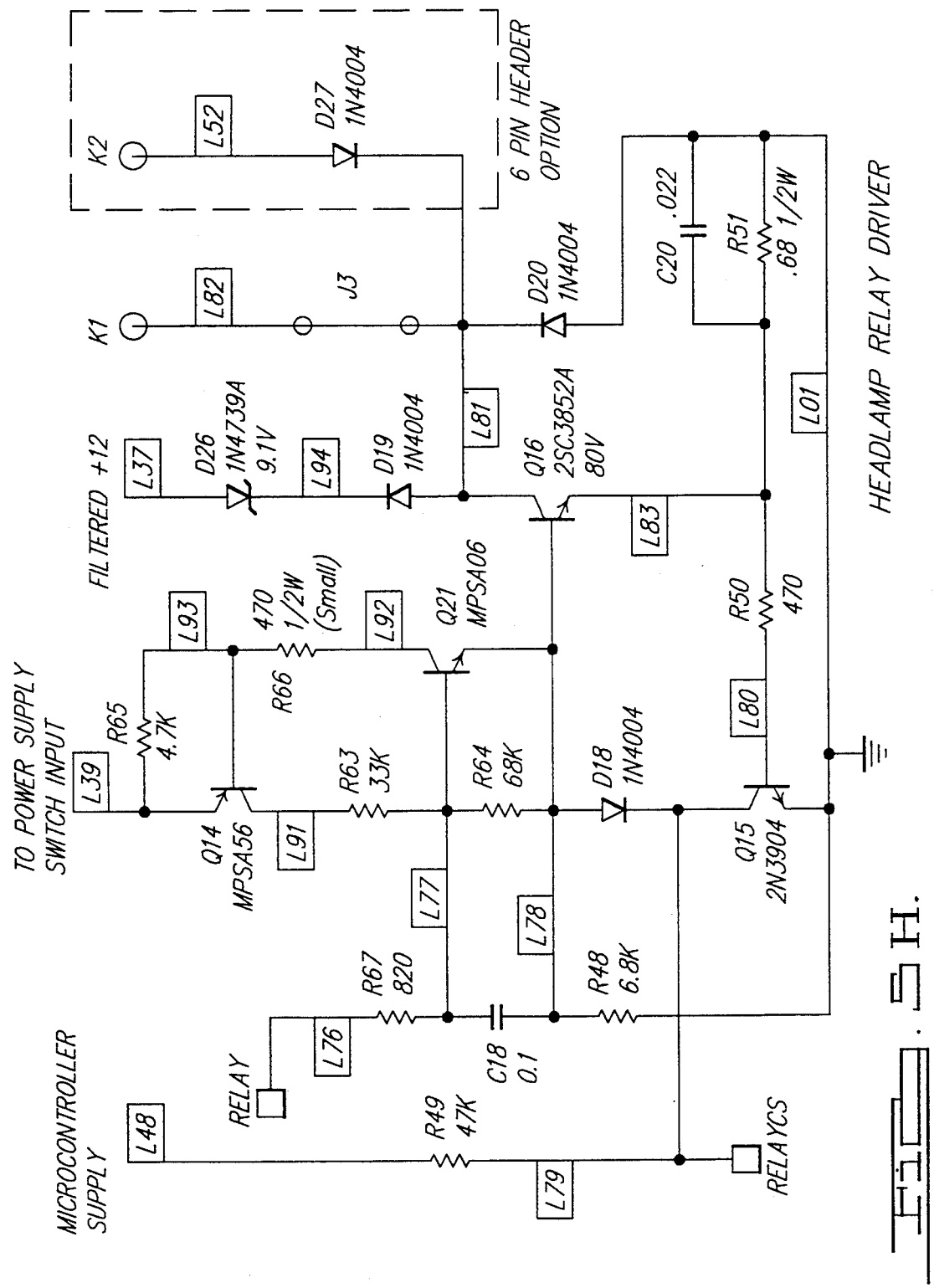

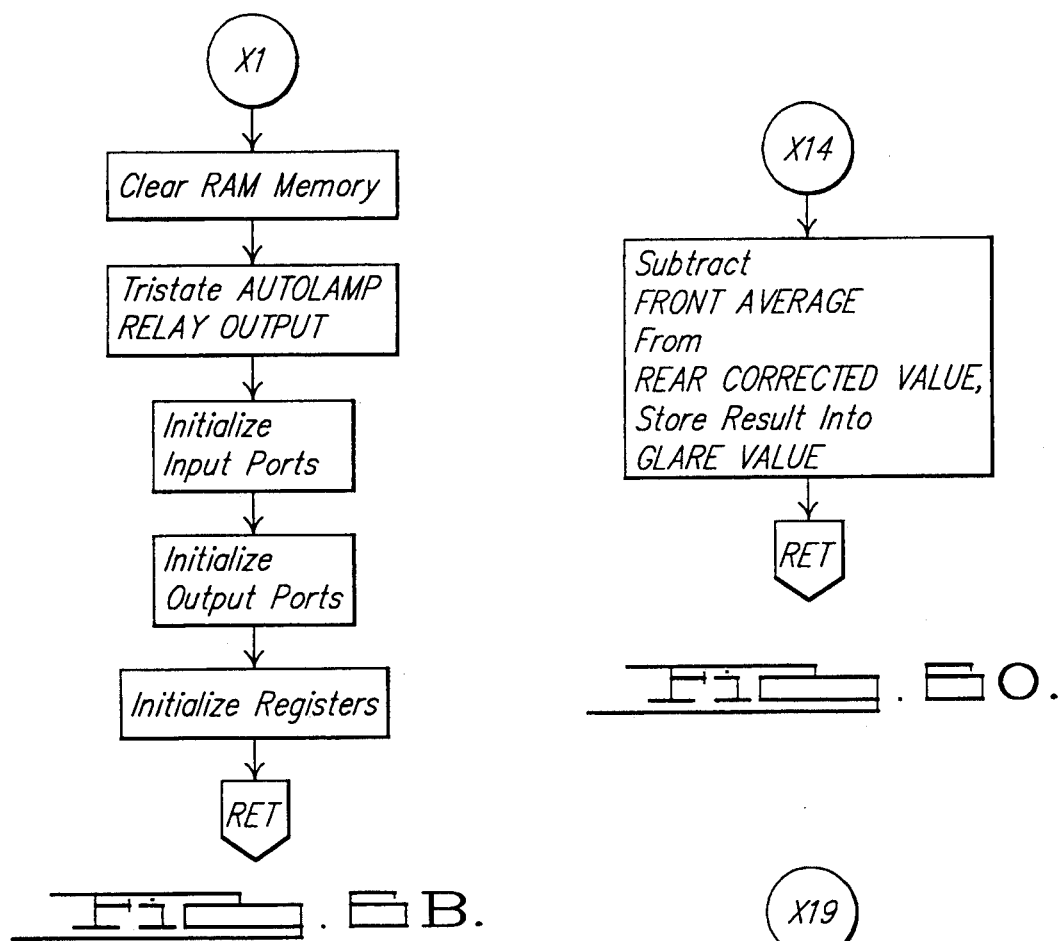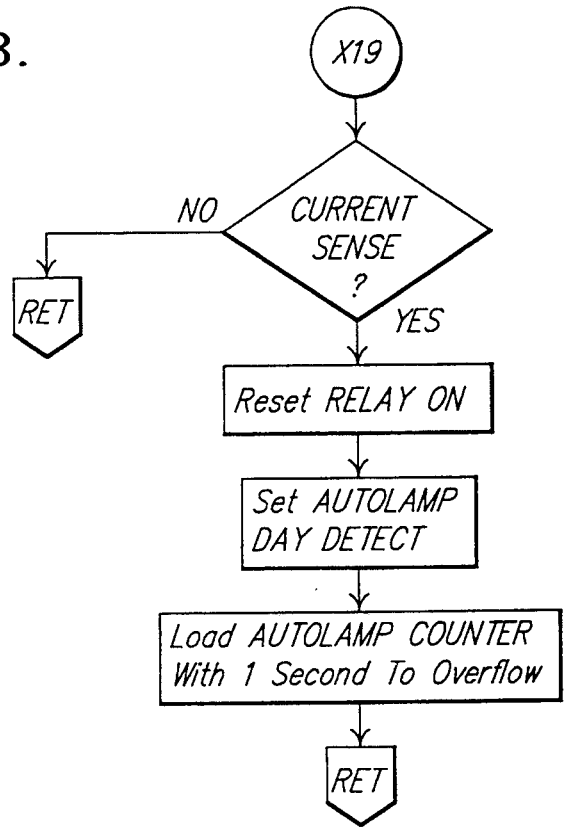

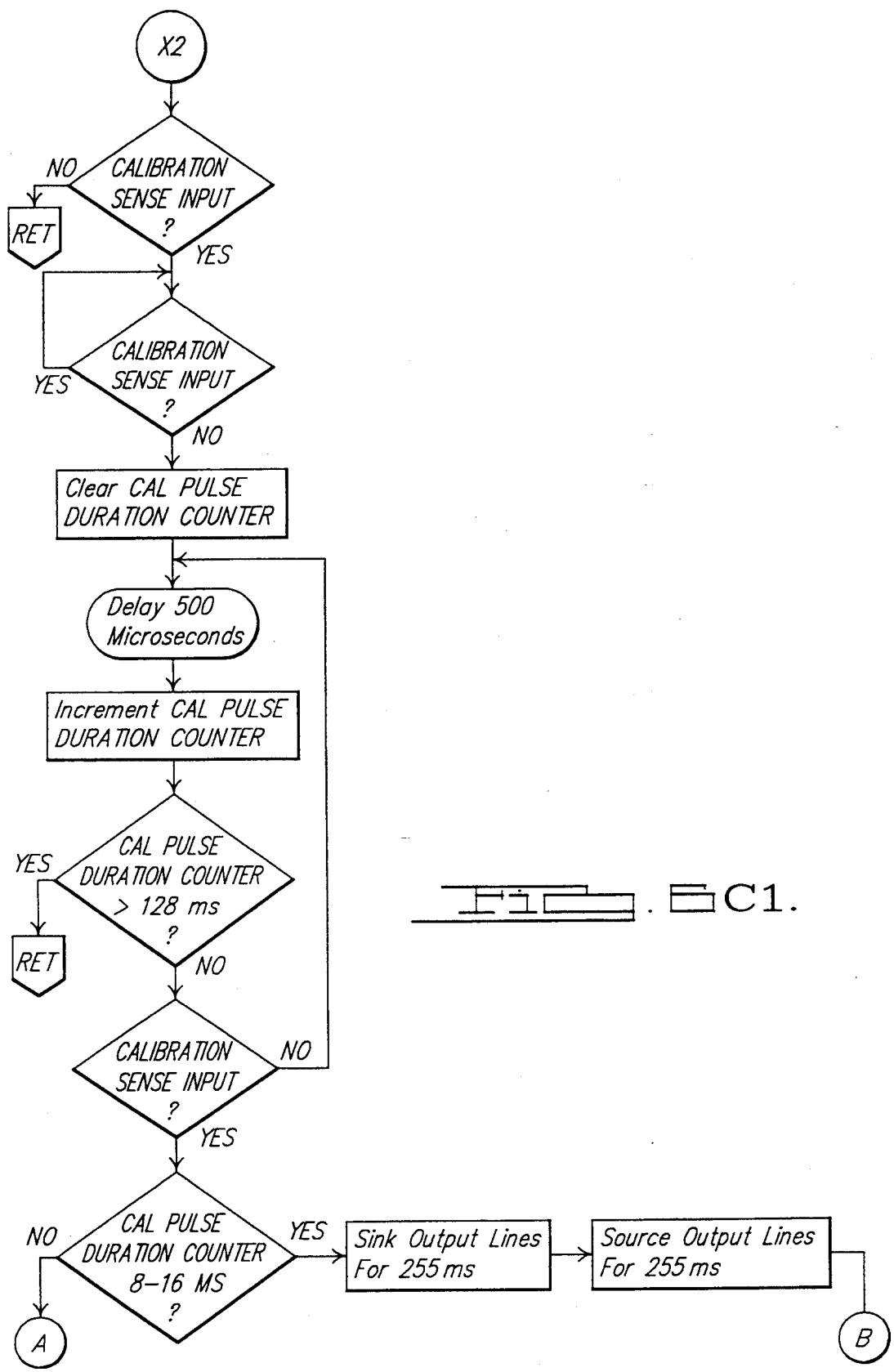
FIG. 8C1.

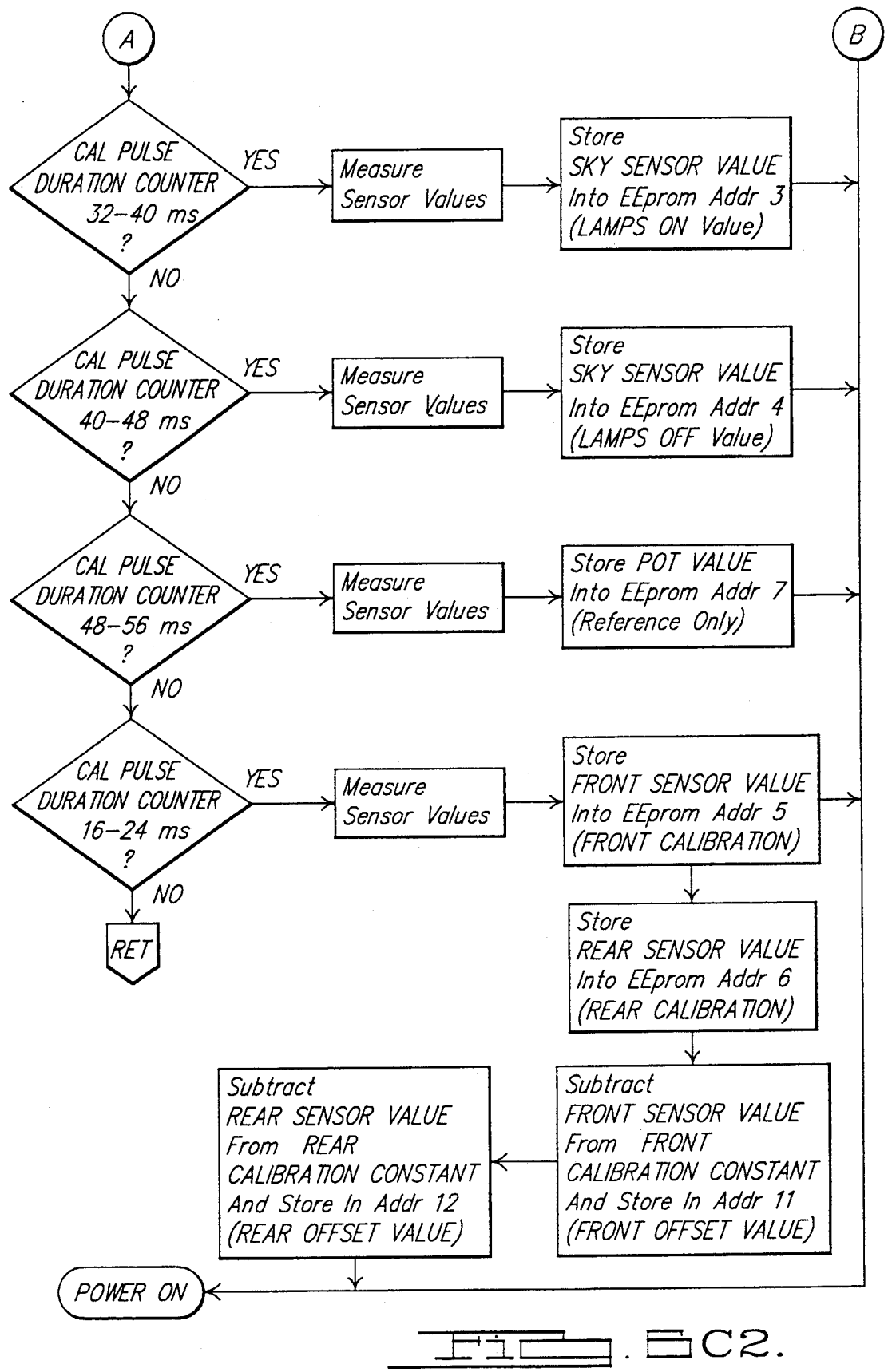
FIG. 5C2.

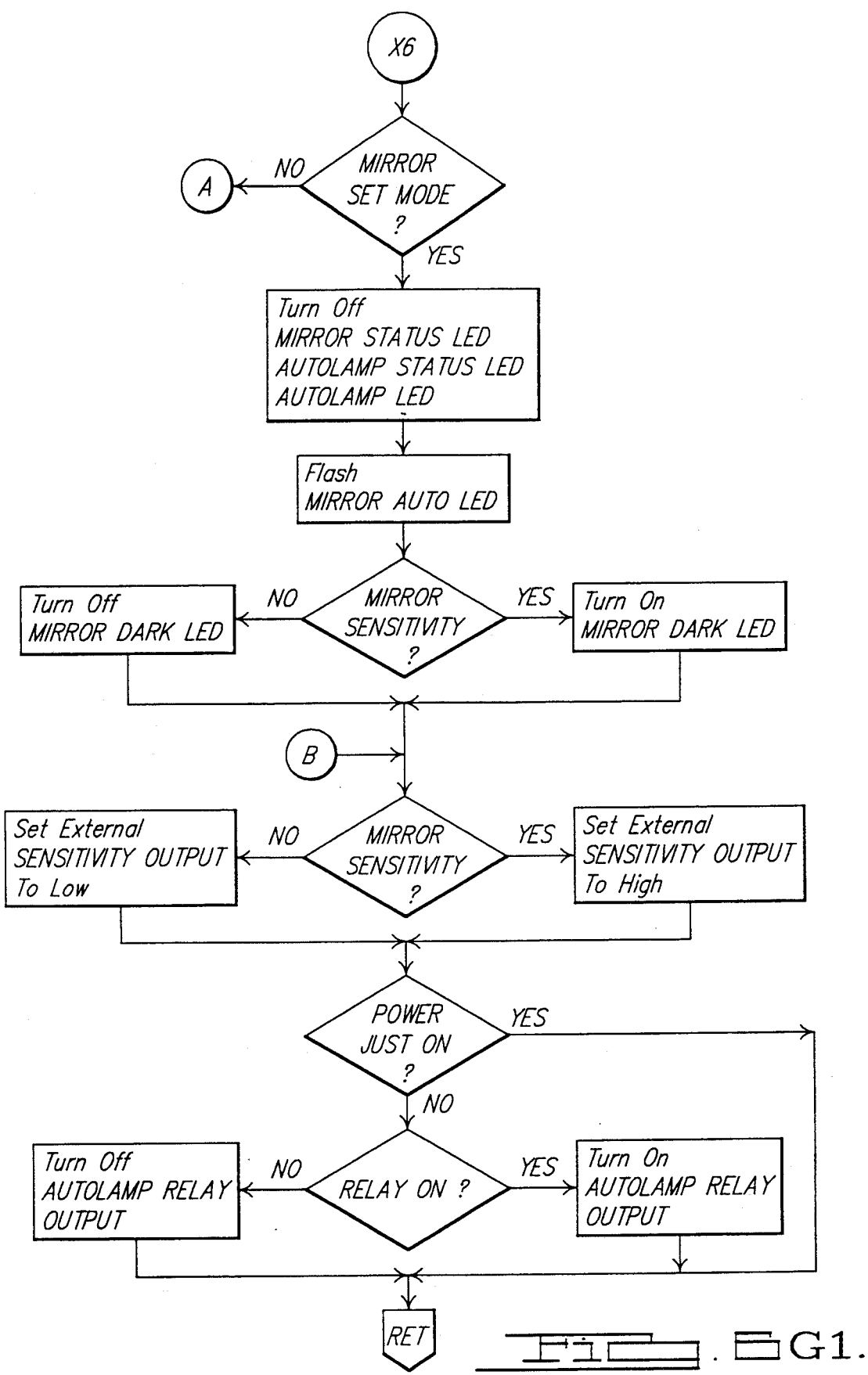
FIG. 6G1.

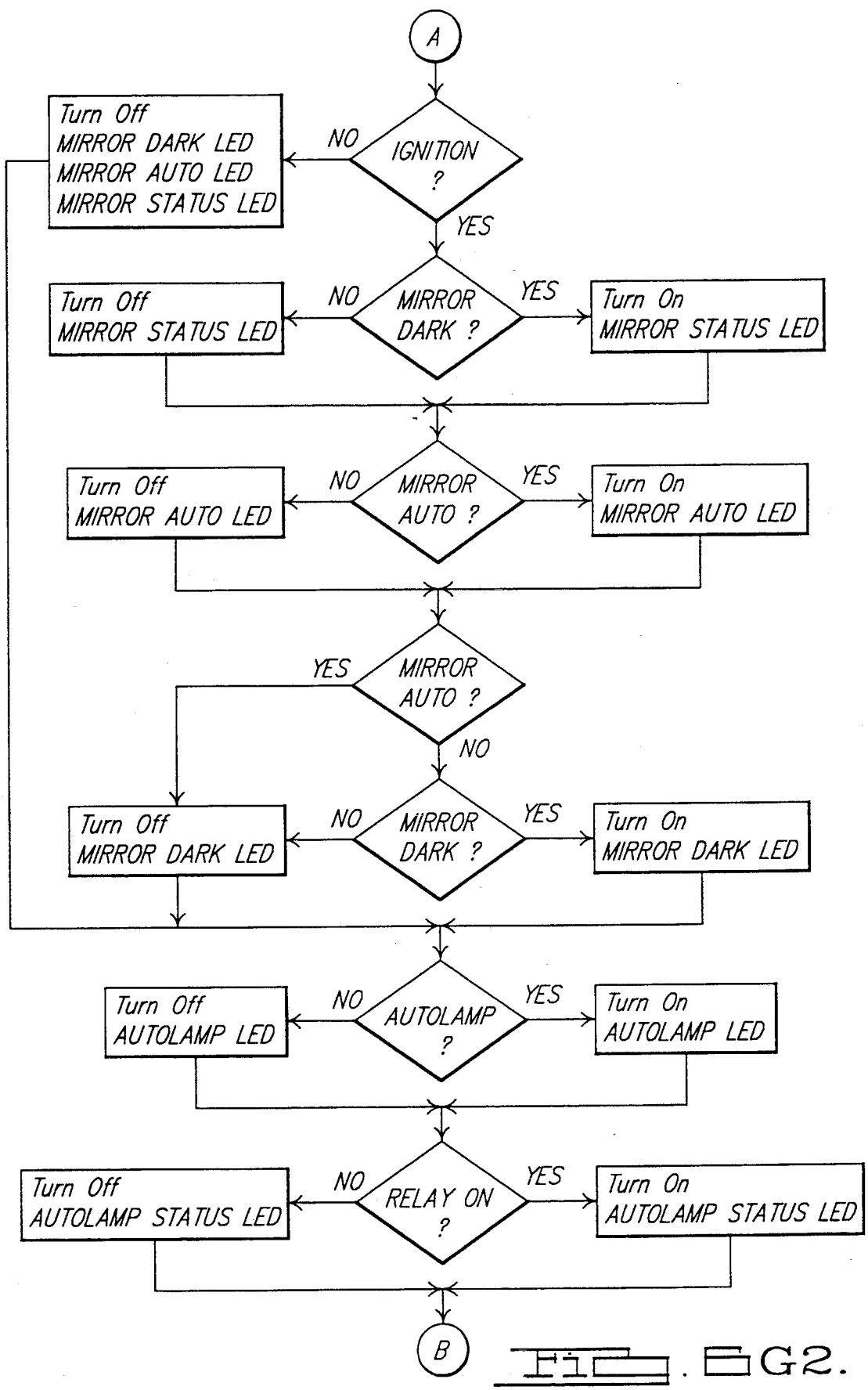
FIG. 5G2.

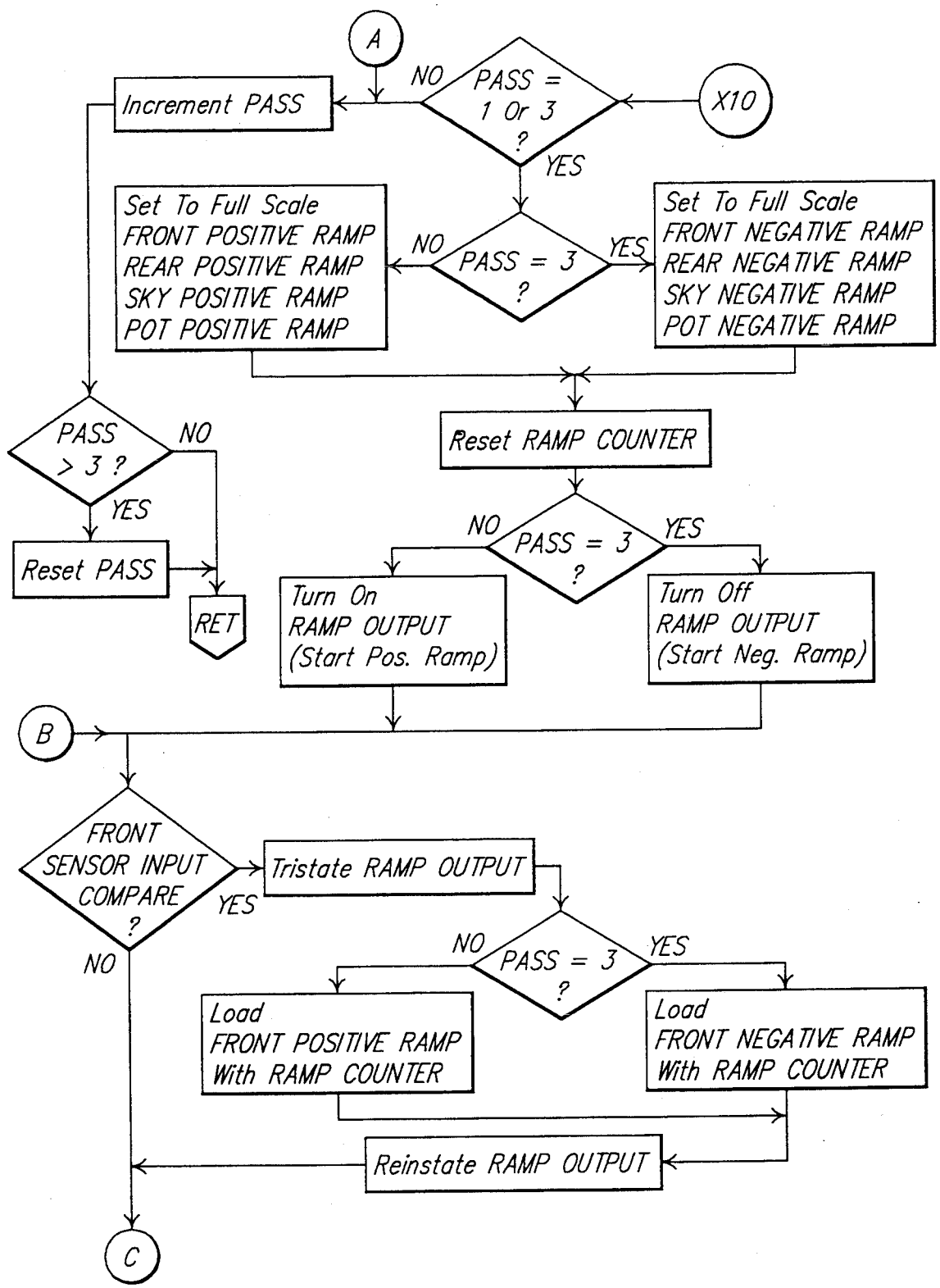
FIG. K1.

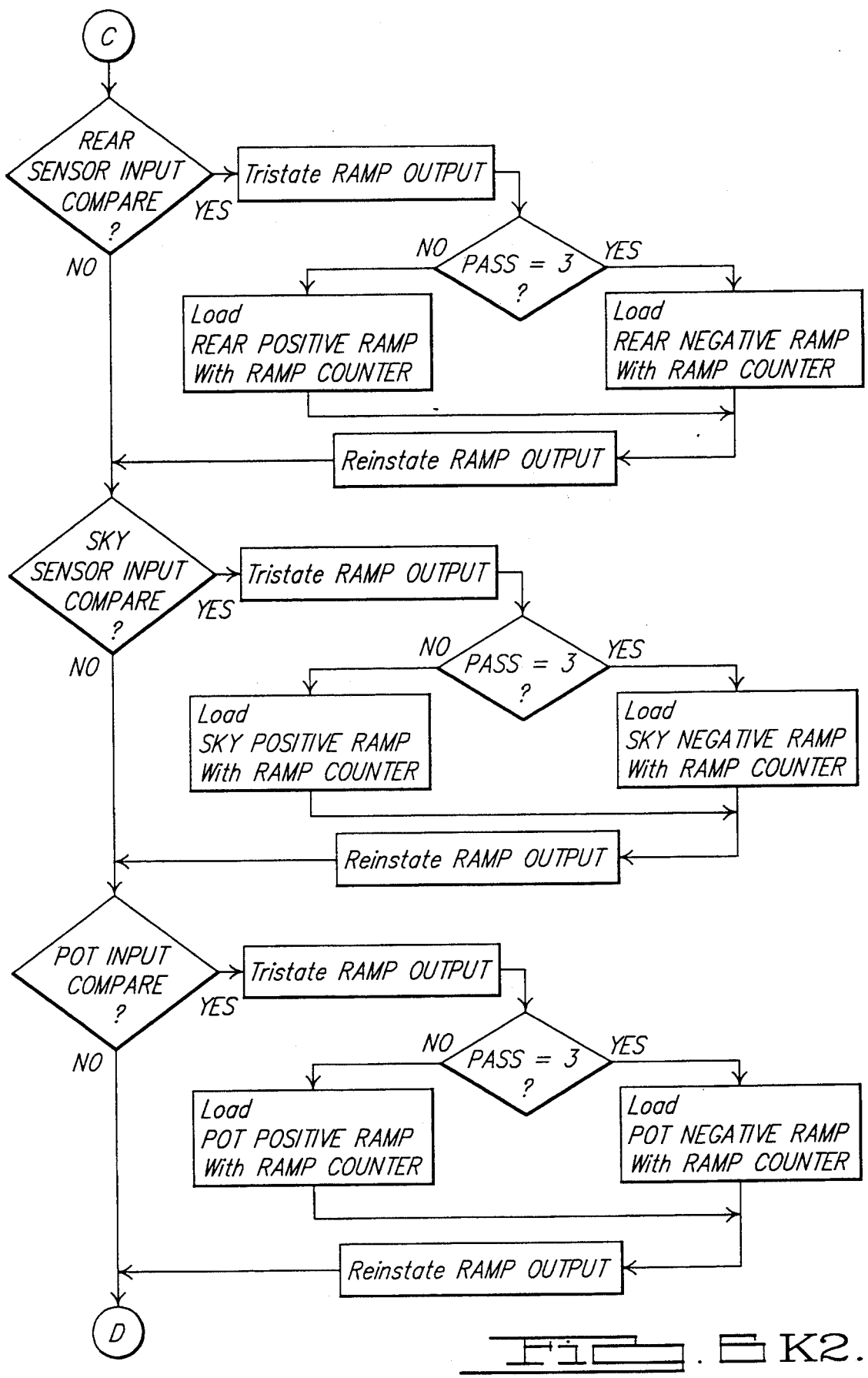
FIG. 5K2.

FIG. 6K3.

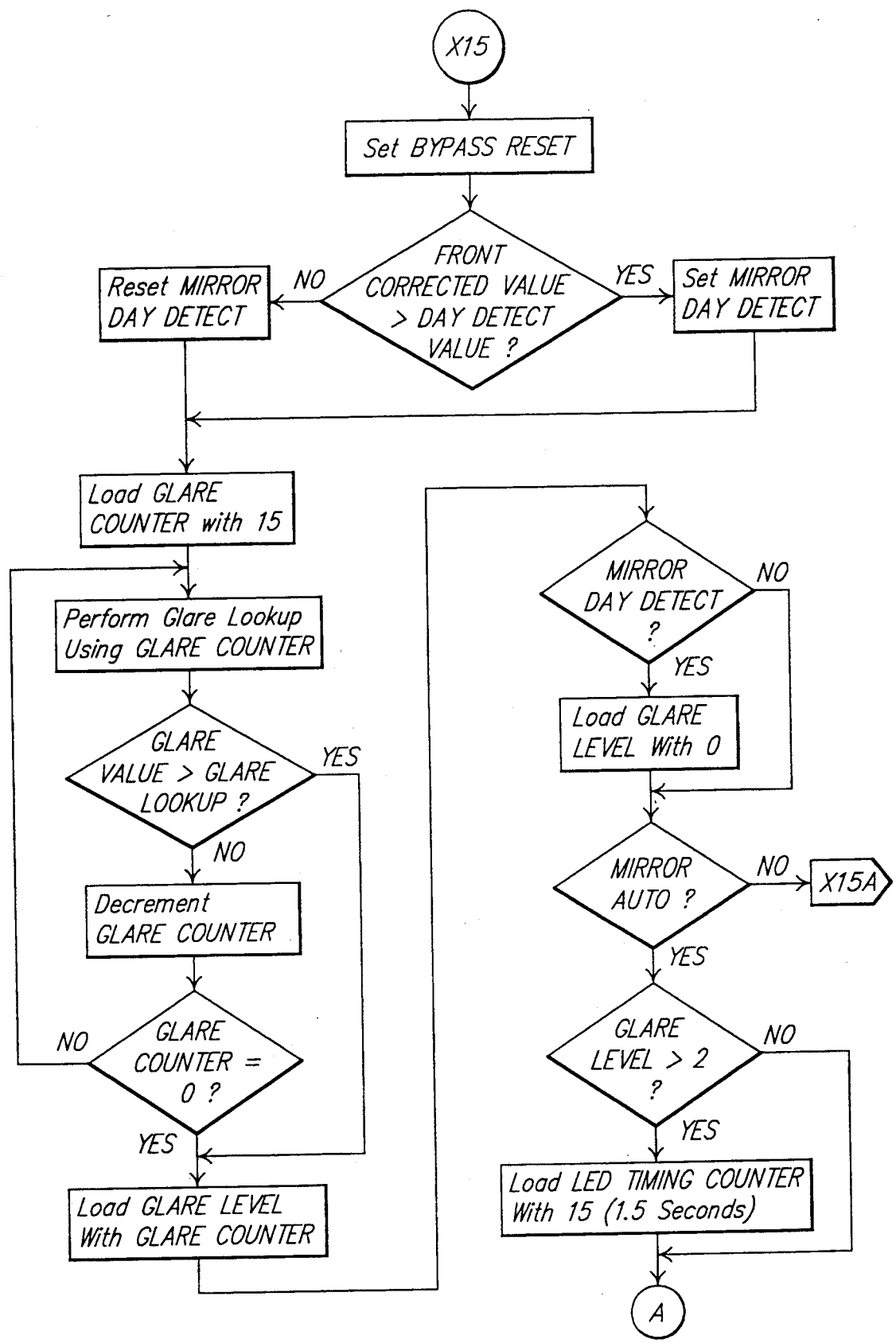
FIG. 6P1.

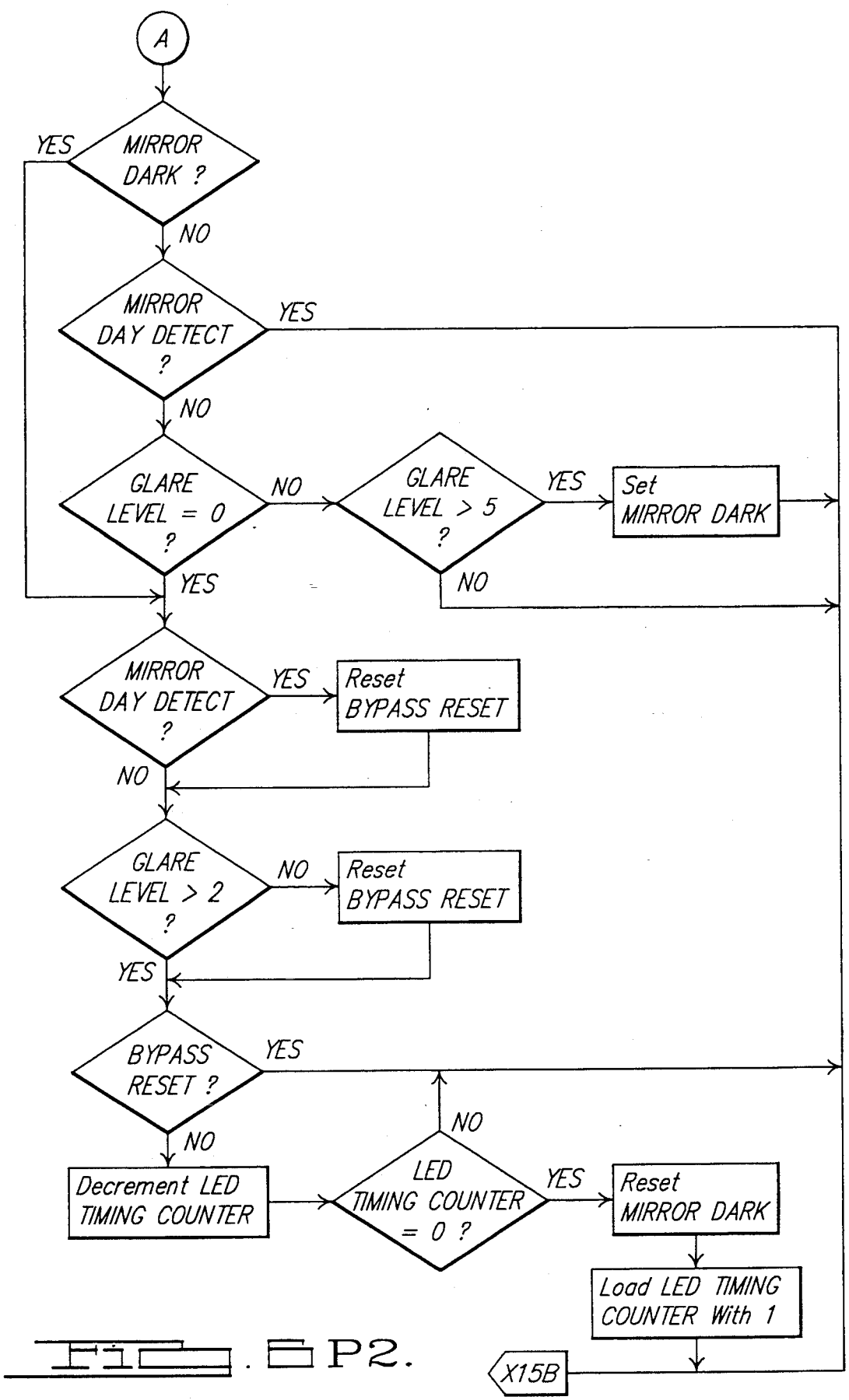
FIG. 8P2.

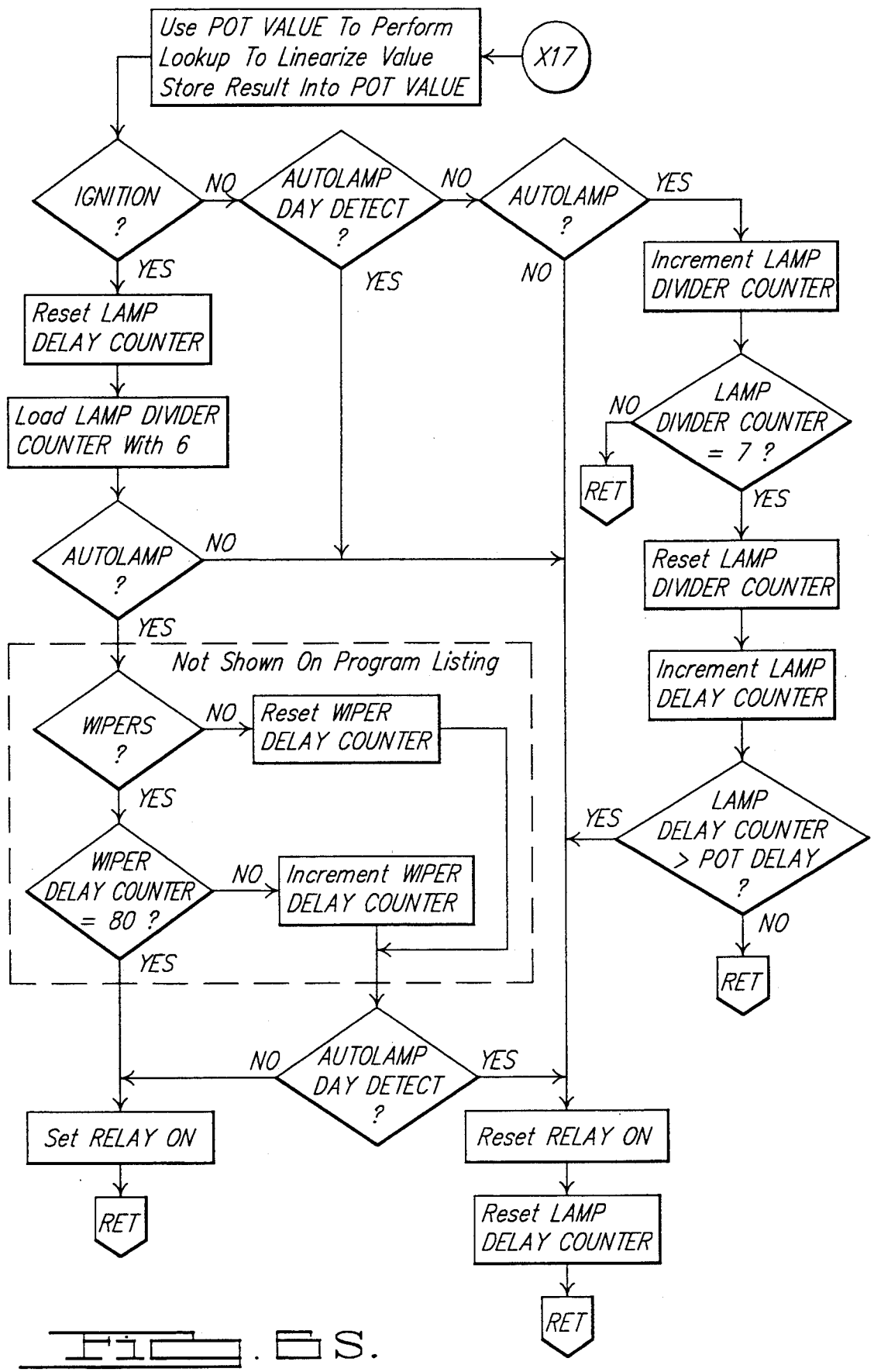

5,451,822

ELECTRONIC CONTROL SYSTEM

BRIEF SUMMARY OF THE INVENTION

This invention relates to electronic control systems and, more particularly, to an improved electronic control system particularly adapted for use in controlling automotive vehicle vision related equipment such as automatic rearview mirrors, headlamps and windshield wipers on automotive vehicles. Heretofore, electronic controls have been provided for controlling the operation of vision related equipment, such as automatic rearview mirrors, headlamps, and windshield and rear window wipers on automotive vehicles. For example, heretofore, electronic control systems have been devised for controlling automatic rearview mirrors for automotive vehicles whereby the rearview mirrors are automatically transferred from the full reflectance mode to the partial reflectance mode for glare protection from light emanating from the headlights of vehicles approaching from the rear. Prior control systems and related automatic rearview mirrors of the indicated character are disclosed, for example, in U.S. Pat. Nos. 4,443,057, issued Apr. 17, 1984; 4,508,875, issued Apr. 8, 1986; 4,902,108, issued Feb. 20, 1990; and 4,917,477, issued Apr. 17, 1990. Heretofore, electrical controls have also been provided for controlling the energization of automotive vehicle headlamps, tail lamps and running lamps. However, prior electrical lamp controls of the indicated character have usually been implemented separately with the result that separate controls have been required for the separate functions. For example, a separate control has been required for the automatic rearview mirror, another separate control has been required for the headlamps and other associated lights, and still another control has been required for the wipers.

An object of the present invention is to overcome disadvantages in prior electronic controls of the indicated character, and to provide an improved electronic control system incorporating improved means for controlling multiple visually related functions on automotive vehicles.

Another object of the invention is to provide an improved electronic control system which enables components of such systems to perform and control multiple visually related functions.

Another object of the present invention is to provide an improved electronic control system which incorporates a microcontroller to implement multiple visually related functions on automotive vehicles.

Another object of the present invention is to provide an improved electronic control system which incorporates microcontroller means adapted to perform a unique analog to digital conversion where the converted value is in logarithmic form and where the conversion covers a large input range.

Another object of the present invention is to provide an improved electronic control system incorporating improved means for controlling visually related equipment on automotive vehicles whereby such equipment is activated or deactivated in accordance with predetermined requirements.

Another object of the present invention is to provide an improved electronic control system incorporating improved means for controlling visually related equipment on an automotive vehicle as a function of the intended direction of movement of the vehicle.

Still another object of the present invention is to provide an improved electronic control system of the indicated character incorporating improved means to prevent de-energization of visually related equipment on an automotive vehicle as a result of low available electrical voltage.

The above as well as other objects and advantages of the present invention will become apparent from the following description, the appended claims and the accompanying drawings.

BRIEF DESCRIPTION OF THE DRAWINGS

FIG. 3A is a simplified circuit of the rear sensor of a production version of a prior art circuit which is generally described in U.S. Pat. No. 4,917,477;

FIG. 3B is a simplified rear sensor circuit for a preferred embodiment of the present invention;

DETAILED DESCRIPTION

Figure 1:
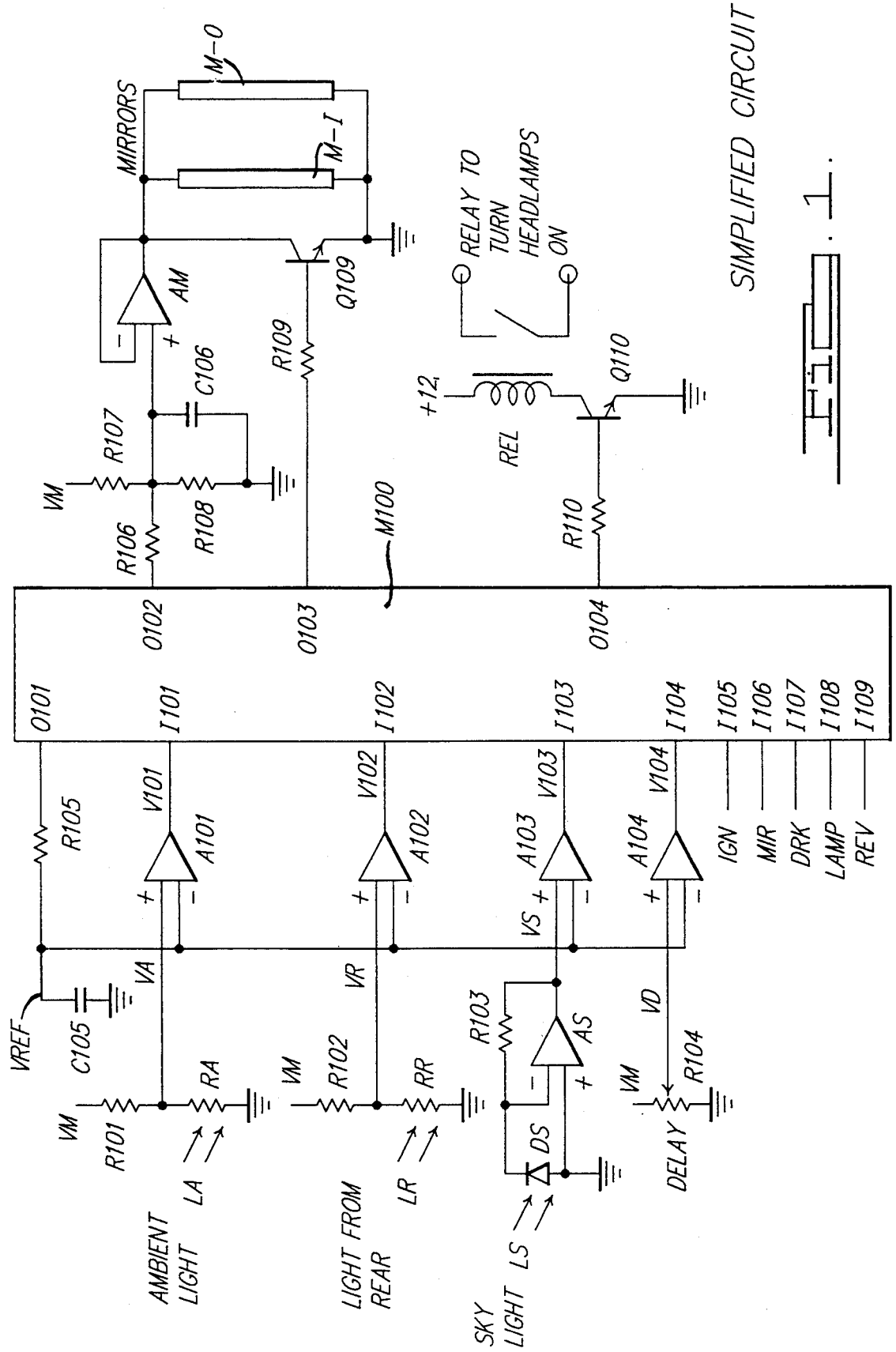
FIG. 1 is a schematic simplified circuit diagram of an electronic control system embodying the present invention.

In general, electronic controls systems embodying the present invention share a microcontroller, an automatic rearview mirror housing, and other circuit components to perform multiple functions, and utilize the microcontroller to implement these functions. Electronic control systems embodying the present invention are particularly adapted to control electrochromic mirrors of the type disclosed in U.S. Pat. No. 4,902,108, issued Feb. 20, 1990, for single-compartment, self-erasing, solution-phase electrochromic devices, solutions for use therein, and uses thereof, and assigned to the assignee of the present invention. Such electrochromic mirrors may dim and clear under the control of the electronic control systems embodying the present invention whereby such electronic controlled mirrors may be utilized in conjunction with other visually related equipment in automotive vehicles. In automatic rearview mirrors of the type disclosed in U.S. Pat. No. 4,902,108, both the inside and outside rearview mirrors are comprised of a thin chemical layer sandwiched between two glass elements. As the chemical layer is electrically energized, it darkens and begins to absorb light. The higher the voltage, the darker the mirror becomes. When the electrical voltage is removed, the mirror returns to its clear state. With such electrochromic mirrors, light sensing circuitry is effective to switch the mirrors to the nighttime mode when glare from the rear of a vehicle is detected, the sandwiched chemical layer being activated when glare is detected thereby darkening the mirror automatically. As glare subsides, the mirror automatically returns to its normal clear state without any action being required on the part of the driver of a vehicle. The amount of dimming depends on how much glare the driver experiences. With only a little glare, the mirror dims only partially while with bright blinding glare, the mirror dims to a fully dark condition. With systems embodying the present invention, both the inside and outside rearview mirrors may be controlled simultaneously whereby both the inside and outside rearview mirrors darken and clear simultaneously.

Novel uses of the microcontroller incorporated in electronic control systems embodying the present invention include a unique analog to digital conversion where the converted value is in logarithmic form and where the conversion covers an unusually large input range. In systems embodying the present invention, a power on reset of the microcontroller is effected when the ignition of an automotive vehicle is turned on, and a latch is effected to prevent turn-off of the headlamps of the vehicle when the microcontroller is reset due to low battery voltage which may occur while starting a stalled vehicle. Moreover, in systems embodying the present invention, there is a fast initialization of the mirror ambient light time average and of the headlamp control output when the ignition switch is first turned on. Additionally, if the automatic lamp day condition is sensed when the vehicle is taken out of reverse gear, the headlamps are turned off. This feature serves the following purpose: it is normally dark enough in a garage, even during the day, that the headlamps will come on before the vehicle leaves the garage. Without such feature, the headlamps stay on through a 35 second turn-off delay even when backing the vehicle out into bright sun light. With such feature, the headlamps are turned off as soon as the vehicle is taken out of reverse gear when backing the vehicle from the garage into daylight. When entering a garage with the lights off, the gear shift is normally taken from "Drive" through the "Reverse" position into "Park". Since the system does not bypass the timing to turn the headlamps on, the lights remain off through a normal delay timing period, as for example, a 20 second delay timing period, which normally provides ample time to permit the ignition to be turned off by the operator of the vehicle. If the timing bypass operated in both directions, the lights would normally come on and stay on through the exit delay timing period. In systems embodying the present invention, the exit delay can be set to keep the lights on up to three minutes to light the way after leaving the vehicle. Having the lights come on for this period of time each time that the car is parked in the garage in the daytime would be annoying. The front time average is initialized to the current front sensor reading when the vehicle is in reverse gear. This is accomplished because being in reverse gear often signals a sudden change in condition such as experienced when backing a vehicle from a garage into a lighted area.

READING LIGHT LEVELS

The first problem encountered in a combined headlamp on/off and automatic electrochromic mirror control system is to measure light levels used for the control functions. The minor requires sensing of the ambient light preferably by a sensor which has a wide viewing angle to the front of the automobile and sensing of the glare from the rear. Both light levels are normally very low at night when the dimming feature of the mirror is functional. Levels as low as 0.01 lux are used for control of the mirror. This requires sensors which are sensitive to low light levels. The mirror sensors and the associated controller must be able to read these light levels over an extraordinarily large range and ideally in logarithmic units, the advantages of which will become apparent hereinafter. Cadmium sulfide photo-resistive photocells whose conductances increase in approximate proportion to the light level striking them serve well for the mirror control light sensing functions. For good, wide range performance it is necessary to read light levels, particularly from the rear, over a range of 1000 to 1 or more while maintaining a consistent accuracy expressed as percent of the actual reading over this range. This is the first place where the logarithmic scale is useful since a constant percent of the reading in the linear units becomes a constant increment in the corresponding logarithmic units. For example, to read light over a range of 1000 to 1 on a linear scale with a maximum error of 10 percent of the reading requires a resolution of 1 in 10,000 or something greater than 13 bits in an analog to digital conversion. The same accuracy requirement is met with a resolution of 1 in 73 which can be fulfilled with 7 bits in an analog conversion when values are already in a logarithmic form. A novel, straightforward method for reading the logarithm of the conductance of each of the photo-resistors will be explained below. Since the conductance of each photo-resistor varies approximately in direct proportion to the impinging light level, The logarithm of the sensor conductance is very close to the logarithm of the measured light level as desired.

To understand the logarithmic conversion, note that the ambient light sensing photo-resistor RA illustrated in FIG. 1 forms a voltage divider with series source resistor R101. The series combination is supplied by the 5 volt microcontroller supply voltage VM and outputs voltage VA which has the "S" shape shown in FIG. 3 as the ambient light level increases over a wide range. For very low light levels, the conductance of RA is much lower than the conductance of series resistor R101 causing the divider voltage VA to be nearly equal to the supply voltage VM. As the light level increases, the conductance of photo-resistor RA increases to approximately that of the fixed Resistor R101 causing voltage VA to decrease through its most active mid scale range. Finally, for much higher light levels, the conductance of photo-resistor RA increases to a value much greater than the conductance of fixed resistor R101 causing voltage VA to asymptotically approach 0 volts. The symmetry of this "S" curve would suggest some corresponding symmetry in the method used to read it. The desire for a logarithmic conversion would suggest comparison with an exponential wave form.

Figure 2:
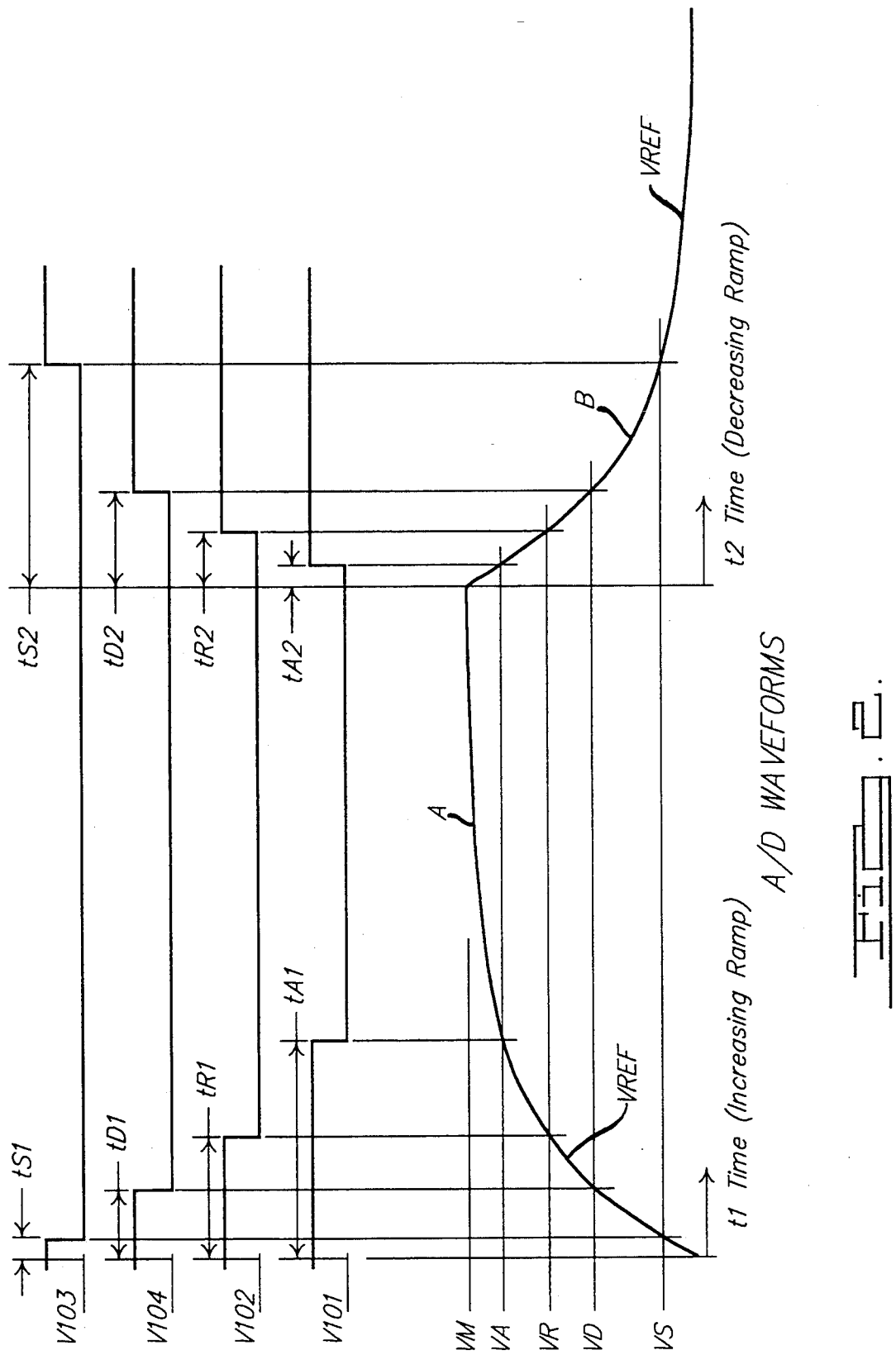
FIG. 2 is a family of curves showing A/D waveforms.

The measurement is taken as follows. Referring to FIG. 1, output 0101 of microcontroller M100 is held low until voltage VREF settles to 0 volts. 0101 is then switched to VM to create the increasing negative exponential wave form shown as A in FIG. 2. Output V101 of comparator A101 in FIG. 1 remains high until VREF increases to a value which slightly exceeds VA at which time V101 goes low. Microcontroller M100 measures the time interval tA1 from the start of increasing ramp A to the point that this transition takes places as depicted in FIG. 2. After a further time interval in which VREF settles to voltage VM, 0101 is switched to 0 volts to create the decreasing negative exponential wave form shown as B in FIG. 2. Output V101 of comparator A101 in FIG. 1 remains low until VREF decreases to a value which is slightly below VA at which time V101 goes high. Microcontroller M100 measures the time interval tA2 from the start of decreasing ramp B to the point that this transition takes places as depicted in FIG. 2. Microcontroller M100 stores the difference (tA2−tA1). When this signed difference of the time intervals is scaled to indicate the number of R105 C105 time constants, it is shown below to be equal to the natural logarithm of the ratio of resistance R101 to RA. Expressed in terms of conductance instead of resistance, the above is equal to the natural logarithm of the ratio of the conductance of resistance RA to the conductance of R101.

Derivation of Preceding Statement t1 = time from the start of the increasing ramp
t2 = time from the start of the decreasing ramp
tA1 = time t1 at which VREF=VA for the increasing ramp
tA2 = time t2 at which VREF=VA for the decreasing ramp
T = ramp RC time constant = R105 C105
K1 = ln(R101)
K2 = 1/(R105 C105) = 1/T For increasing ramp:

$$VREF = VM(1 - \exp(-(t1/T)))$$

And for VREF=V A for the increasing ramp $$VA = VM(1 - \exp(-(tA1/T)))$$

For decreasing ramp:

$$VREF = VM \exp(-(t2/T))$$

And for VREF=VA for the decreasing ramp $$VA = VM \exp(-(tA2/T))$$

Then the points for which VREF=VA for the increasing and for the decreasing ramps are equated below $$VA = VM(1 - \exp(-(tA1/T))) = VM \exp(-(tA2/T))$$

From the circuit configuration $$VA = VM(RA/(RA+R101))$$

Dividing by VM and equating equals from above $$VA/VM = RA/(RA+R101) = 1 - \exp(-(tA1/T)) = \exp(-(tA2/T))$$

Rearranging $RA/(RA+R101) = 1 - \exp(-(tA1/T))$ from above $$\exp(-(tA1/T)) = 1 - RA/(RA+R101) = R101/(RA+R101)$$

Dividing equals by equals $$(R101/(RA+R101))/(RA/(RA+R101)) = R101/RA = (\exp(-(tA1/T)))/(\exp(-(tA2/T))) = \exp(((tA2-tA1)/T))$$

Taking the natural logarithm of both sides $$\ln(R101/RA) = \ln((1/RA)/(1/R101)) = (tA2-tA1)/T$$

Rearranging and using the fact that the logarithm of the quotient is equal to the difference of the logarithms and that the logarithm of the reciprocal is equal to the negative of the logarithm $$\ln(1/RA) + \ln(R101) = (tA2-tA1)/T$$

In terms of K1 and K2

$$\ln(1/RA) + K1 = K2(tA2-tA1)$$

Rearranging $$\ln(\textit{Ambient light level}) (\text{approx}=) \ln(1/RA) = K2(tA2-tA1) - K1$$

Thus, to a close approximation, the logarithm of the measured light level is linearly related to the difference of the measured time intervals.

Figure 3:
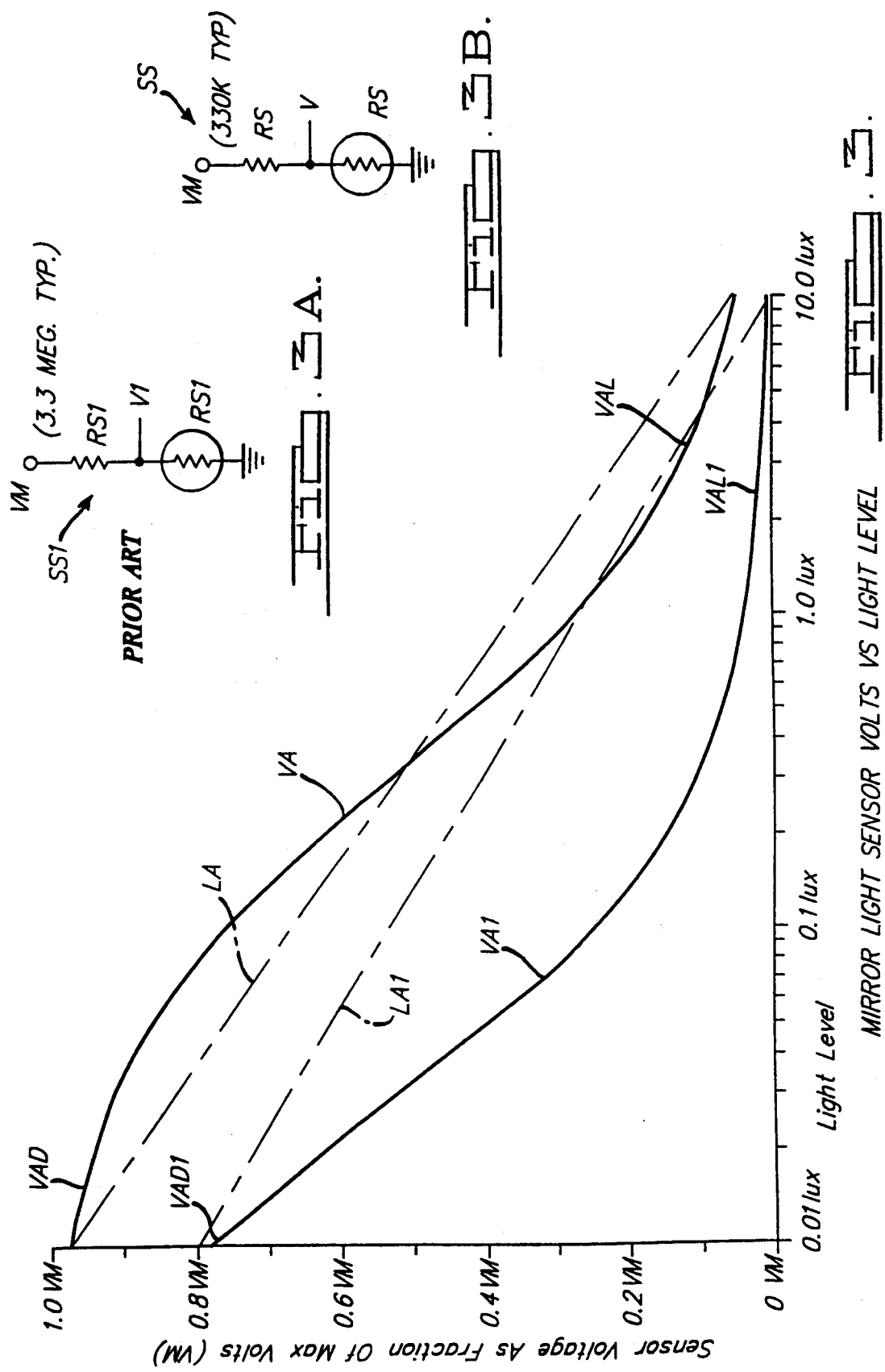
FIG. 3 is a chart showing the relationship of sensor voltage to light levels.

Referring to FIG. 3, prior art circuits do not work satisfactorily with the "S" curve characteristic of the voltage output VA of the sensor circuit which is used in the preferred embodiment. To minimize or eliminate the "S" characteristic, prior art circuits typically use a much higher resistance in series with the sensor. The source resistance in series with the sensors of prior art circuits is made nearly as high as or perhaps much higher than the highest resistance that the photocell assumes in its active range. Here by active range, we refer to the range of light levels for which the sensor responds to a relatively small change in the sensed light level to cause a significant change in the circuit response for at least one mirror operating condition. For the front sensor, this range would typically extend from approximately 0.1 lux to 50 lux. For the back sensor, it would typically extend from about 0.02 lux to 10 lux.

FIG. 3B depicts a simplified rear sensor circuit SS for the preferred embodiment. 330 k ohms is the resistance used in series with the rear sensor in the preferred circuit. Curve VA is a plot of the output voltage V shown as a fraction of the supply voltage VM versus light level. In FIG. 3A, SS1 is a simplified circuit of the rear sensor of a production version of the prior art circuit which is generally described in U.S. Pat. No. 4,917,477. Note that the series resistance is 3.3 megohms which is ten times higher than used in the preferred circuit. VA1 is the corresponding curve which depicts V1 versus light level. Note that at 0.01 lux, curve VA1 of the prior art circuit has not begun to approach the supply voltage VM as has curve VA at VAD. Note, however, that at higher light levels, the voltage VA1 of the prior art circuit in FIG. 3A is about 10 times lower than the corresponding voltage VA of the preferred circuit in FIG. 3B. At 4 lux, point VAL of VA is about 10 percent of the supply voltage VM and point VAL1 of VA1 is only about 1 percent of VM. The low voltage levels of the prior art circuit place far greater demands on the quality of the comparators and of the shielding from noise and circuit board leakage for satisfactory circuit operation than does the preferred circuit.

The use of logarithmic scales for the measurement of wide ranging variables such as light and sound is very common. The important issue here is that the required operating range is almost 1000 to one. Also, as will be explained below, making the conversion or at least a portion of the conversion of the signals to a more nearly logarithmic form early in the signal processing chain has great advantages. It reduces the precision needed to attain a given level of performance thereby improving performance and/or reducing the cost of electronic components and adjustments required to perform the required control functions. If setpoint or calibration adjustments are made by the microcomputer after measurement, the nominal 1000 to 1 operating range must be multiplied by these adjustment range(s) to get the total range that must be read by the sensor and microcomputer. Depending on the adjustment range, the required measuring range may easily exceed 10,000 to 1. On a linear scale, millivolts or even fractions of a millivolt of error may easily exceed the signal due to a light level which must be measured. There is no way to distinguish the error from the actual signal created by the light level. The error must be reduced to improve the useful range of light levels which can be measured or the shaping of the signal levels must be changed. The addition of offset adjustments and the use of more precise and better shielded analog components to avoid the problem are not cost effective solutions. To circumvent this difficulty, the circuit must transform the signal into a form which more closely approximates the "ideal" logarithmic form before it appears as a voltage which must be processed with very high resolution and low offset errors. The nearly ideal logarithmic conversion, which is achieved with the simple dual measurement processing step would show as a straight line on the semilogarithmic plot of FIG. 3. It is desirable that the signals which must be processed at all stages including the early ones approximate this logarithmic characteristic as closely as possible to minimize the need for costly precision signal processing steps. One simple criteria is to see how much the curve of voltage versus light level on a semilog plot deviates from the ideal straight line. Line LA may be used to gauge the deviation of VA from the ideal straight line and LA1 may be used to gauge the much greater deviation of signal VA1 from a straight line. Thus it is apparent that at an early stage the preferred circuit converts the signal to a form which is much more nearly logarithmic than that of even the successful prior art mirror control circuits. Furthermore, this is done before active signal processing steps sensitive to the shaping of the signal vs light level curve are performed.

Other particular advantages of the configuration are that the ratio calculation becomes a simple subtraction of the logarithmic signals and the logarithm is a nearly ideal weighing factor for the time average of the signal from the front sensor. A practical way to see this is to consider that for any light levels in the sensing range of the logarithmic circuit, a doubling of the light level increases the logarithm by the same increment regardless of the starting light level. Thus doubling of the light level for a given period of time has the same effect on the time average regardless of the operating level. This maintains the mirror control threshold at a desirable level even under frequently changing ambient light conditions.

Use of Light Level and Other Readings

The microcontroller may be programmed in accordance with conventional microprocessor practice to take four readings in parallel using a procedure such as that stated above. The procedure and result are similar for the rear sensor having output voltage VR. Specifically the calculation in which time intervals tR1 and tR2 are used in place of tA1 and tA2 above yields $$\ln (1/RR) + \ln (R102) = (tR2 - tR1)/T$$

The time average of the logarithm of the ambient light level is taken by replacing the previous sum with 255/256 times the previous sum plus 1/256 of the new reading each time that a reading is taken. Ten samples are taken each second so that 256 samples are taken in 25.6 seconds. The average has a time constant equal to the interval between samples (0.1 second) divided by the weighing factor for each summing operation (1/256) or $0.1/(1/256) = 25.6$ seconds.

When light levels to the front are less than 0.2 lux, the driver of the vehicle no longer perceives much change in glare as the ambient light level is further reduced. Thus the microcontroller replaces readings equivalent to light levels smaller than 0.1 lux with a reading equivalent to approximately 0.1 lux before entering the value into the average or the calculation. The microcontroller M100 also initializes the sum with the ambient light reading or optionally with the equivalent of a high ambient light level on power up so that the inside and outside mirrors M-I and M-O are not unduly sensitive prior to stabilization of the time average. Since the time average of the logarithm of the ambient light level and the glare causing light level from the rear are both in logarithmic units, the logarithm of the rearward light level minus the time average of the logarithm of the ambient light level is equal to the logarithm of the ratio of the rearward light level to the logarithmically weighted time average of the ambient light level. This is the ratio used to determine how much to dim the inside and outside mirrors M-I and M-O. The microcontroller uses a lookup table to provide a shaping function to determine the drive voltage to apply to the mirrors as a function of the logarithm of the ratio referenced above. The microcontroller uses an incrementally time proportioned signal which is averaged by capacitor C106 of FIG. 1 to establish the desired drive voltage to the mirror elements.

Headlamp On-Off Control

A key advantage of systems embodying the present invention is to share analog to digital conversion circuitry, the microcontroller and other circuit functions, as well as the packaging space to provide both the automatic dimming mirror and the headlamp on-off control functions. Since the mirror and the headlamp both relate to vision, having both controls on the mirror is a logical grouping for the driver. Furthermore, the mirror and mirror mount are ideal locations for the required light sensors. Referring to FIG. 1, the headlamp on-off control uses a photo-diode sensor DS which is mounted on a conventional stationary mirror mount and aimed through the windshield to view a portion of the sky which is directly overhead. The total included viewing aperture is preferably about 90 degrees. An amplifier AS is used to amplify the signal and produce an output voltage VS which is approximately proportional to the sky light level. As indicated in FIG. 2, the voltage VS is read using the same conversion algorithm as is used for the light levels used in the mirror control circuit. Where desirable, the light levels measured primarily for the mirror control may be used as a part of the control algorithm for the headlamps and may even be used in place of the signal VS eliminating the need for the sensor directed toward the sky altogether. Since the signal of interest is a voltage rather than the conductance of a series connected resistor, the scaling of the input is different. It is possible to perform a logarithmic conversion of the voltage using only TS2, but this increases the dependence of the reading on the precise value of R105 C105. Since only two threshold values are of direct interest it is optional but preferable to read VS with the same two sided symmetrical conversion as used above in which case using T as previously defined $$VS = VM(1 - \exp(-(tS1/T))) = VM \exp(-(tS2/T))$$

$$VS/VM = \exp(-(tS2/T))$$

$$(VM-VS)/VM = \exp(-(tS1/T))$$

$$VS/(VM-VS) = \exp(-(tS2/T))/\exp(-(tS1/T)) = \exp(((tS1-tS2)/T))$$

$$\ln(VS/(VM-VS)) = (tS1-tS2)/T$$

In the last expression substitute a $= VS/VM$. This scales the signal VS expressing it as a fraction of the full scale value VM.

$$\ln(a/(1-a)) = (tS1-tS2)/T$$

A point of interest is that for a $=0.5$, $a/(1-a)=1$; ln $(1)=0$; and $tS1=tS2$. Note that this mid-scale reading is independent of the time constant T. This is of practical importance since if the most important calibration point can be established as this mid-scale value (a=0.5), the accuracy of the reading is not degraded by inaccuracies in the values of R105 or C105 which are factors in the value T or inaccuracies in the time base which would shorten or lengthen the tS1 and tS2 readings by equal percentages.

VD indicates the position of a slide potentiometer which the user adjusts to determine the length of time that the headlamps stay on after the ignition is turned off to give light for the driver to exit from the vehicle. The microcontroller M100 uses the same technique to read VD as was used to read VS and a lookup table is used to correlate the time delay periods with the voltage readings. The headlamp on-off feature has a relay output turning on transistor Q110 to energize relay REL which is effective to turn on the headlamps. The microcontroller uses hysteresis to turn the headlamps off only after the light level exceeds a threshold which is approximately 1.4 times the threshold level at which the lights were turned on. The microcontroller also delays requiring the light to exceed the turn off threshold most of the time for a first minimum time period before the lights are turned off. Likewise the microcontroller also delays requiring the light to remain below the turn on threshold most of the time for a second minimum time period before the lights are turned on. The function of the circuit is to automatically energize the headlamps when they are needed and to turn them off when they are not.

Mirror and Headlamp On-off User Interface

Three switch inputs referred to as I106, I107, and I108 are user actuated switch inputs and are used to interface the mirror and headlamp on-off control functions with the user. I106 from the MIR switch toggles the mirror dimming function on and off. I107 from the DRK switch toggles the mirror between its full dark and its normal auto states. Because of a possible safety hazard in leaving the mirror dark for extended periods and also because of technical difficulties with leaving some mirror elements in their darkened state for too long a time, the mirror automatically reverts from the full dark to the automatic state after a time interval of approximately thirty seconds.

SPECIAL FEATURES OF THE CIRCUIT

Refer to the detailed circuit diagrams in FIGS. 5A through 5H. The microcontroller circuit receives power from the +12U automotive supply which is not turned off by the ignition switch and also receives power from the 12 volt IGN supply which is de-energized when the ignition switch is in the "off" position. The circuit uses the switched IGN source to energize the mirror element supply circuit so that the mirror will dim only when IGN is on. IGN also resets the microcontroller U2 when first energized to bring the control back to a usable state in the rare event that an electrical transient has latched the microcontroller in an otherwise uncontrollable state.

The microcontroller circuit draws too much current to be left energized all of the time when the vehicle is not in use. Furthermore, unneeded periods of circuit energization increase the risk of failure and of objectionable performance. These precautions minimize the occurrence or the negative effects of failures. The full circuit is energized whenever IGN is on. The only time that the microcontroller and circuit energization is required when IGN is off is to maintain the timed energization of the headlamps to implement the exit delay feature. Thus, the device includes a circuit to energize the full microcontroller circuit whenever the headlamp control outputs a signal to energize the relay which in turn energizes the headlamps.

The microcontroller U2 must be reset when the supply voltage is too low to assure proper operation. The CMOS microcontroller itself will operate at voltages well below the nominal 5 volt value but the nonvolatile memory and other portions of the circuit will not perform properly at substantially reduced voltages. Thus, the microcontroller is reset when the 12 volt vehicle supply voltage +12U drops below a threshold which is nominally at 8 volts. If the vehicle engine stalls, the starter load may reduce the supply voltage causing the microcontroller to reset. If the headlamps were directly energized by a microcontroller output, this would cause them to be de-energized possibly causing a disastrous accident. To prevent this occurrence, the RELAY signal from the microcontroller at L76, goes through a latching circuit which is configured around transistors Q14 and Q21. The RELAY output of the microcontroller is set to a high impedance "three state" value when the microcontroller is reset. The RELAY output must be driven high to cause the latch to energize to turn on the headlamps and must be driven low to cause the latch to de-energize to turn off the headlamps. The microcontroller normally maintains the desired output state when the circuit is energized and operating normally. When a reset occurs, the RELAY output goes to its "three state" value and the latch "remembers" its correct state until the normal voltage is regained allowing the microcontroller to resume control. The latch will reset by itself only if the vehicle's supply voltage drops to a level which is much lower than the reset level for the microcontroller and also lower than may normally be expected when operating the starter.

DETAILED CIRCUIT DESCRIPTION

Having singled out special features of the system and having explained them in some detail in a simplified circuit, the following is a description of the circuit incorporated in the complete working mirror system. FIG. 5A through 5H are detailed circuit diagrams. After a brief description of the wiring connections, the circuit will be described one functional block at a time.

MIRROR WIRING CONNECTIONS

Figure 5A:
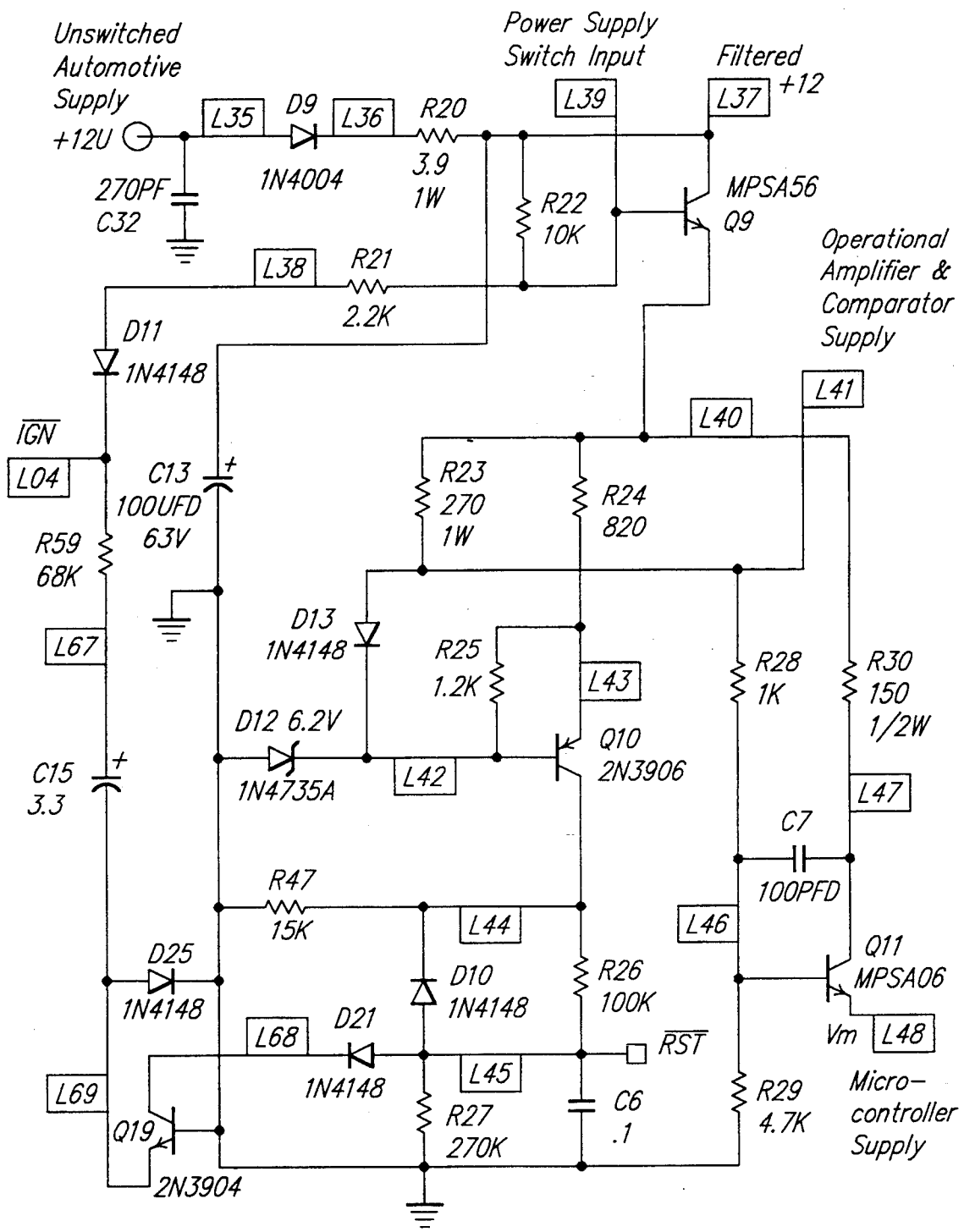
FIGS. 5A through 5H are detailed circuit diagrams of the circuit illustrated in FIG. 5.
Figure 5B:
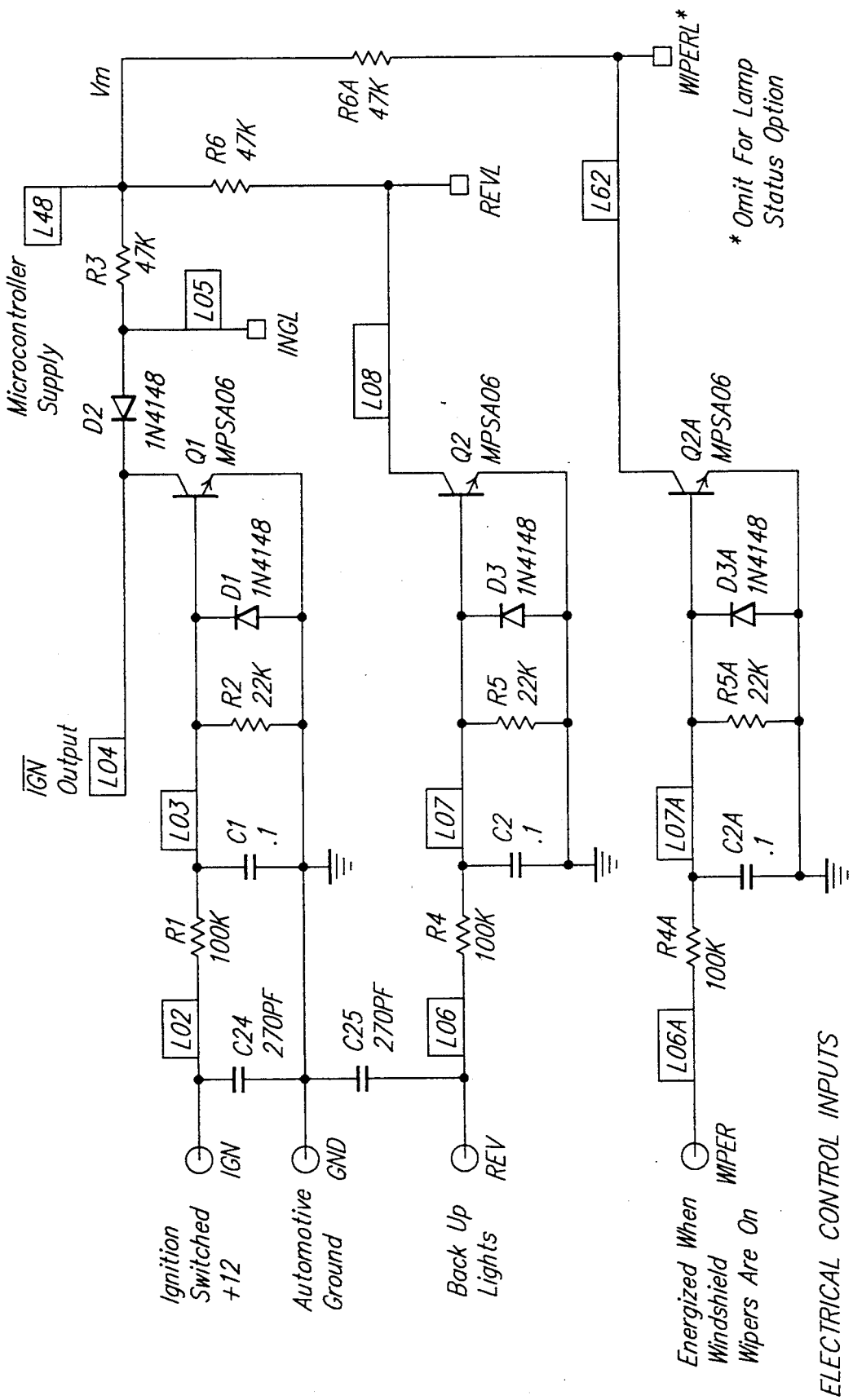

Referring to FIGS. 5 and 5B, the mirror is connected to the chassis ground of the vehicle via the GND terminal. The IGN terminal is connected to the 12.8 volt automotive supply which is switched off when the ignition switch is in the "off" position and on when the ignition switch is in the "run" position. The state of the IGN input for the "accessory" or the "start" position of the ignition switch is optional. The +12 U terminal is connected to the unswitched 12.8 volt automotive supply which is energized continuously being unaffected by the position of the ignition switch. Terminal K1 and optional terminal K2 are outputs used to energize relay coils which in turn energize the automobile headlamps and running lights. K1 and K2 are switched to ground, the other terminal of each relay coil being externally connected to the unswitched automotive supply. Terminals M1 and M2 are provided to drive one or more optional outside mirror elements in parallel with the inside mirror element. The REV terminal is connected to the backup lights, this input being used to signal the microcontroller to hold the mirrors in the high reflectance mode to give the driver maximum rear vision whenever the automobile is in reverse gear. The rectangular boxes with L's followed by two digit numbers identify each conducting path on the printed circuit board.

Power Supply and Microcontroller Reset Control

Referring to FIGS. 5 and 5A, the power supply is rather complex in that it supplies two output voltages and is energized whenever the ignition is on causing the IGN input to be high and is also energized when it is held on by the headlamp relay driver circuit. About 7 volts is supplied to the quad comparator U1 and the operational amplifier U4 through line L41. Five volts (Vm) is supplied to the microcontroller U2, the EEprom memory IC3 and most of the remainder of the circuit via conducting path L48. The higher supply voltage is used for U1 so that the input common mode voltage range of each of the comparators includes the full microcontroller supply voltage range and so that the output voltage range of U4 spans nearly the full voltage range of the microcontroller. The supply is derived from 12.8 volts supplied at the +12U terminal. Diode D9 protects the circuit from reverse voltages due to miswiring or momentary negative voltage transients. Resistor R20 limits inrush charging surges to filter capacitor C13 and transistor Q9 is turned on to energize the supply. Zener diode D12 is the reference for the supply voltage and is used to directly limit the supply voltage at L41. Current from resistor R23 supplies L41. Conduction through diode D13 to zener diode D12 clamps the voltage at LA1 to approximately 7 volts. When the voltage at L40 exceeds a level of approximately 8 volts which is adequate for proper operation of both the microcontroller and the EEPROM memory, conduction through resistor R24 turns on transistor Q10 pulling the RST' input high to take the microcontroller U2 out of the forced reset mode allowing it to function normally. Resistor R28 and series resistor R29 bias emitter follower transistor Q11 to maintain Vm at approximately 5 volts. Resistor R30 limits current in the event of a short on the 5 volt supply.

Whenever IGN goes high, IGN' is pulled low drawing current from the base of transistor Q9 through resistor R21 and diode D11 turning on transistor Q9 and the power supply as described previously. Capacitor C15 is discharged through resistor R59 and the emitter of transistor Q19 turning on transistor Q19 pulling RST' low through diode D21. This causes the microcontroller to reset. The intent of this special reset is to protect against the rare instance when the micro program goes into an uncontrolled state causing loss of control while the headlamp relay driver circuit is energized holding the micro circuit on by current drawn from the base of transistor Q9 through transistor Q14 of the relay driver latch as will be described hereinafter. Without the reset, the only way to recover from the unwanted latched condition would be to disconnect the mirror from the battery supply voltage or to let the car battery run down.

Capacitor C6 prevents very rapid and erratic changes in the RST' signal. Diode D10 conducts to speed discharge of C6 to reset of the microcontroller more quickly when power is removed. Capacitor C23 isolates radio frequency signals.

Electrical Control Inputs

Referring to FIG. 5B, when the ignition is switched on, the IGN terminal is pulled high supplying current through resistor R1 to turn on transistor Q1 pulling IGN' low and pulling INGL low through diode D2. Current through resistor R3 from Vm pulls INGL high when the ignition switch is off and IGN is low. INGL is sensed by the microcontroller at pin 7 so that the microcontroller program responds appropriately to the state of the ignition switch. Resistor R2 holds transistor Q1 off when current is not supplied through IGN; capacitors C1 and C24 filter the signal; and diode D1 protects transistor Q1 from negative voltage applied to the IGN terminal. Voltage to the automobile back up lights is sensed at the REV input turning on transistor Q2 and pulling the REVL input pin 8 of the microcontroller low. The microcontroller inhibits darkening of the mirror when the REV signal is present. The optional WIPER input is energized when the wipers are on. Details of operation of these circuits are similar to those for the IGN input and will not be repeated.

Microcontroller, Oscillator, and Memory

Figure 5C:
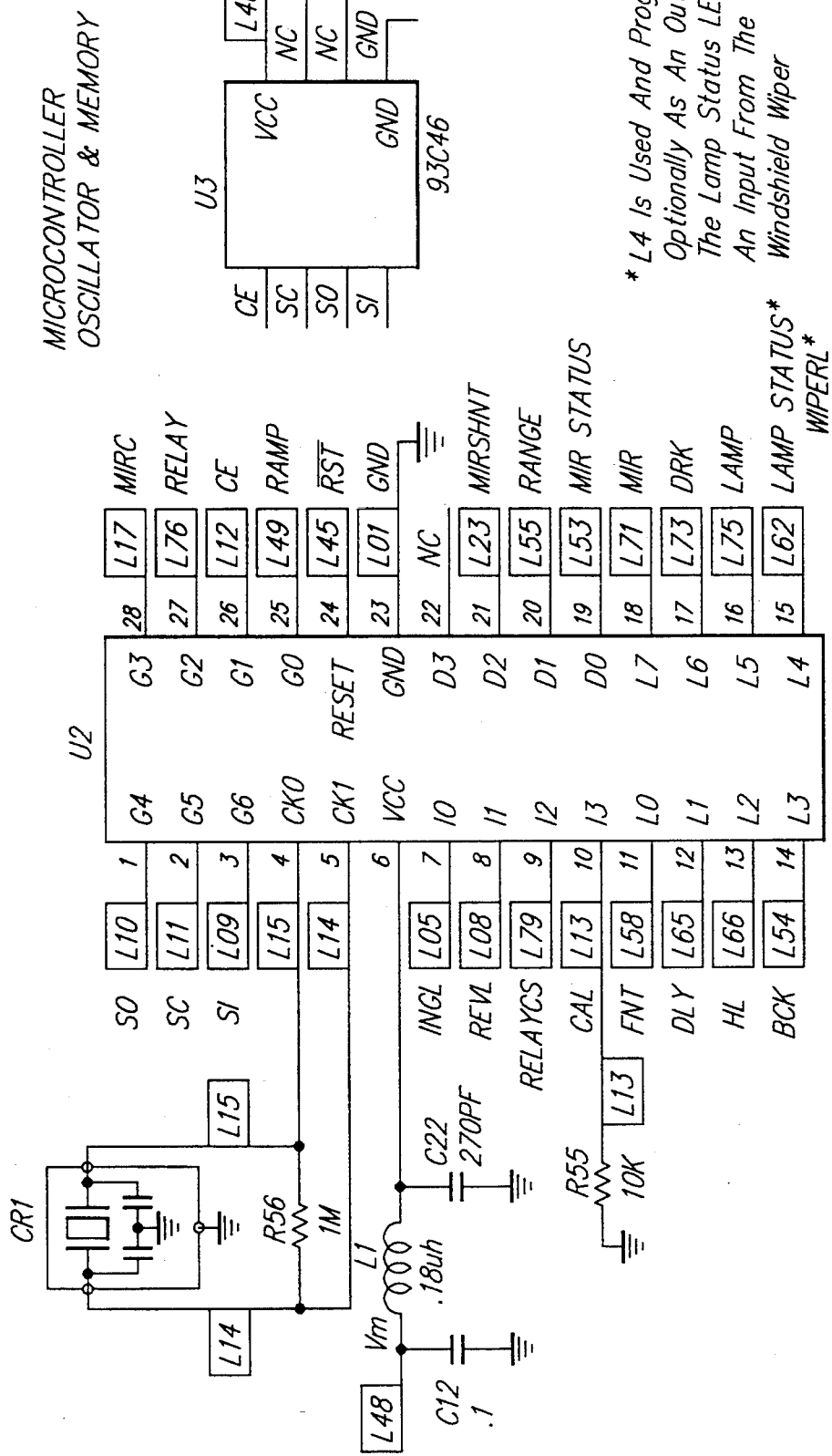

Referring to FIG. 5C, the microcontroller U2 is made active by first energizing the 5 volt VCC input pin 6 and then by pulling the reset RST' input pin 24 high and holding it high. Ceramic resonator CR1 and resistor R56 are the external components used as part of the microcontroller oscillator circuit.

The EEPROM memory U3 is accessed serially through the SO, SC, SI and CE pins 1, 2, 3 and 26 of the microcontroller and information may be either read from or written to this memory by the microcontroller. The advantage of the memory as is well known is that the memory state is not lost when power is removed. Calibration data and switch setting information is stored in the memory. Information on special options is also stored there. Capacitor C12, inductance L1, and capacitor C22 filter the power supply to the microcontroller and limit radiated interference.

Mirror Element Drive Circuit

Referring to FIG. 5D, the signal MIRC from pin 28 of the microcontroller is duty cycled between ground and Vm to control the drive voltage and thus the degree of darkening of the mirror elements M-I and M-O. The higher the duty cycle at the Vm level, the higher the voltage and the darker the mirrors. The MIRSHNT output from pin 21 of the microcontroller is switched low to allow the mirror to darken to the level controlled by MIRC and is switched high to inhibit darkening of the mirror and to turn on transistor Q7 to discharge the mirror element causing it to clear more rapidly. Resistors R7, R8, R9 and R10 form a network which causes the circuit to supply about 0.4 volts to the element when the duty cycle of MIRC to the Vm level is 0 percent and about 1.0 volts to the mirror when the duty cycle of MIRC to the Vm level is 100 percent. Capacitor C3 averages the voltage created by the duty cycle. Emitter follower Q3 buffers the signal and the buffer amplifier built around transistors Q4 and Q8 amplifies the signal in order to supply peak currents of about 0.4 amp to the mirror element or elements. When the current is excessive the voltage drop across current sensing resistor R19 increases to the point that transistor Q6 is turned on by current through resistor R18. This limits the base drive current to transistor Q4 which in turn limits the output current sensed by resistor R19. The circuit receives its supply from the IGN input terminal so that the mirror can be darkened only when the ignition switched circuit supplies voltage to the IGN terminal. Diode D5 protects the circuit from signals of negative polarity applied to the IGN terminal; and resistor R14 limits surge current to filter capacitor C5. An excessive voltage level at the IGN terminal causes diode D6 to supply current through resistor R17 turning on transistor Q6 and turning off transistors Q4 and transistor Q8. This prevents secondary breakdown of transistor Q8 due to excessive power dissipation caused by combined high collector current and high collector to emitter voltage on Q8. Series diodes D7 and D8 limit voltage to the mirror element in the event of a circuit failure.

Indicators and Switches

Figure 5E:
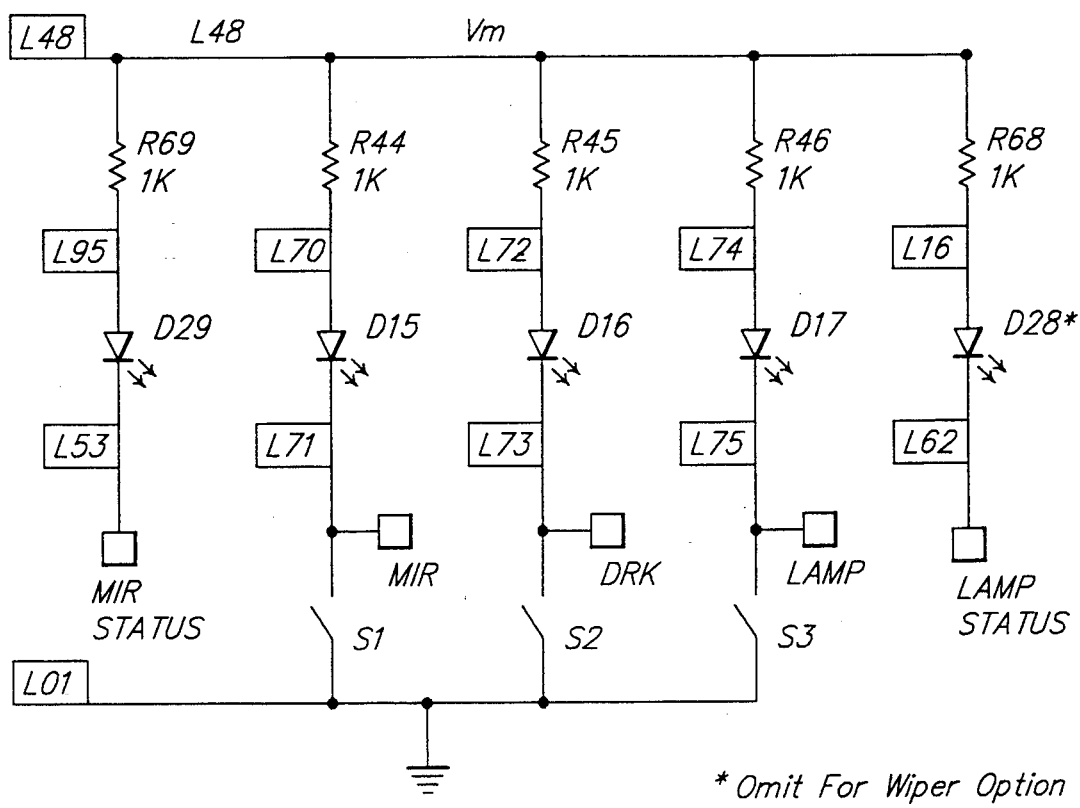

Referring to FIG. 5E, the mirror has three momentary pushbutton switches S1, S2, and S3 which are positioned for convenient operation. S1 is in series with light emitting diode D15 and current limiting resistor R44. MIR is connected to a bidirectional input/output pin 18 of the microcontroller. To light the indicator LED D15, the microcontroller pulls the MIR line low. To read the state of S1, the microcontroller momentarily interrupts any output drive signal which may be present and reads the level of the line. MIR is high when the switch is open and low when the switch is closed. An internal pull-up in the micro assures that the voltage on MIR with the switch open is high enough to register as a high rather than a low. The indicator LED D15 is visible through a small viewing window in the center of the switch actuator button. S1 is used to toggle the auto mirror function on and off. Switches S2 and S3 operate in the same way as S1 but are used for other purposes. For example, Switch S2 may be used in some mirrors to control sensitivity or to toggle the mirror into a dark mode. The dark mode is automatically terminated after a set time period if not toggled off earlier by actuating the switch again. Switch S3 is used to toggle the headlamp control feature on and off. LED D29 is in series with current limiting resistor R69 and is turned on by a low signal from the MIR STATUS output of the microcontroller. It is used to indicate that the mirror is being driven to a reduced reflectance mode. In a similar electrical configuration, LED D28 is lighted to indicate that the headlamps have been turned on by the control system.

The Microcontroller utilizes the switch inputs to determine the mode of operation which the user desires. For example, the dimming mirror function may be enabled or disabled alternately by successive depressions of switch S1. Likewise, the automatic headlamp feature is alternately enabled and disabled by successive depressions of S3. Light emitting diode D15 is lighted to indicate that the automatic dimming feature of the mirror is enabled. Light emitting diode D17 is lighted to indicate that the automatic headlamp on/off feature is enabled. The switches are active only with the microcontroller is operating. Condition settings such as the active/inactive state of the headlamp control are stored in the EEPROM memory so that they can be retained and during power down and reinstated the next time that the vehicle is used. The LAMP STATUS LED D28 is omitted when the wiper option is used. This is only due to the need to allocate the limited number of I/O pins for the microcontroller which is used.

Mirror Control—Light Sensors

Referring to FIG. 5F, the operation and the novel features of the light level logarithmic analog to digital conversion process is covered in detail in another section and will not be repeated here. The ambient light sensor R41, its series resistor R40, and the comparator U1/C, correspond, respectively, to RA, R101, and A101 in the simplified circuit of FIG. 1. Resistor R31 and capacitor C14 correspond to resistor R105 and capacitor C105, respectively, of the simplified circuit of FIG. 1. R33 is the rearward light sensor which corresponds to RR in FIG. 1. A range select circuit comprised of resistors R37, R38, R39 and transistor Q13 has been added to provide a low sensitivity mode of operation. To activate this mode, the microcontroller pulls RANGE low turning on transistor Q13 and effectively paralleling resistor R39 with resistor R32. A higher light level from the rear is then required to increase the conductivity of photoresistor R33 to achieve a given voltage level at L51 than is required to achieve the same voltage level when RANGE is high and transistor Q13 is turned off. In either range, the remainder of the control circuit responds identically to the level of the voltage on L51 so that this ratio of light levels which produce the given voltage level is maintained as the effect of the range selection on mirror sensitivity. Thus in the normal, high sensitivity mode resistor R32 is equivalent to R102 of FIG. 1 and in the low sensitivity mode, the parallel combination of resistors R32 and R39 is equivalent to resistor R102 of FIG. 1. The microcontroller switches the RAMP output from low to high to initiate the increasing ramp and from high to low to initiate the decreasing ramp. Timing to the points where the comparators change state is performed by a counting loop which includes a check of each of the comparator inputs each time that the software counter is incremented. The count may be momentarily interrupted without adverse effect on the timing by switching the RAMP output of the microcontroller to its high impedance three state mode during the interruption. When the RAMP output is in the high impedance three state mode, the voltage on capacitor C14 remains nearly constant and when the high or low RAMP output is reinstated after the pause, the voltage ramp on the capacitor and the associated timing are resumed. Shorter time constants, faster counting and/or larger counts providing higher resolution can be attained by using a more sophisticated microcontroller which includes counter/timer circuits dedicated to this purpose. The microcontroller can then be freed from the time consuming counting process. In the present application a substantial portion of the microcontroller time is allocated to the counter, timer process since the other functions required of the microcontroller do not consume a lot of time. This results in a cost saving.

Values of capacitors C8 and C9 are too small to have a substantial effect on the light level readings except that they filter out electromagnetic interference and ripple in light from AC operated street lights reducing errors which would otherwise be caused by these factors.

Headlamp Control Sensor and Delay Time Potentiometer

Figure 5G:
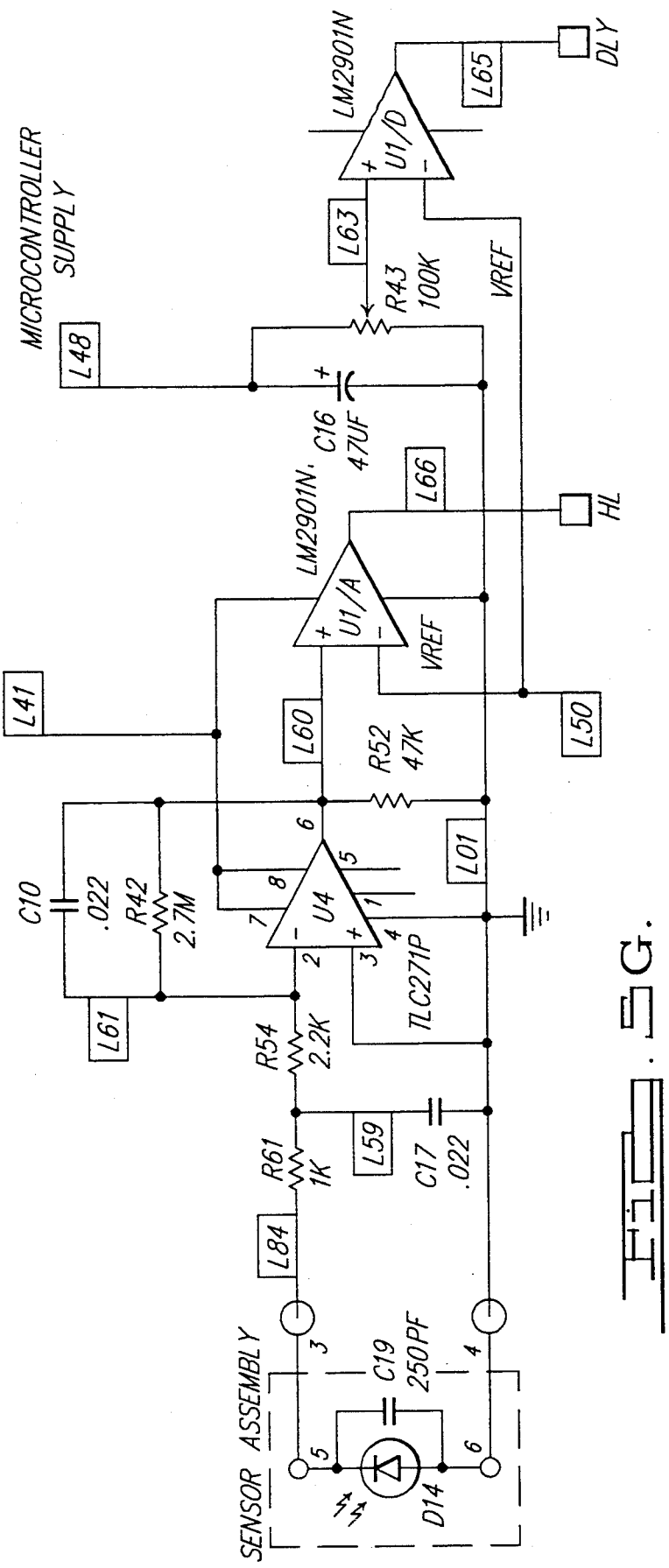
Figure 5A:
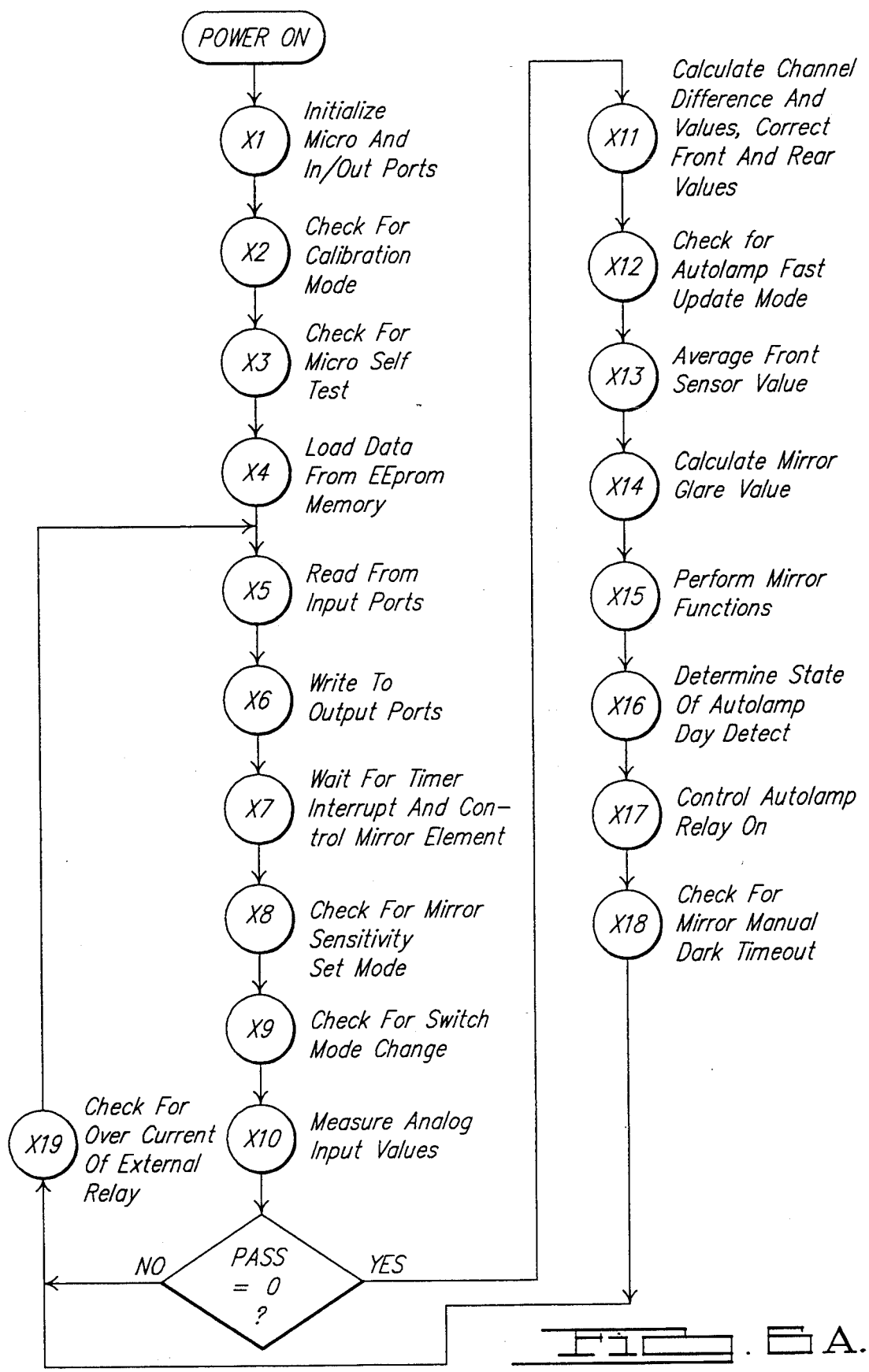
Figure 6D:
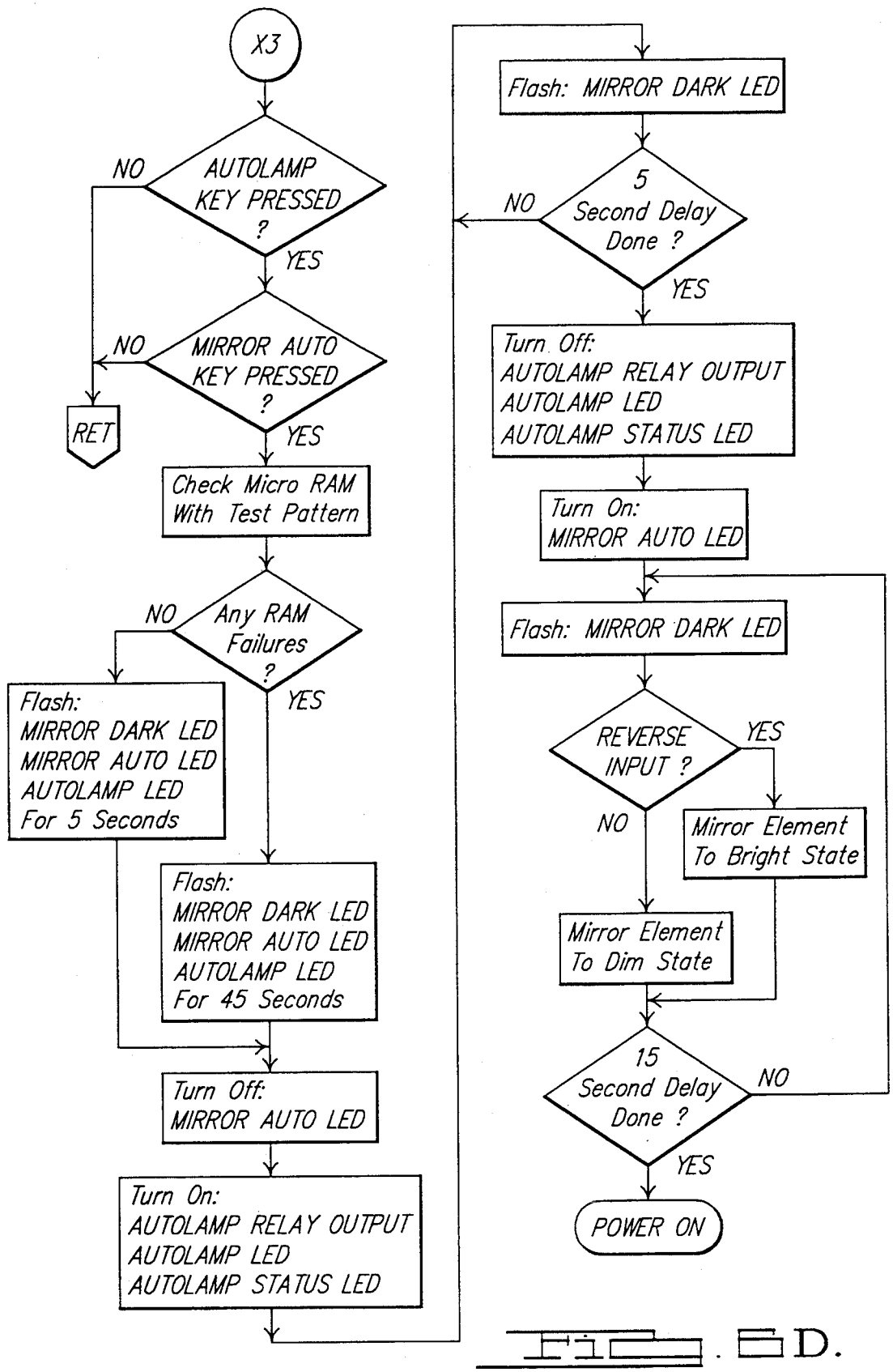
FIGS. 6A through 6U are flow diagrams indicating the subroutines which are sequenced by the microcontroller in the process of controlling the automatic mirror and headlamp functions.
Figure 5E:
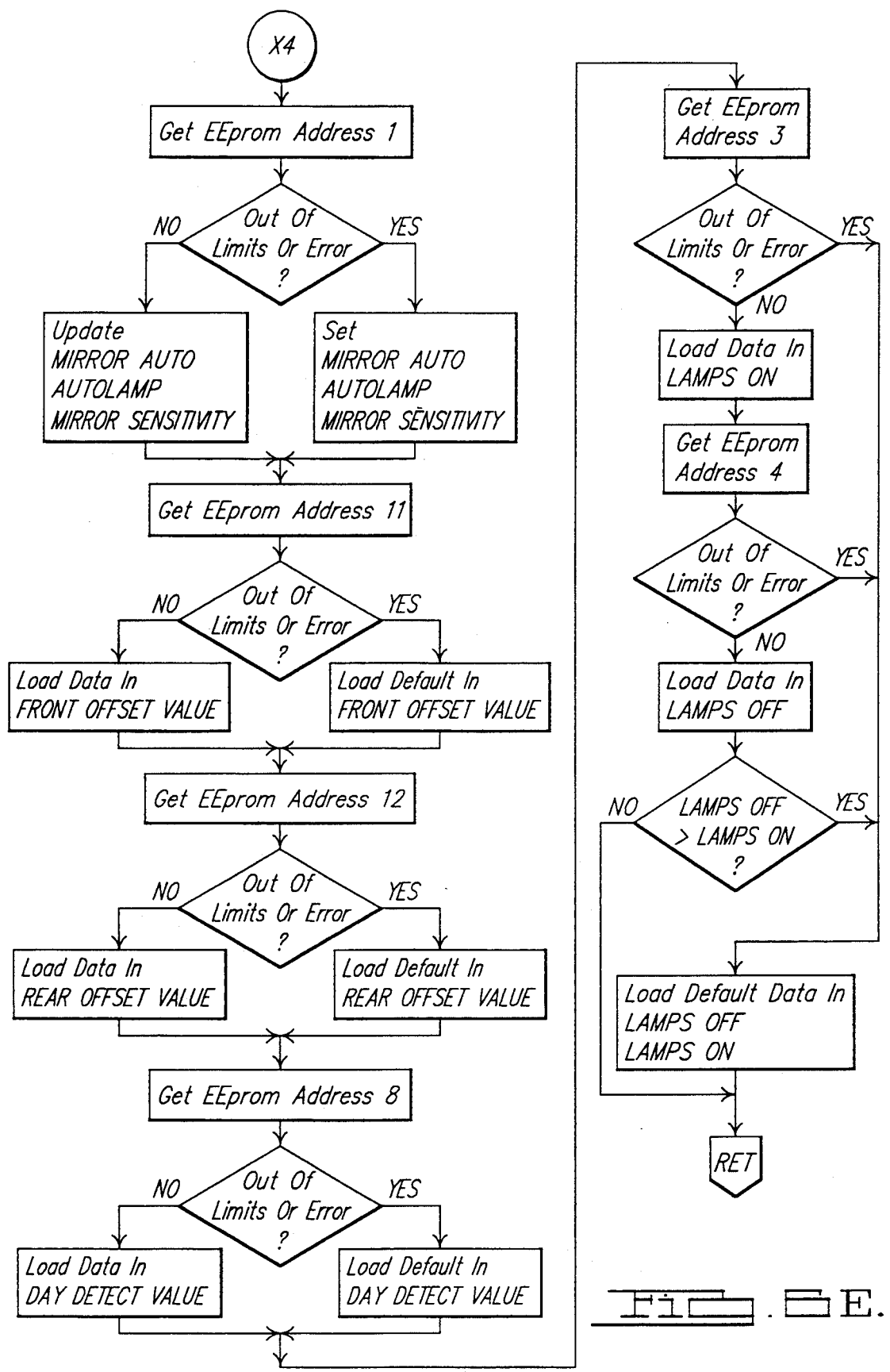
Figure 6F:
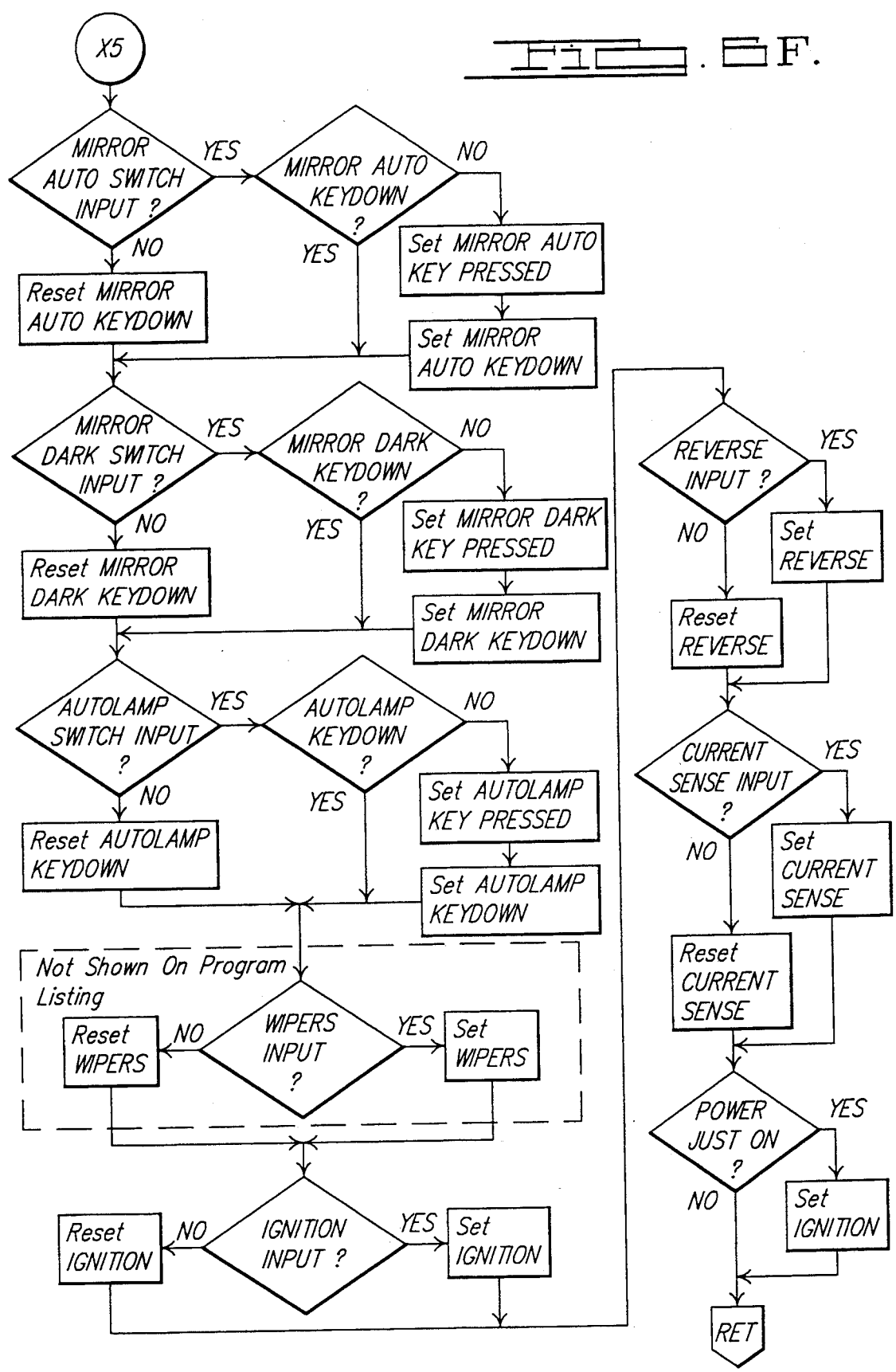
Figure 8H:
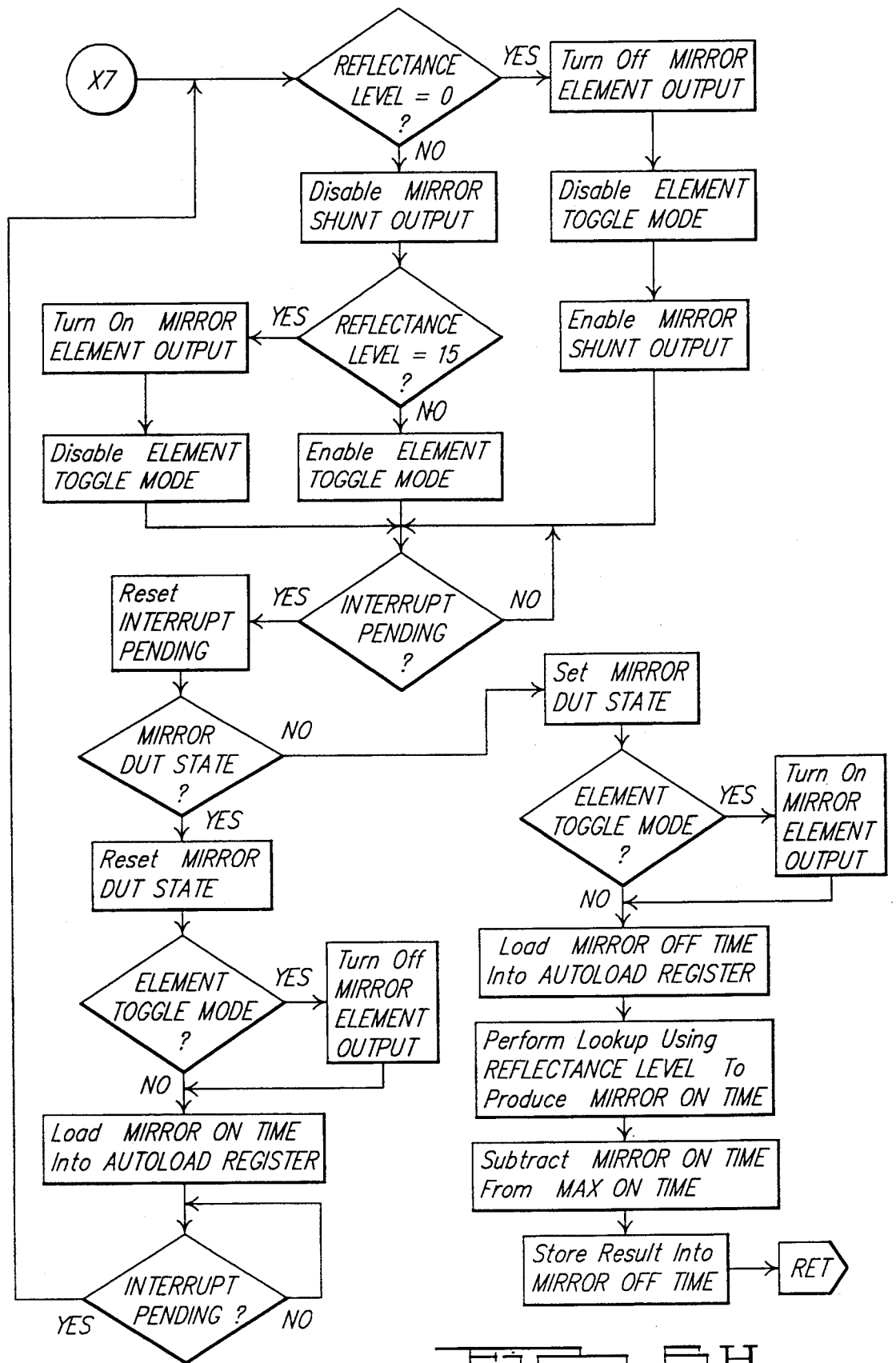
Figure 51:
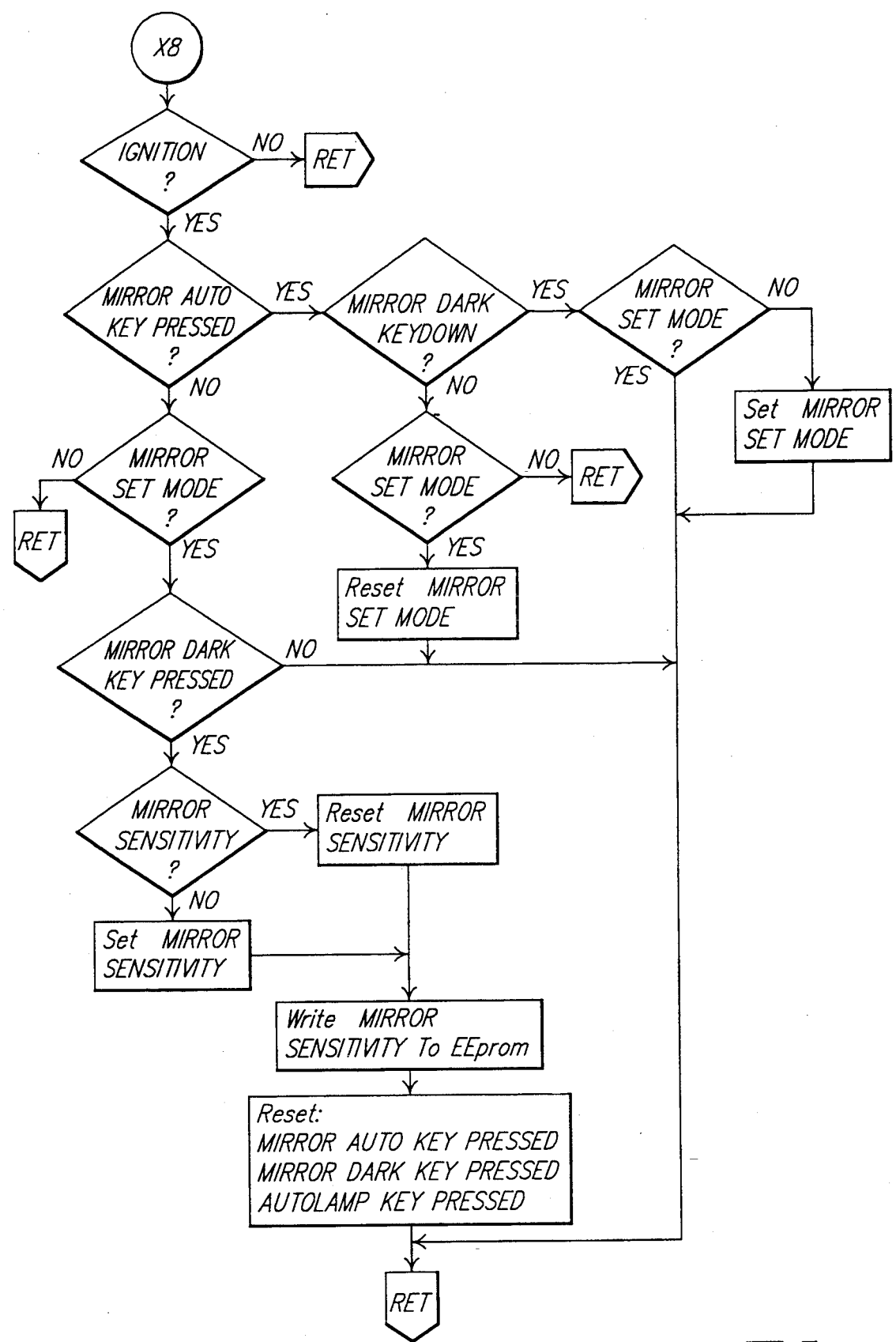
Figure 5J:
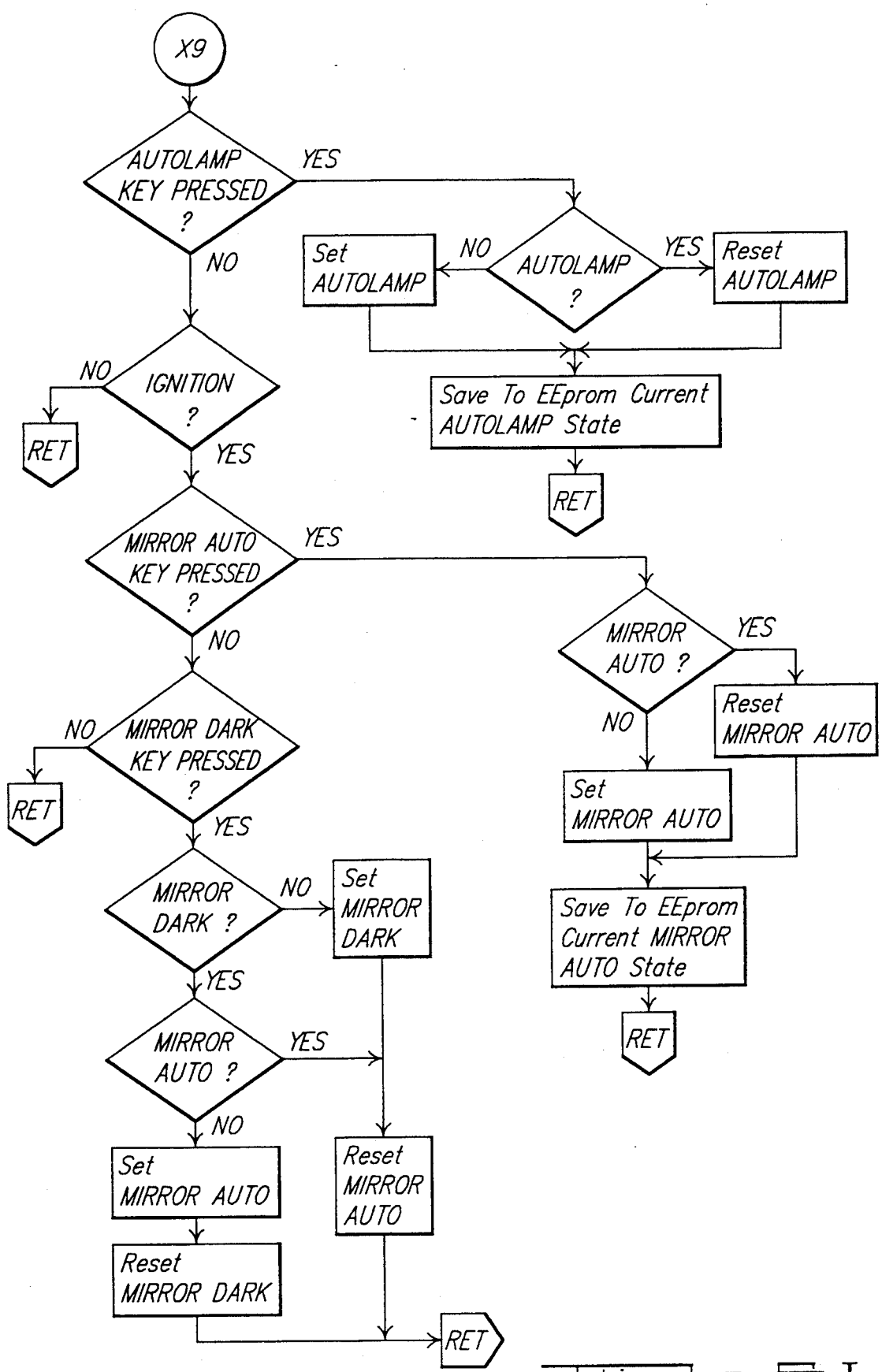
FIG. 5 is a schematic circuit diagram of an electronic control system embodying the present invention.
Figure 6L:
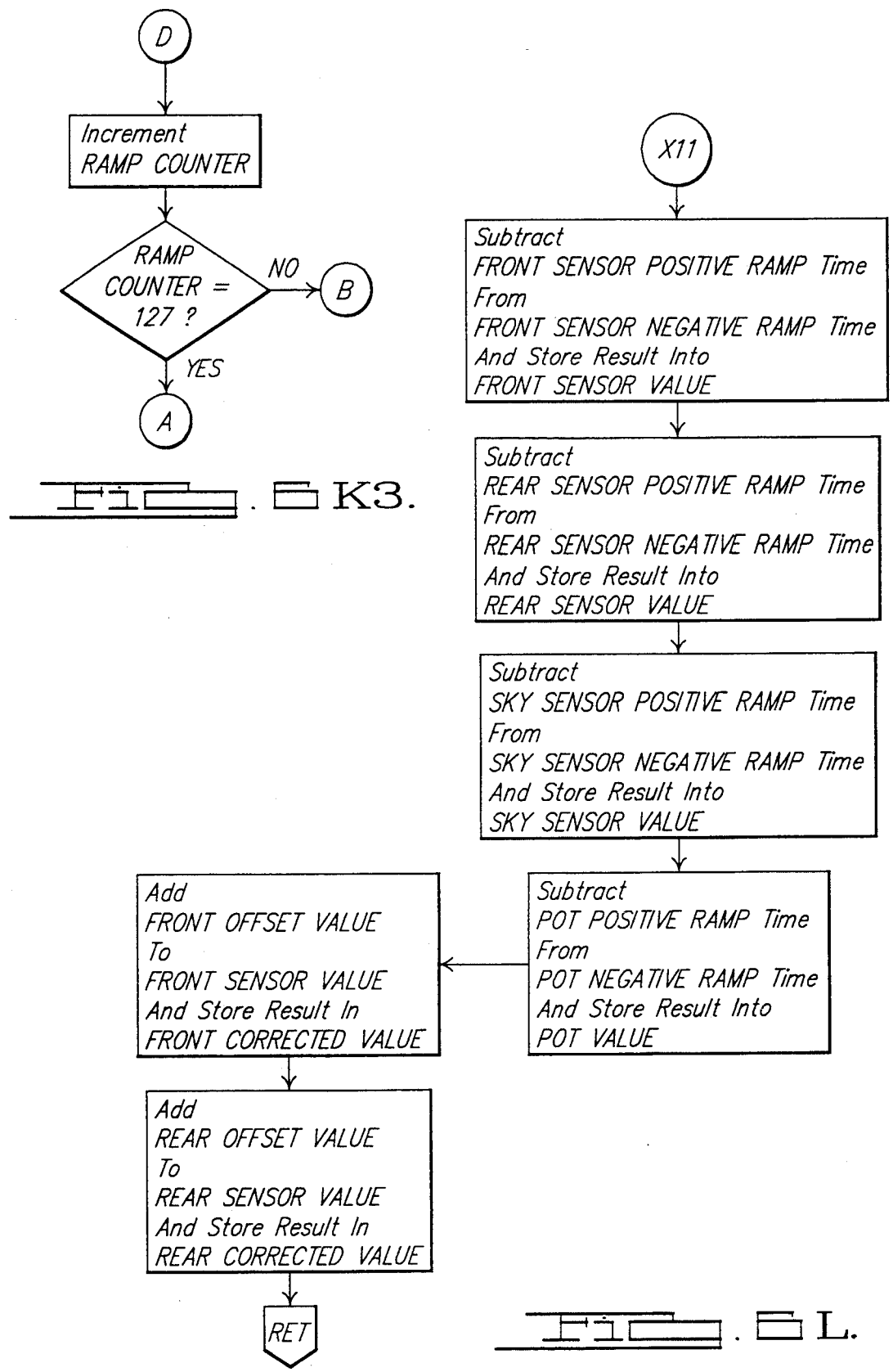
Figure 8M:
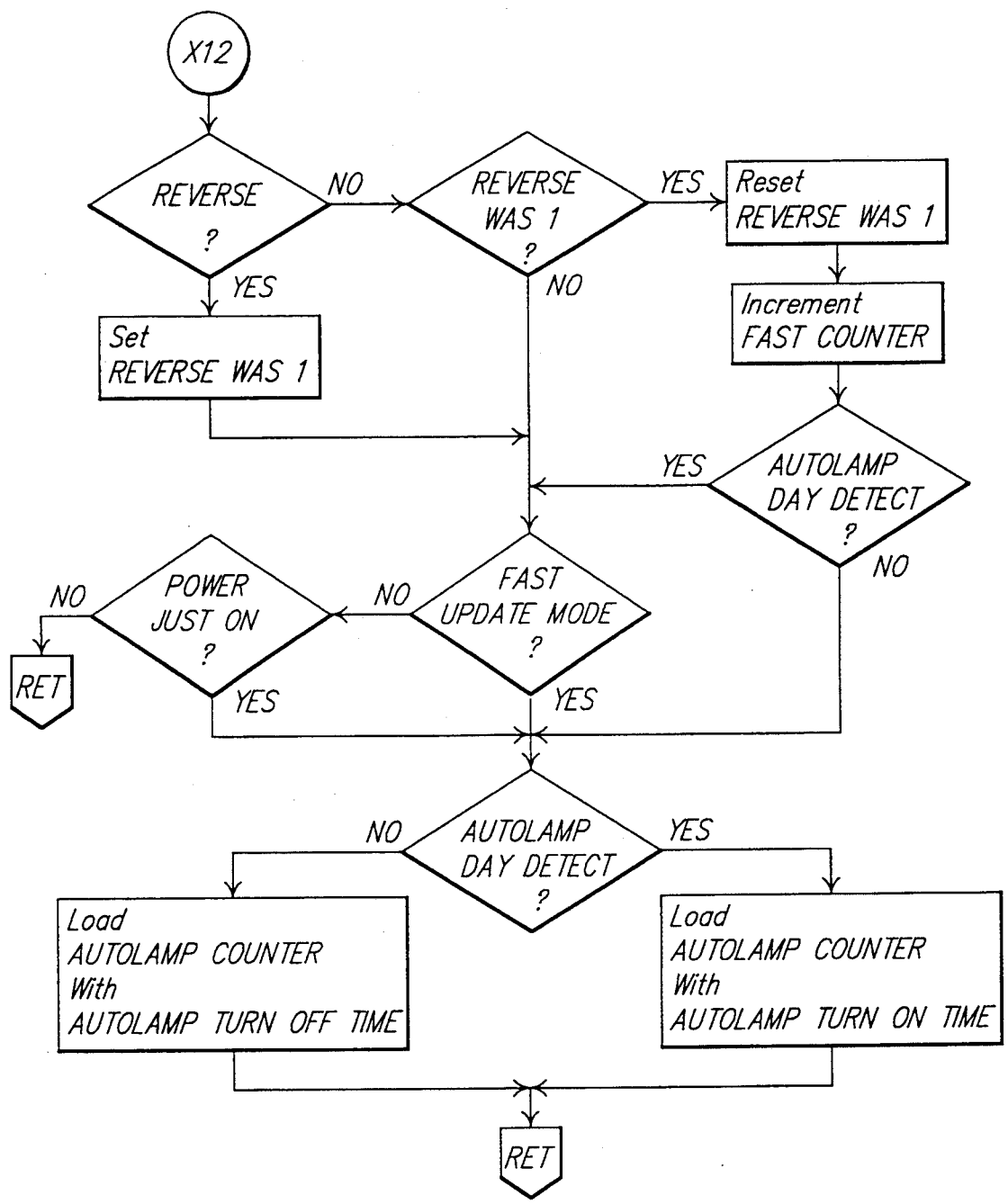
Figure 5N:
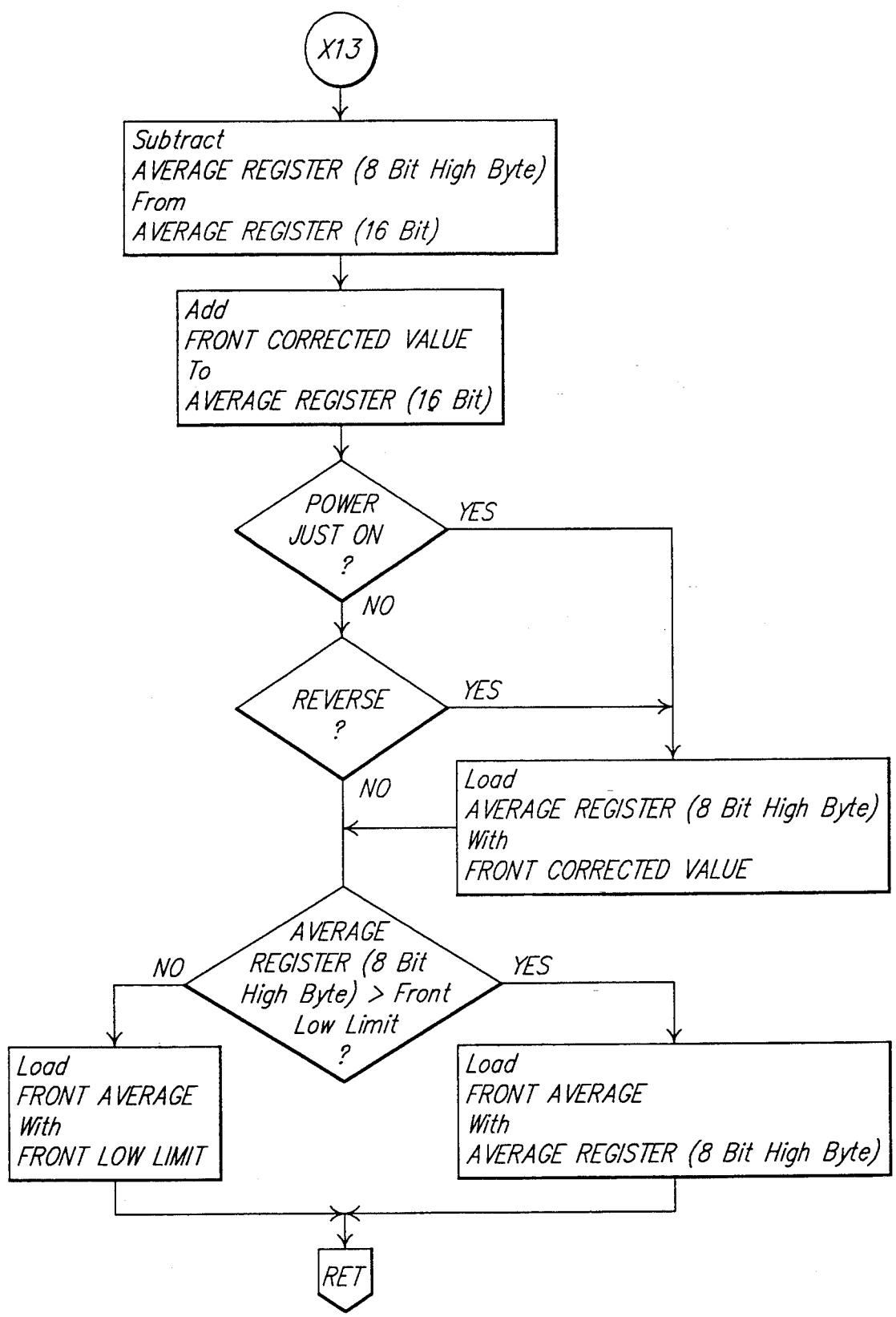
Figure 5Q:
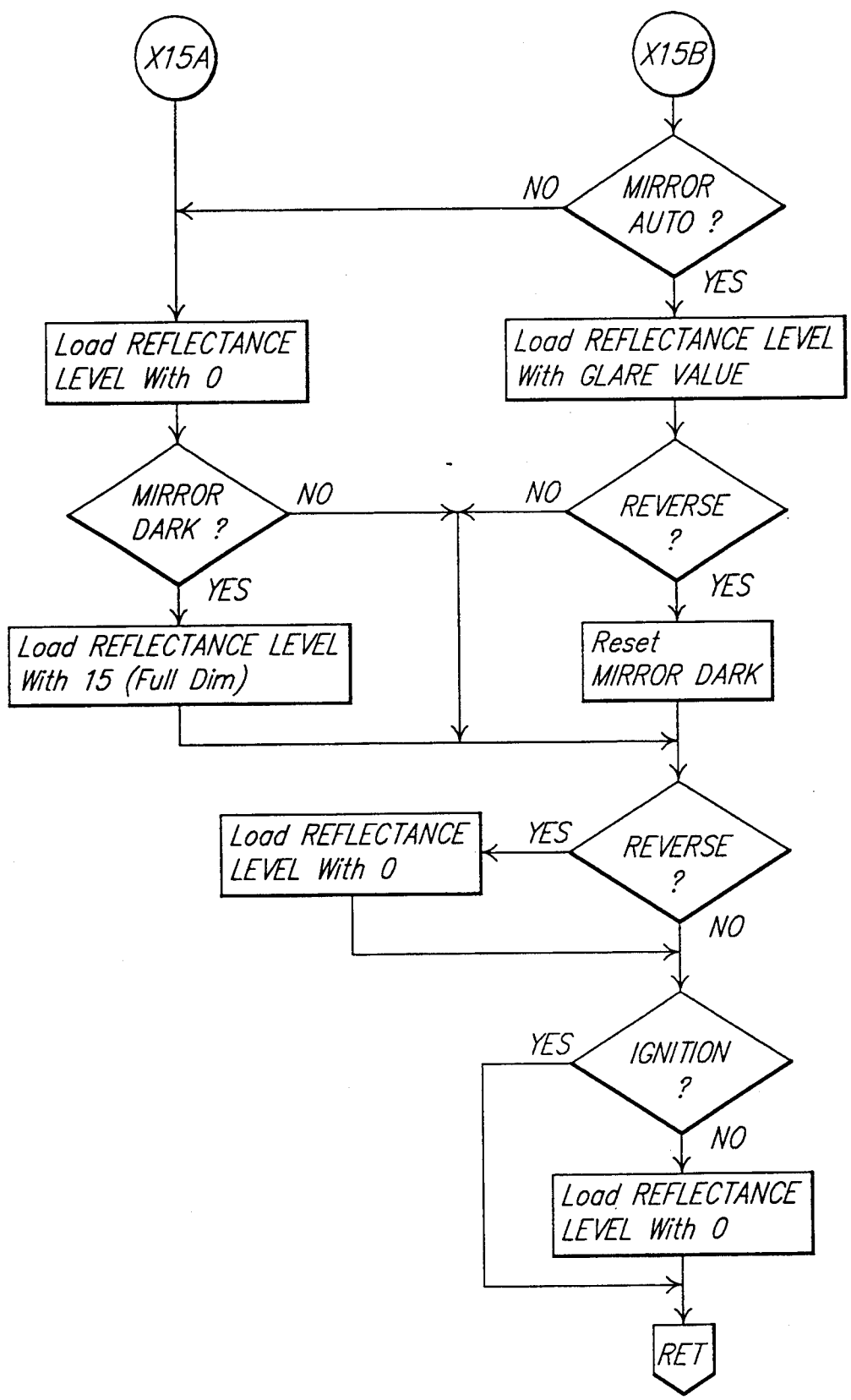
Figure 8R:
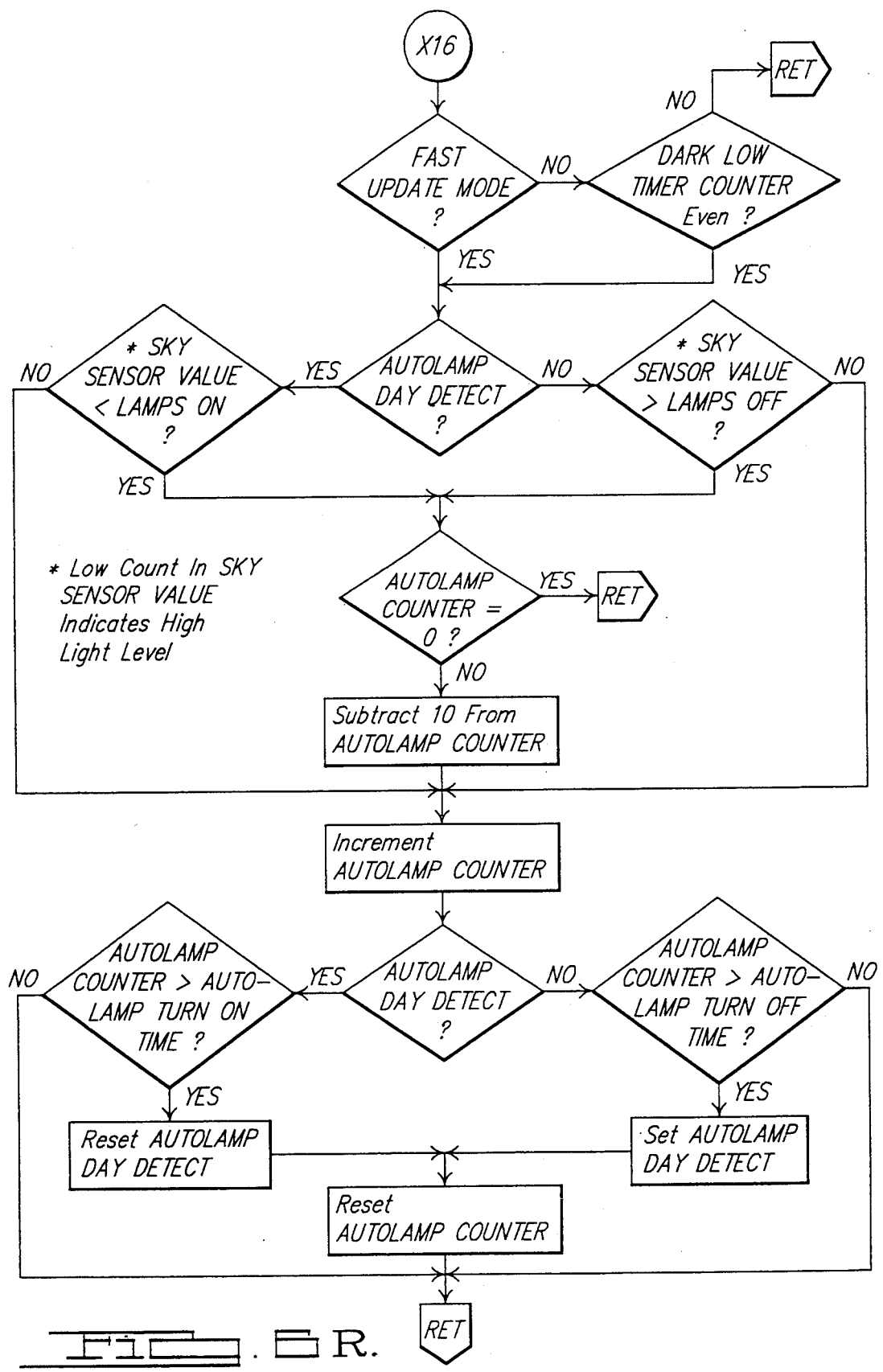
Figure 5T:
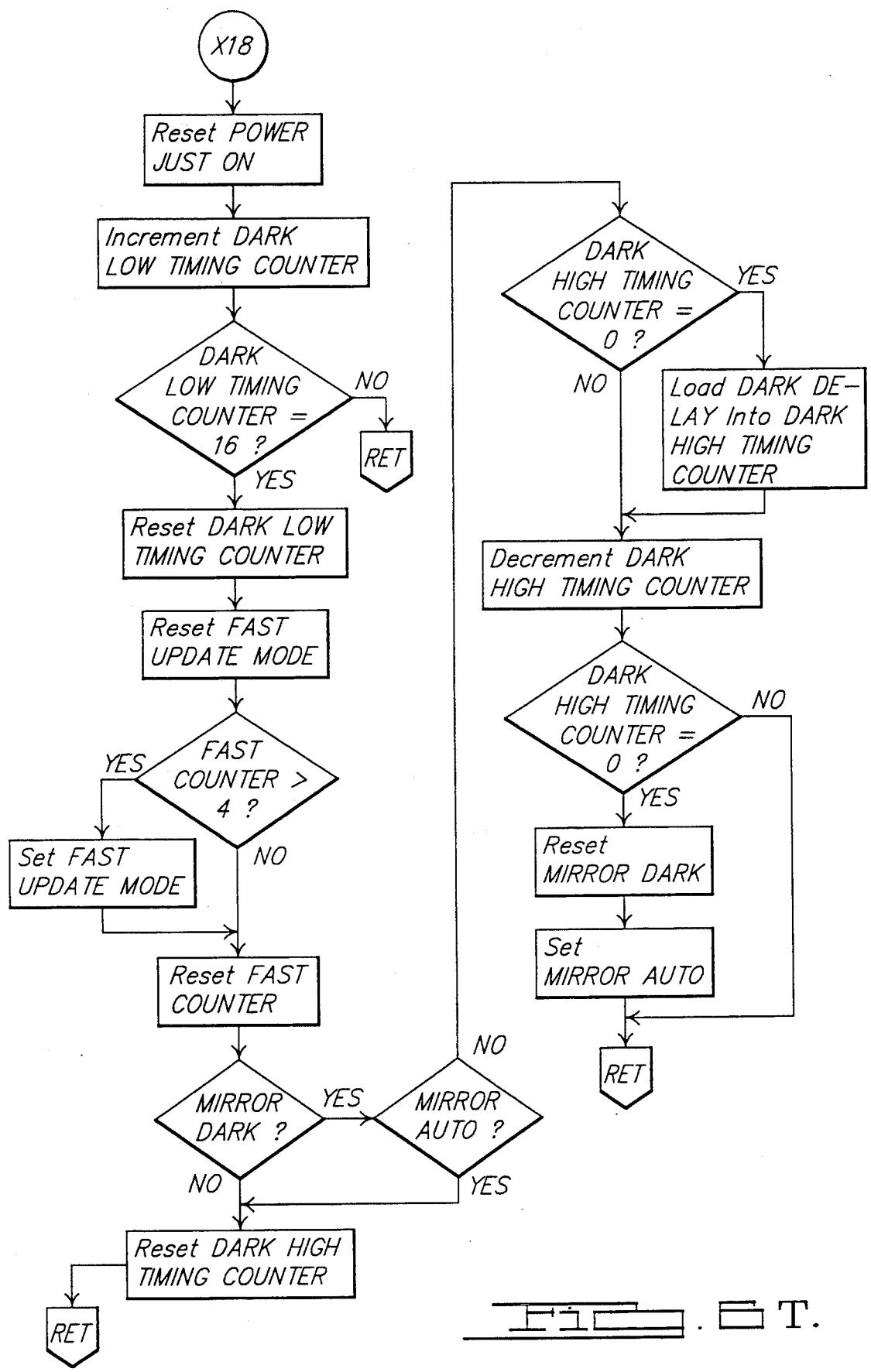

Referring to FIG. 5G, D14 is a photodiode with an integral infrared rejecting filter which is directed toward the sky and which has a large viewing angle. Operational amplifier U4 has a high input impedance and maintains near zero volts across D14 to minimize leakage currents, particularly at high ambient temperatures. C19, R61, C17, R54, and C10 are all part of a filter network. The time constant of C10 and R42 is short (about 0.06 second) so this filter functions more to minimize the unwanted effects of interference and the ripple present in artificial light sources than to produce any more pronounced filtering effects. Longer time delays and added digital filtering is done by the microcontroller. R42 is the feedback resistor which determines the sensitivity of the sensing circuit.

R43 is a slide potentiometer used by the driver of the vehicle to adjust the length of time that the headlamps remain on after the ignition is turned off. Comparators and their associated outputs HL and DLY are used by the microcontroller in combination with the timing count and the ramped signal VR to perform the digital to analog conversion as described with the simplified configuration.

Headlamp Relay Driver

Referring to FIG. 5H, when the automatic headlamp on/off feature is active, the microcontroller determines when the headlamps should be on and pulls the RELAY line high to energize the external headlamp relay(s) through output L82 and optionally also through L52. These external relays then energize the headlamps, tail lamps, and running lights on the automobile. The circuit contains a latch which will be described in more detail below to retain the relay output(s) and thus the automobile lights in their present state be it on or off when the RELAY line is allowed to float. This feature is included so that the headlamps will not be turned off when the automotive supply voltage falls below the nominal 8 volt level at which the microcontroller is reset. This is likely to happen if a driver stalls the vehicle engine and is attempting to restart it. If the vehicle engine happens to stall on a dark highway, the driver's attention is diverted by the necessity to start the vehicle engine so that operation of the manual light switch to prevent the headlamps from going off will not be the first thing on his or her mind. Loss of lights in such a condition might result in a disastrous accident. The microcontroller places the RELAY line in the floating, three state, condition when it is reset. It also leaves the line in the floating condition on power up until it has made a positive determination of whether the lights should be turned on or off. In this way, the lights will not be turned off for a period of time after the stalled vehicle engine is restarted and the voltage level has recovered to the point that the microcontroller comes out of reset. The latch circuit, when latched to hold the lights on, will remain latched until the automotive supply voltage falls well below 5 volts.

In more detail, a positive voltage on the RELAY output from the microcontroller causes current to flow through resistor R67 into the base of transistor Q21 turning it on causing current to flow through resistor R66 to the base of transistor Q14 turning it on. Current flows from the collector of Q14 through resistor R63 and into the base of transistor Q21 holding it on and completing the latching action. The circuit remains in the latched on state when the microcontroller places the RELAY output in the high impedance "three state" mode. The latching action is interrupted turning the circuit off when the microcontroller pulls the RELAY output low diverting current from the base of transistor Q21 and turning it off. When the latch is on, current from the emitter of Q21 flows to the base of transistor Q16 turning it on pulling terminals at L52 and L82 low to energize the external headlamp relays. In some designs, jumper J3 is optionally replaced with a diode so that if L82 is pulled low by an external means, the relay connected to L52 will not be turned on also. This is done when the automobile manufacturer has other lighting control devices which selectively light the automobile's lights, for example, the headlamps only.

Resistors R65, R64, and R48 prevent leakage currents from turning on transistor Q14, Q21, or Q16, respectively. Capacitor C18 prevents momentary interference from activating the latch and turning the headlamps on. When the latch is on, current flows to the emitter of transistor Q14 from the base of transistor Q9. This turns on or holds on the supply to the microcontroller so that it can turn the lights off following the delay time after the IGN is turned off. Diode D20 protects transistor Q16 from reverse voltage. Resistor R51 senses current flowing from L82 or L52 through transistor Q16 so that a short circuit condition causing excessive current to flow, causes current to flow through resistor R50 into the base of transistor Q15 turning it on. Turn on of Q15 pulls the RELAYCS input to the microcontroller low to signal the microcontroller to turn off the relay output and to try periodically to see if the short condition is cleared. Turn on of Q15 also draws current through diode D18 from the base of transistor Q16. This limits the current conducted by Q16 to the short circuit threshold value. This current limiting action is adequate for the short term but the current limiting threshold is about 1 ampere and the voltage across Q16 may be about 12 volts dissipating about 12 watts. Prolonged dissipation at this level would destroy Q16 because it is not attached to a heat sink. The microcontroller samples the RELAYCS line several times a second and pulls RELAY low turning off the output if a short is detected. Periodic tries to turn on the relay output to see if the short has been cleared are spaced so that the average power dissipated by Q16 does not exceed acceptable limits. Diodes D19 and D26 conduct to absorb the inductively generated spike generated by the external relays when Q16 is turned off. The voltage at L37 is a little lower than the supply voltage. Zener diode D26 is included to prevent the small current which would otherwise flow from the relay input through D19 when Q16 is not turned on.

FLOW DIAGRAM DESCRIPTION

Referring to the flow diagrams and to the section entitled FLOW CHART PARAMETERS which lists and describes the memory registers, a short description is included with each memory register. When the mirror is wired in its normal configuration and the driver turns on the ignition switch, power is supplied to the microcontroller first energizing it and then switching the power on reset to the power on state. The microcontroller which may be easily programmed in accordance with conventional microprocessor practice then starts at the POWER ON entry point in the program. The first part of the flow diagram which begins at POWER ON indicates the subroutines which are sequenced by the microcontroller in the process of controlling the automatic mirror and the automatic headlamp functions.

The first subroutine at X1 initializes the microcontroller memory and memory registers, the mode of the input ports, and the state of the output ports. The subroutine at X2 checks to see if the CAL input pin I3 is held high indicating that a special factory calibration is to be performed. If I3 is high indicating the special calibration requirement, the routine waits for I3 to go low and measures the length of time I3 remains low before it returns to the high state. The time duration indicates the calibration function to perform. X2 then performs the indicated function. Subroutine X3 checks for simultaneous depression of the AUTO MIRROR and the AUTO HEADLAMP switches and performs the self test diagnostic function if both are depressed. Routine X4 does an integrity check of the calibration and switch setting data stored in the EEprom and performs the appropriate initializations using default data wherever the conditions of the integrity checks are not met.

The above sequence completes the special tasks which are performed only at power up. The sequence including X5 through X10 and X19 includes the measuring routine X10. The loop is executed four times before proceeding to X11. The algorithm described in detail in the simplified diagram of FIG. 1 is used. Each execution of the loop takes 25 milliseconds. X5, X6, X7, X8, X9, X10, and X19 are included in the loop so that these tasks will be performed at 25 millisecond intervals. The total measurement takes four passes for a total of 100 milliseconds. On the 0th pass, the RAMP output is held low so that the exponential ramping capacitor settles very close to its most negative value. On the 1st pass, the RAMP output is switched high and the times at which the increasing negative exponential waveform matches the signal voltage from the glare sensing circuit, the ambient light sensing circuit, the sky sensing circuit, and the potentiometer sensing circuit, respectively, are noted. On the 2nd pass, the RAMP output is held high so that the exponential ramping capacitor settles very close to its most positive value. On the 3rd pass, the RAMP output is switched low and the times at which the decreasing negative exponential waveform matches the signal voltage from the glare sensing circuit, the ambient light sensing circuit, the sky sensing circuit, and the potentiometer sensing circuit, respectively, are noted.

In the X5 subroutine, new closures of and the present state of the MIRROR AUTO, the MIRROR DARK, and the AUTOLAMP switches are recorded. The states of the REVERSE, the OVER CURRENT, and the IGNITION inputs are recorded. In X6 the correct values are written to the status LED's and the AUTOLAMP relay output. In X7 the mirror shorting transistor is turned on when the mirror is supposed to be clear and off otherwise by turning the MIRROR SHUNT output on or off, respectively. The MIRROR ELEMENT output is turned on to drive the mirror to its minimum reflectance state. For intermediate reflectance levels, the ELEMENT TOGGLE mode is set. The routine then delays until the start of the next 25 millisecond interval. The X7 routine then has a special branch to control the dark state and interval in the test mode. For the normal mode with the partially darkened TOGGLE mode, the MIRROR ELEMENT output is turned on and the off time part of the 25 millisecond duty cycle is loaded into the microcontroller hardware AUTOLOAD REGISTER. The MIRROR ELEMENT output remains on for the 25 milliseconds minus the off time and is then turned off until the cycle is repeated. Next, the off time for the next cycle is computed.

The X8 routine is used to set the sensitivity mode. The mirror has high and low sensitivity modes which are set by outputting, respectively, a high or low level on the RANGE output. The set mode is entered when the user, while holding the MIRROR DARK key depressed, momentarily depresses the MIRROR AUTO key. The MIRROR AUTO led flashes to indicate that the mode is active. While in the mode, the sensitivity setting is toggled alternately between high and low each time that the MIRROR DARK key is depressed. While in the mode, the selection of the high (low) sensitivity setting is indicated by the MIRROR DARK led being lighted (dark). The MIRROR AUTO key is depressed to exit the mode. X8 checks for the above stated key depression sequence and toggles the MIRROR SENSITIVITY register when the key sequence is detected. In X19 the over current condition for the relay output is checked and when present, the relay output is turned off to be tried again in one second.

In X9, the AUTOLAMP, MIRROR AUTO, and MIRROR DARK modes are adjusted in response to switch depressions which were recorded in the X5 routine.

The X10 subroutine implements the logarithmic conversion algorithm which is described in detail in connection with the simplified circuit of FIG. 1 and the timing and waveforms of FIG. 2. One difference between the waveforms of FIG. 2 and the actual waveform of the implementation should be noted as both fall within the invention. In FIG. 2, it is only necessary that the total time of the increasing ramp be long enough to allow for all measurements to be finished and to allow adequate settling (which could be forced by additional switching) before the reversed ramp is begun. For pictorial clarity, FIG. 2 is shown with a minimal settling time. In the implementation, The VREF RC time constant is 2.67 milliseconds, the measuring period is 9.3 milliseconds, and the total period for each ramp of VREF is 50 milliseconds. Thus, shown to scale, VREF would rise very rapidly after t1=0 and fall very rapidly after t2=0 giving the VREF waveform an almost square wave appearance and making illustration very difficult. The advantage of performing the measuring as quickly as practical is that the remaining time can be used for the other routines and the time period can be further divided as is done in the implementation. Two 50 millisecond passes could be used instead of the four 25 millisecond passes and very adequate settling for each half of the VREF ramp could be obtained in as little as 18 milliseconds if greater sampling speed were required. The four passes are used to sequence the other routines X5 through X9 and X19 at the faster 25 millisecond rate.

In X10 on passes 0 and 2, no measurements are taken and the VREF ramp voltage is allowed to continue to settle. For passes 0 and 2 the microcontroller immediately exits X10 and sequences the other routines. On pass 1 X10 initiates the positive ramp of VREF by switching the RAMP output to the positive microcontroller supply voltage. On pass 3 X10 initiates the negative going ramp of VREF by switching the RAMP output to ground. The microcontroller then initializes the timing loop counter and proceeds to check for the comparator input transition for the FRONT SENSOR, REAR SENSOR, SKY SENSOR, and POT inputs. The microcontroller has a ceramic resonator as its oscillator and the loop is a consistent length so that the loop count serves as an accurate timer. When a transition is detected for the FRONT SENSOR, REAR SENSOR, SKY SENSOR, or POT comparator inputs, respectively, the loop count which serves as the time measurement is stored in the FRONT POSITIVE RAMP, REAR POSITIVE RAMP, SKY POSITIVE RAMP, OR POT POSITIVE RAMP register, respectively, on pass 1 and in the FRONT NEGATIVE RAMP, REAR NEGATIVE RAMP, SKY NEGATIVE RAMP, OR POT NEGATIVE RAMP register, respectively, on pass 3. Note that for the increasing ramp of pass 1, these timing counts correspond, respectively, to tA1, tR1, tS1, and for the decreasing ramp of pass 3, tP1 of FIG. 2 and they correspond, respectively, to tA2, tR2, tS2, and tP2. One point in X10 is that it takes an additional time to store the timing count when a comparator match occurs. To compensate for this the RAMP output is placed in its high impedance three state mode to place the ramp on hold during this additional time period. The RAMP output is reinstated at the end of the additional time period and the VREF ramp resumes. This preserves the accuracy of the ramp for any remaining input measurements. The full scale measuring range is reached after 127 passes through the compare loop and the PASS count is incremented modulo 4 before exiting the routine.

X19 is entered at 25 millisecond intervals before returning to X5. The CURRENT SENSE over current input from the headlamp relay circuit indicates an over current fault condition which is normally the result of a short. When the over current condition is present, the autolamp RELAY output is deenergized to be tried again after one second.

X11 through X18 are sequenced at a 100 millisecond rather than a 25 millisecond rate. Processing routines for the calculations and other routines which do not have to be performed at the higher repetition rate are included here.

X11 through X18 are entered at 100 millisecond intervals after data for a new set of reading has been taken. X11 computes the difference between the time for VREF to match the input signal level for the increasing exponential ramp and the time to match the input signal level for the decreasing exponential ramp for each of the four measured variables i.e. the FRONT SENSOR, REAR SENSOR, SKY SENSOR, and POT. These differences correspond, respectively, to tA1−tA2, tR1−tR2, tS1−tS2, and tP1−tP2 of FIG. 2 as detailed in the description of the measuring algorithm described in association with FIG. 1. Also X11 performs a calibration correction on the front and rear sensors. These correction numbers were computed in a calibration made in X2.

In X12, a count called FAST COUNT is incremented each time that a change in the state of the REVERSE input is detected. Sustained toggling of the REVERSE input state every 100 milliseconds is used to initiate a fast update mode which bypasses the normal delay in switching the headlamps on or off when a change in light conditions occur. This is to facilitate testing and calibration of the automatic headlamp control portion of the system. After initialization, the sky light reading must exceed the daylight threshold for 35 seconds before the RELAY output is pulled low to turn off the vehicle headlamps. Likewise the sky light reading must fall below the night time threshold for 20 seconds before the RELAY output is pulled high to turn the headlamps on. In the fast update mode the timing AUTOLAMP COUNTER used to control this delay is set to its threshold value so that timeout and the resulting response to a change from the autolamp sensing the day or the night condition will not be delayed. When the vehicle has just been taken out of "Reverse" gear, the delay in turning the headlamps off is bypassed but the delay in turning the headlamps on is not bypassed. As explained previously, this eliminates the common problem of having the headlights come on in the garage and then having them stay on for the 35 second delay period after leaving the garage during the daytime. The delay timing is not bypassed in turning the lamps on because of the previously described problem of having the lights come on when parking in the garage.

In X13, the most recent front sensor reading is modified by comparing it with a minimum threshold that corresponds to about 0.2 lux. If the reading exceeds this value, it is not changed, if it falls below the value, it is replaced by the 0.2 lux equivalent value. This is done so that the mirror will not continue to become more sensitive when the forward light level falls below the range where it significantly reduces the sensitivity of the driver to glare. A 25.6 second time average is applied to the modified logarithmic front light level by adding 1/256th of the modified most recent reading to 255/256ths of the old average value every 100 milliseconds. This is accomplished by keeping a 16 bit, 2 byte value where the binary "decimal" point falls between the high and low bytes. Thus 255/256ths of the value is computed by aligning the high byte with the low byte position and subtracting it from the 16 bit value. The addition of 1/256 of the 8 bit modified most recent reading is done by aligning the value with the low byte and adding it to the 16 bit value. The average is initialized by writing the most recent reading directly into the high byte position whenever the vehicle is in reverse gear and whenever the first reading after power on reset is being processed. The integral high byte is the average value used in the glare level computation and the fractional low byte is not used except in the averaging process.

The glare level value is computed in X14. The glare value is computed as the corrected rear sensor reading minus the time average of the modified front sensor reading. Note that this corresponds to the logarithm of the ratio of the instantaneous rear light level divided by the logarithmically weighted time average of the modified forward light level. This value is saved and used by a subsequent routine to determine the dement drive voltage necessary to reach the desired reflectance level.

In X15, the microcontroller uses data accumulated on glare level along with the non-time-averaged front and back light levels, the operating mode as determined by the IGNITION input and the MIRROR DARK and MIRROR AUTO settings, and the REVERSE input to determine the reflectance level to which to drive the mirror element. If the non-time-averaged front light level exceeds the equivalent of about 30 lux, the DAY DETECT indicator is set to indicate the day condition and to inhibit darkening of the mirror. The indicator is reset otherwise. A lookup is used to translate the GLARE VALUE from X14 into a GLARE LEVEL value which will ultimately determine which one of sixteen drive levels to apply to the mirror element. If the light reading from the rear sensor is extremely low or the MIRROR DAY DETECT condition is set, the GLARE LEVEL is set to zero which signals the clear state for the mirror. The MIRROR DARK LED indicator is turned on when the GLARE LEVEL exceeds 5 and is not turned off until the GLARE LEVEL has fallen below 3 for at least one and half seconds. The GLARE VALUE is then set to zero if neither the DARK nor the AUTO MIRROR modes are active or if the REVERSE input is high indicating that the automobile is in reverse gear or if the IGNITION is off. The GLARE VALUE is set to 15 which is full dim if the MIRROR DARK MODE is on. Otherwise, the previously determined value is retained.

X16 maintains and monitors the AUTOLAMP COUNTER used to determine how long to delay switching of the headlamp state in response to changes in the sensed sky light condition. The routine is entered every 200 milliseconds except when in the fast 100 millisecond update mode. The counts are incremented only one count at a time when the AUTOLAMP DAY DETECT condition differs from the present autolamp state and are decremented by a net amount of 9 counts if the AUTOLAMP DAY DETECT condition agrees with the present autolamp state. The result is that successive DAY DETECT readings must be predominantly biased toward the alternate state for timeout to occur and for the autolamp to change state. On the other hand, periodic but relatively infrequent extraneous determinations of the AUTOLAMP DAY DETECT condition will not cause the device to remain in its current state indefinitely.

In X17, the condition where the IGNITION is turned off while the autolamp has the lights turned on is monitored. In this condition, the lights are kept on until the delay time determined by the POT DELAY setting has elapsed. Supplies to the microcontroller circuit are held on by the headlamp relay driver circuit. When the RELAY ON is reset, the RELAY DRIVER output is turned off and power to the microcontroller is also switched off until the ignition is switched on to again turn on the circuit. In the rare event that a transient condition causes the relay circuit to turn on, the microcontroller is energized and will correct the condition. The relay output has a latch which maintains its state when the RELAY output from the microcontroller is in the high impedance three state mode. Since the microcontroller goes to this state on power down and is not changed from the three stated RELAY ON high impedance output on the RELAY line to the set RELAY ON state positive voltage on the RELAY line or the reset RELAY ON state ground level voltage on the RELAY line until this routine is entered, the RELAY driver maintains its state until the automotive supply voltage falls to a level much lower than is normally encountered even while starting the vehicle engine. On the other hand, starting the vehicle engine can easily cause the automotive supply voltage to fall below the eight volt level where the microcontroller is likely to reset. This feature minimizes the likelihood that the lights will be turned off when a vehicle engine is stalled and is being restarted.

X18 performs two functions. First it automatically switches from the MIRROR DARK back to the MIRROR AUTO mode after 30 seconds if the driver does not turn the ignition off or change the setting sooner. The timing period is a programming option. There are several reasons for the option. The most important is that the automatic mode normally keeps the mirror dark enough so that the full dark mode is not frequently required. The driver's visibility and, thus, his or her safety is compromised by keeping the mirror in the dark mode when it is not necessary. The automatic return aids the driver when he or she forgets or neglects to return the mirror to the AUTO MIRROR mode. The other reason is that sustained darkening of the mirror in direct sunlight is both unnecessary and possibly damaging to the mirror element, and some mirrors experience a reversible but possibly annoying stratification of the darkening agents within the electrochromic cell when they are kept dark for abnormally long periods of time. X18 also checks to see if the REVERSE input has to completed at least 4 low to high input cycles in the last 1.6 seconds. The routine maintains a modulo 16 DARK LOW TIMING COUNTER which is incremented on each entry (10 times a second). The check routines are bypasses except when the counter reaches the overflow count of 16 each 1.6 seconds.

OPERATION OF THE MIRROR

Figure 4:
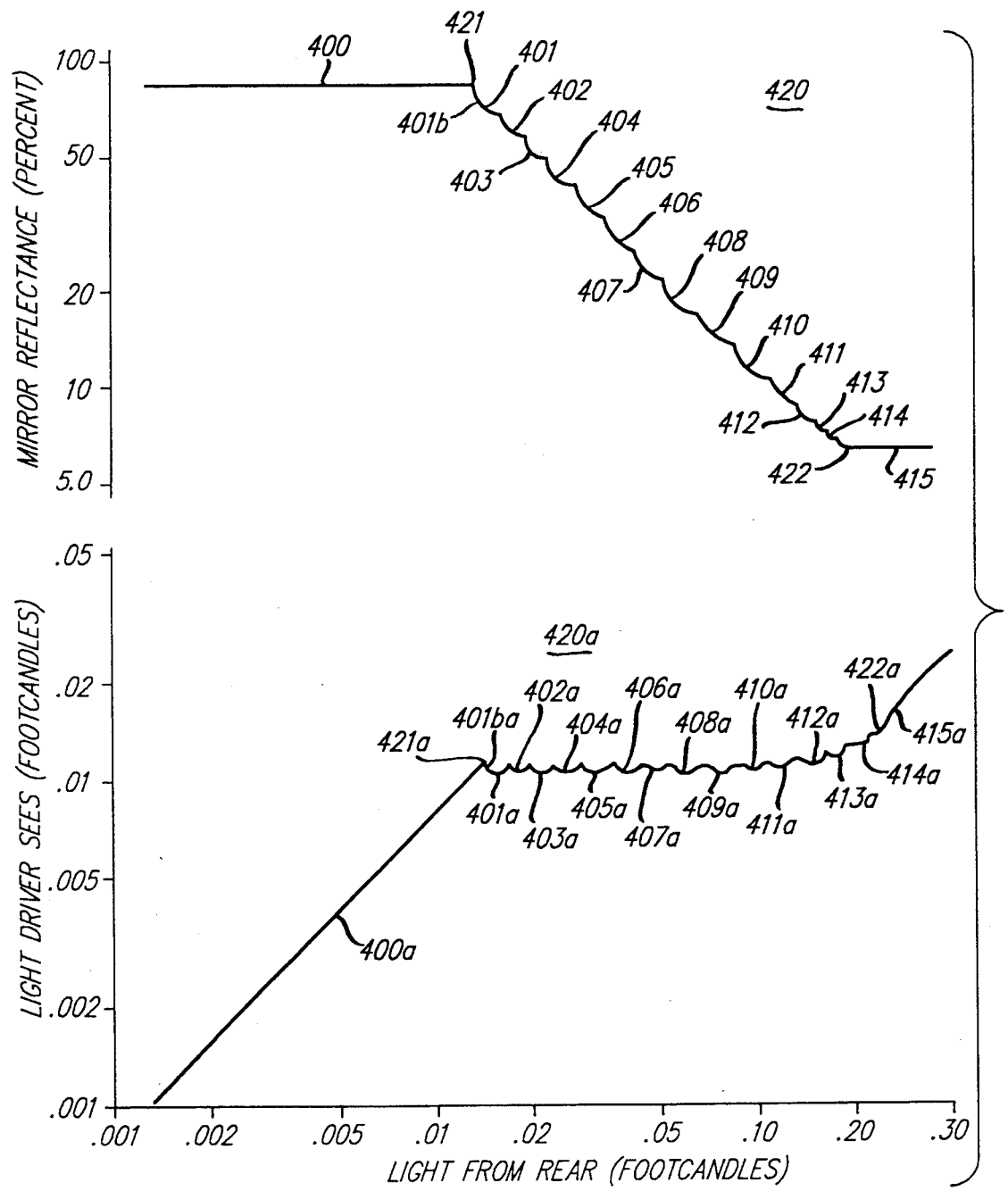
FIG. 4 is a composite of plots of mirror reflectance and of the level of the reflected light which the driver of a vehicle sees.

Two curves which indicate many of the features of the mirror performance when operated in its AUTO MIRROR MODE are shown in FIG. 4. While holding the light level on the front sensor constant at 0.1 footcandles, the light level from behind the mirror was increased slowly from 0.001 footcandle to 1.0 foot candle as shown on the horizontal axis. The vertical axis of the top curve 420 is a record of the mirror reflectance as a function of the back light level. The lower curve is a record of the corresponding intensity of the light which is reflected to the driver from the rearward source as a function of the rearward light level. The rearward sensor is preferably placed so that under normal conditions light from the same rearward source which strikes the rearward sensor is also reflected to the driver. The only real exception to this is when shadows obscure light selectively to the driver or to the sensor. The sensor is preferably positioned to minimize this likelihood. Curve 400a is for the normal situation where neither the driver nor the sensor are obscured from the light source from the rear. Thus, the light viewed by the driver is merely the level of the light from the rear multiplied by the reflectance of the mirror.

For light levels from the rear which are too low to cause annoyance, the mirror remains at its maximum reflectance as shown in portion 400 of curve 420. The corresponding light level reflected to the driver, portion 400a of curve 420a, is the light level from the rear multiplied by the constant 0.82 (82 percent) high reflectance level of the mirror. At point 421 the light from the rear reaches the glare threshold and the reflectance of the mirror begins to fall. In the configuration illustrated, light from the rear is viewed after one pass through the attenuating layer of the mirror. The result is a ramped portion 401b of the reflectance curve in which the mirror drive circuit toggles between the maximum reflectance drive state and the first level of dimming. The corresponding light level 401ba reflected to the driver falls off with increasing light level. This is because as described in detail in U.S. Pat. No. 4,917,477, the light reflected to the driver makes two passes through the attenuating layer while the light to the sensor makes only one. With increasing light from the rear, the control settles briefly at the first level of dimming as indicated by the short but relatively flat step 401 in the reflectance curve. The corresponding light 401a that the driver sees increases through this range. This sequence is repeated from 401 through 414 for the 14 intermediate reflectance drive levels applied to the mirror element by the system. Finally at 415 the maximum dimming drive level is applied to the mirror element causing it to settle to its minimum reflectance of about 6.5 percent. This is the extent of the variable control range and the light level 415a which the driver sees continues to increase with further increases in the light from the rear.

The result of the above described is as follows:

Between the onset of glare at 421 and the end of the controllable range at 422, the light from the rear has increased approximately 22 fold. The mirror reflectance has decreased approximately 12½ fold over the same interval from 421a to 422a. Stated another way, the light level that the driver sees in the mirror has increased by only 75 percent while the light from the rear has increased by 2200 percent. This relatively small increase in light level is just enough to give the driver some sense of the brightness of the lights behind him or her without adding appreciably to his or her discomfort. The full bright reflectance level, the 14 intermediate levels, and the full dim level correspond, respectively, to the 16 GLARE LEVEL states 0–15 described in the flow diagrams and the accompanying description.

The zig zag pattern caused by the multiple step drive is close enough to the approximating straight line to be of no significant consequence in the operation of the mirror. More or fewer steps or a continuous output may also be used. In practice as few as one intermediate state gives very desirable performance. An important aspect is that the control algorithm should include a shaping means to drive the mirror element to the desired reflectance once the glare value (GLARE VALUE in flow diagrams) is computed. Note the uniform spacing, the nearly uniform increments of the reflectance steps, and the relatively straight line approximation of the zig zag portion of curves 420 and 420a. The loop in subroutine X15 first assigns the appropriate GLARE LEVEL number as a direct function of the measured GLARE VALUE which is calculated in X14 from the processed measured values. Subroutine X7 then uses a second lookup to determine the output duty cycle which will result in the drive voltage required to obtain the desired mirror reflectance for the particular glare control steps determined by the GLARE LEVEL number. This second lookup introduces a substantial nonlinearity since the reflectance of the mirror dement is a markedly nonlinear function of the mirror element voltage. Thus, given a measured glare value, the electronic control system embodying the present invention contains shaping means which translates the measured glare value into a drive signal to the mirror element to establish a reflectance level which is the desired response to the measured glare value.

There are variants of this configuration. For example, if the light from the rear is viewed directly rather than through the layer, the glare value measurement is no longer reduced by the variable attenuation of the mirror element. Thus, the measured glare value used in X15 is much higher at glare levels requiring low reflectance settings. Appropriate increases are made in the glare lookup table values used in X15 to correlate the 15 GLARE LEVEL steps to the measured GLARE VALUE. These increases may be sized to obtain nearly equivalent performance whether or not sensing is done after a pass through the attenuating layer. However, as taught in U.S. Pat. No. 4,917,477, the control quality is compromised more by errors in the control algorithm for the full open loop version than for the preferred embodiment which partially closes the control loop by sensing after one pass through the attenuating layer. The glare lookup table can also be used to change the control objective. For example, it may be desired to hold the level of the light reflected to the driver more nearly constant over the control range of the mirror. This is accomplished by appropriate but relatively small decreases in glare lookup table values. Larger adjustments are needed for the glare lookup values which represent high glare requiring correspondingly low mirror reflectance levels. The second lookup in X7 is used to create the drive voltage needed to establish the desired reflectance level for the mirror. There is programming convenience in separating these two shaping functions and having integral levels of 0 through 15 to represent the desired output drive levels for the mirror. It should, however, be understood that other embodiments may combine these two shaping functions to establish the value which is directly used to control the mirror element as a direct function of the computed glare value.

WINDSHIELD WIPER OPTION

Referring to FIG. 5B, operation of the circuit with the WIPER input at L06A and the WIPERL OUTPUT at L62 is identical to the corresponding circuit with the REV input at L06 and the REVL output at L08. The WIPER input is attached to a line which is pulled to a positive voltage when the windshield wipers are in operation and is allowed to go to the ground potential when the windshield wipers are not in operation. The microcontroller in FIG. 5C senses that the windshield wipers are in operation by detecting the low level input at the L4 WIPERL input pin. The microcontroller responds by waiting for eight seconds and then turning the headlamps on until the automobile ignition is turned off or the windshield wipers are turned off. The eight second delay is included so that the normal windshield wash cycle does not cause the headlamps to come on.

This delay feature is optional and the time period for a particular design may be shorter or longer depending on the duration of the windshield wash cycle for the car. Another more costly alternative is to have a special output from the wiper switch to the WIPER input which remains low when the windshield is only being washed. The output from the wiper switch should remain high when the windshield is being washed while the wipers are on. Otherwise, the lights would be turned off while washing the windshield even during a rain. In applications where the wiper signal is negated by washing, the microcontroller program can be modified to include a turn off delay which extends the time that the lights are kept on after removal of the wiper on signal. The duration of this time extension must be long enough to keep the lights on during a normal windshield wash cycle.

The windshield wiper option as shown is mutually exclusive with the LAMP STATUS LED option. This was done because of the unavailability of another input pin with the microcontroller chosen and because there was not a need to have both options in the same embodiment of the application. It is a straightforward matter to use a microcontroller with more inputs, combine input functions, or delete another option in order to include both the wiper and status indicator options in the same control.

The following are flow chart parameters for electronic control systems embodying the present invention:

| FLOW CHART PARAMETERS | |
|---|---|
| 8 BIT REGISTERS | |
| AUTOLAMP COUNTER AUTOC | Counter used for timing of the on/off AUTOLAMP RELAY OUTPUT. Incremented every 200 ms. Is compared with AUTOLAMP TURN ON TIME and AUTOLAMP TURN OFF TIME. |
| AUTOLAMP TURN OFF TIME TROFF | [constant] = 174 (35 seconds) Delay time for lamps to turn off. Compared with AUTOLAMP COUNTER. |
| AUTOLAMP TURN ON TIME TRON | [constant] = 99 (20 seconds) Delay time for lamps to turn on. Compared with AUTOLAMP COUNTER. |
| AUTOLOAD REGISTER TAUHI | Special register used in producing the duty cycling of the mirror element. It is loaded with MIRROR ON TIME and MIRROR OFF TIME to produce the delay. When delay is complete then the INTERRUPT PENDING is set. |
| AVERAGE REGISTER (16 BIT) CHAN0L and CHAN0H | Updated every 100 ms. Used in producing FRONT AVERAGE. |
| AVERAGE REGISTER (8 BIT) CHAN0H | High byte of (16 bit) AVERAGE REGISTER. This value is loaded into FRONT AVERAGE. |
| CAL PULSE DURATION COUNTER register A | Contains count equal to how long CALIBRATION SENSE INPUT is low. Determines what cal mode to enter into depending on counts. (1 count = 500 us). |
| DARK DELAY TDDEF | [constant] = 19 (30 seconds) Used for Manual dark delay. loaded in DARK HIGH TIMING COUNTER then decremented. |
| DARK HIGH TIMING COUNTER DARKCH | MSD counter used in counting manual dark duration. Decrements every 1.6 seconds. Is preloaded with DARK DELAY duration. When = 0 then manual dark is complete. |
| DARK LOW TIMING COUNTER DARKCL | LSD counter used in counting manual dark duration. Overflows every 1.6 seconds. Also used in FAST UPDATE MODE enabling. |
| DAY DETECT VALUE MDAYDT | Threshold value used to inhibit the mirror from dimming during mirror auto operation. Compared with FRONT CORRECTED VALUE to determine state of MIRROR DAY DETECT. |
| FAST COUNTER FASTC | Increments each time REVERSE goes false. Reset every 1.6 seconds. It is checked every 1.6 seconds for >4 to enter into FAST UPDATE MODE to allow fast update of AUTOLAMP RELAY OUTPUT. |
| FRONT AVERAGE FRNTAVE | Average of FRONT CORRECTED VALUE. |
| FRONT CALIBRATION EEprom addr 5 | Equal to FRONT SENSOR VALUE at .1 FC. |
| FRONT CALIBRATION CONSTANT FRONTOFF | [constant] = 86 This value is the ideal value with .1 FC on front sensor. |
| FRONT CORRECTED VALUE CHAN0N (when PASS = 0, after offset) | Equal to FRONT OFFSET VALUE plus FRONT SENSOR VALUE. |
| FRONT LOW LIMIT FRNTLL | [constant] = 3 equivalent to approx .2 lux. Lowest count accepted for FRONT SENSOR VALUE. |
| FRONT NEGATIVE RAMP CHAN0N | Timing count accumulated during the discharge of the R/C ramp circuit. When compare occurs with FRONT SENSOR INPUT the timing count is then saved in this register. |
| FRONT OFFSET VALUE | Calibration value used to offset FRONT |

-continued

| FLOW CHART PARAMETERS | |
|---|---|
| FRONTC | SENSOR VALUE. Ideal count = 0. |
| FRONT POSITIVE RAMP<br>CHAN0P | Timing count accumulated during the charge of the R/C ramp circuit. When compare occurs with FRONT SENSOR INPUT the timing count is then saved in this register. |
| FRONT SENSOR VALUE<br>CHAN0N (when PASS = 0) | Equal to FRONT SENSOR NEG RAMP time minus FRONT SENSOR POS RAMP time. |
| GLARE COUNTER<br>GLARE (before glare lookup) | Used in performing lookup for 16 levels of glare. |
| GLARE LEVEL<br>GLARE (after glare lookup) | The level of glare (0–15) that results from GLARE LOOKUP. |
| GLARE LOOKUP<br>LVL7 | Contains looked up value of GLARE COUNTER. |
| GLARE VALUE<br>GLAREV | Actual counts of glare. (REAR CORRECTED VALUE minus FRONT AVERAGE). Proportional to logarithm of corrected glare level divided by logarithmically weighted time average of front value. |
| LAMP DELAY COUNTER<br>LAMPDEL | Used for counting how long to hold headlamps on after IGNITION is off. Compared with POT DELAY for duration. |
| LAMP DIVIDER COUNTER<br>LAMPON | Modulo 7 counter divider for lamp delay counter. Overflows every 700 ms, then increments LAMP DELAY COUNTER. |
| LAMPS OFF<br>HYSTOFF | Value for which lamps turn off. Compared with SKY SENSOR VALUE. |
| LAMPS ON<br>HYSTON | Value for which lamps turn on. Compared with SKY SENSOR VALUE. |
| LED TIMING COUNTER<br>LEDCTR | Used to count how long the MIRROR STATUS LED is on. Minimum time = 1.5 seconds. |
| MAX ON TIME<br>DUTYM | [constant] = 39<br>Total count time period in duty cycle output applied to mirror element. |
| MIRROR OFF TIME<br>DUTYL | Counts of off time duty cycled to MIRROR ELEMENT OUTPUT. This is equal to MAX ON TIME minus MIRROR ON TIME. |
| MIRROR ON TIME<br>DUTYH | Counts of on time duty cycled to MIRROR ELEMENT OUTPUT. This is a lookup value derived from what level of dimming (0–15) to apply to element. |
| PASS<br>CHANSTAT | Counter 0–3. Indicates what measuring pass that the R/C ramp is at. Each pass is 25 ms duration.<br>:0 zero volts to R/C<br>: make sure cap at zero.<br>:1 high to R/C (charging)<br>: positive ramp compare mode.<br>:2 high to R/C<br>: make sure cap at high.<br>:3 low to R/C (discharging)<br>: negative ramp compare mode. |
| POT DELAY<br>POTDEL | Value of autolamp relay delay as looked up using POT VALUE. This is a linearized lookup of the position of the pot. |
| POT NEGATIVE RAMP<br>CHAN1N | Timing count accumulated during the discharge of the R/C ramp circuit. When compare occurs with POT SENSOR INPUT the timing count is then saved in this register. |
| POT POSITIVE RAMP<br>CHAN1P | Timing count accumulated during the charge of the R/C ramp circuit. When compare occurs with POT SENSOR INPUT the timing count is then saved in this register. |
| POT VALUE<br>CHAN1N (when PASS = 0) | Equal to POT NEGATIVE RAMP time minus POT POSITIVE RAMP time. |
| RAMP COUNTER<br>register X | Used in accumulating counts during analog measuring sequence of external sensors. Incremented every 72.5 us. for a duration of 9.28 ms. Max count = 127. Time constant of external R/C = 2.667 ms @ 3.48 time constants. |
| REAR CALIBRATION<br>EEprom addr 6 | Equal to REAR SENSOR VALUE at .035 FC. |
| REAR CALIBRATION CONSTANT<br>REAROFF | [constant] = 130<br>This value is the ideal value with .035 FC on rear sensor. |
| REAR CORRECTED VALUE<br>CHAN3N (when PASS = 0, after offset) | Equal to REAR OFFSET VALUE plus REAR SENSOR VALUE. |
| REAR NEGATIVE RAMP<br>CHAN3N | Timing count accumulated during the discharge of the R/C ramp circuit. When compare occurs with REAR SENSOR INPUT the timing count is then saved in this register. |

-continued

FLOW CHART PARAMETERS

| | |
|---|---|
| REAR OFFSET VALUE REARC | Calibration value used to offset REAR SENSOR VALUE. Ideal count = 0. |
| REAR POSITIVE RAMP CHAN3P | Timing count accumulated during the charge of the R/C ramp circuit. When compare occurs with REAR SENSOR INPUT the timing count is then saved in this register. |
| REAR SENSOR VALUE CHAN3N (when PASS = 0) | Equal to REAR SENSOR NEG RAMP time minus REAR SENSOR POS RAMP time. |
| REFLECTANCE LEVEL REFL | Actual mirror glare level (0–15) that is applied to mirror element to control mirror element drive voltage and thus element reflectance via duty cycling. |
| SKY NEGATIVE RAMP CHAN2N | Timing count accumulated during the discharge of the R/C ramp circuit. When compare occurs with SKY SENSOR INPUT the timing count is then saved in this register. |
| SKY POSITIVE RAMP CHAN2P | Timing count accumulated during the charge of the R/C ramp circuit. When compare occurs with SKY SENSOR INPUT the timing count is then saved in this register. |
| SKY SENSOR VALUE CHAN2N (when PASS = 0) | Equal to SKY SENSOR NEG RAMP time minus SKY SENSOR POS RAMP time. |
| WIPER DELAY COUNTER | Used for counting how long the WIPERINPUT is on. After duration of 8 seconds then the AUTOLAMP RELAY OUTPUT is activated. |

DIRECT INPUTS

| | |
|---|---|
| AUTOLAMP SWITCH INPUT | Pin 16: Input/Output line used to determine if the autolamp switch is depressed. |
| CALIBRATION SENSE INPUT | Pin 10: Input to determine to enter into a calibration mode. |
| CURRENT SENSE INPUT | Pin 09: Input to determine if the relay output is drawing excessive current. |
| FRONT SENSOR INPUT | Pin 11: Input/Output line used to determine when the front sensor compares with the R/C RAMP output. |
| IGNITION INPUT | Pin 07: Input to determine state of the ignition signal. |
| MIRROR AUTO SWITCH INPUT | Pin 18: Input/Output line used to determine if the mirror auto switch is depressed. |
| MIRROR DARK SWITCH INPUT | Pin 17: Input/Output line used to determine if the mirror dark switch is depressed. |
| POT INPUT | Pin 12: Input/Output line used to determine when the pot position voltage compares with the R/C RAMP output. |
| REAR SENSOR INPUT | Pin 14: Input/Output line used to determine when the rear sensor compares with the R/C RAMP output. |
| REVERSE INPUT | Pin 08: Input to determine state of the reverse signal. |
| SKY SENSOR INPUT | Pin 13: Input/Output line used to determine when the autolamp sky sensor compares with the R/C RAMP output. |
| WIPERS INPUT | Pin 15: Input/Output line used to determine if the windshield wipers are switched on. This is selected with an option jumper. If selected then AUTOLAMP STATUS LED jumper must be omitted. |

DIRECT OUTPUTS

| | |
|---|---|
| AUTOLAMP LED | Pin 16: Input/Output used to indicate via an LED when the autolamp mode is enabled. |
| AUTOLAMP RELAY OUTPUT | Pin 27: Input/Output used to drive the relay output to control headlamps/taillamps. |
| AUTOLAMP STATUS LED | Pin 15: Input/Output used to indicate via an LED when the external autolamp relay is on. This is omitted if wiper option jumper is made. |
| MIRROR AUTO LED | Pin 18: Input/Output used to indicate via an LED when the auto mirror is enabled. |
| MIRROR DARK LED | Pin 17: Input/Output used to indicate via an LED when the mirror is in the manual mirror dark mode. |
| MIRROR ELEMENT OUTPUT | Pin 28: Output used to control the mirror element voltage from min/max reflectance using duty cycling. |
| MIRROR SHUNT OUTPUT | Pin 21: Output used to short the mirror element and increase the speed by which it returns to the bright state. |
| MIRROR STATUS LED | Pin 19: Output used to indicate via an LED when the mirror element is in a dim state. |
| RAMP OUTPUT | Pin 25: Input/Output line used to create the R/C RAMP. |

FLOW CHART PARAMETERS

| | |
|---|---|
| SENSITIVITY OUTPUT | Pin 20: Input/Output used to put the mirror circuit into a hi/low sensitivity mode. |

STATUS BITS

| | |
|---|---|
| AUTOLAMP<br>LAMPAUTO (OUT) | Autolamp mode enabled. |
| AUTOLAMP DAY DETECT<br>DAYTIME (FLAG1) | Indicates that it is daytime, (lamps should be off) according to the autolamp function. |
| AUTOLAMP KEY PRESSED<br>LAMPAUTO (KEYDWN) | Indicates autolamp key was pressed. Sensed every 25 ms. |
| AUTOLAMP KEYDOWN<br>LAMPAUTO (REG2) | Used in processing autolamp key. Indicates key is actively down. |
| BYPASS RESET<br>BYRES (FLAG1) | Used in controlling the mirror status led for hystersis and minimum pulse duration. |
| CURRENT SENSE<br>CURSEN (IN) | Current sense, input sensed every 25 ms. |
| ELEMENT TOGGLE MODE<br>TEDG (CNTROL) | When set indicates that the element is in an intermediate, duty cycling mode active. (not full dim or full bright). |
| FAST UPDATE MODE<br>FAST (FLAG1) | Indicates that the mirror portion is in a test mode. This mode bypasses the normal sky sensor delays to turn on the external lamp relay. If the reverse line toggles at least 5 times in a period of 1.6 seconds, then this mode is activated. |
| IGNITION<br>IGNITION (IN) | Ignition input, sensed every 25 ms. |
| INTERRUPT PENDING<br>TPND (PSW) | Indicates that an INTERRUPT has occurred and needs to be acknowledged. |
| MIRROR AUTO<br>MIRAUTO (OUT) | Mirror auto mode enabled. |
| MIRROR AUTO KEY PRESSED<br>MIRAUTO (KEYDWN) | Indicates mirror auto key was pressed. Sensed every 25 ms. |
| MIRROR AUTO KEYDOWN<br>MIRAUTO (REG2) | Used in processing mirror auto key. Indicates key is actively down. |
| MIRROR DARK<br>MIRDARK (OUT) | Mirror to be dark. |
| MIRROR DARK KEY PRESSED<br>MIRDARK (KEYDWN) | Indicates mirror dark key was pressed. Sensed every 25 ms. |
| MIRROR DARK KEYDOWN<br>MIRDARK (REG2) | Used in processing mirror dark key. Indicates key is actively down. |
| MIRROR DAY DETECT<br>DAYMIR (FLAG1) | Indicates that it is daytime according to mirror function. |
| MIRROR DUT STATE<br>0 (PHASE) | Last state of duty cycled output. 0: output was off 1: output was on Used in duty cycling of mirror control output to achieve intermediate levels of reflectance. |
| MIRROR SENSITIVITY<br>MIRSEN (OUT) | Sensitivity of mirror. 0: low 1: high |
| MIRROR SET MODE<br>SETMD (FLAG1) | Mirror in a mode to set the sensitivity to hi/low. |
| POWER JUST ON<br>PWRON (FLAG1) | Power on occurred or jump to reset. Used to initially set up parameters in subroutines. |
| RELAY ON<br>LAMPON (OUT) | External lamp relay on. |
| REVERSE<br>REVERSE (IN) | Reverse input, sensed every 25 ms. |
| REVERSE WAS 1<br>REVCHK (FLAG1) | Reverse input was previously true. Used to go into fast sky sensor update mode for testing. Also used when reverse released to take sky sensor reading and turn lights off when leaving garage. |
| WIPERS | Indicates that the windshield wipers are on. |

An identification of and/or typical values for the components of the system which are described hereinabove are as follows:

| | |
|---|---|
| C1 | 0.1 UFD |
| C2 | 0.1 UFD |
| C2A | 0.1 UFD |
| C3 | 22 UFD |
| C4 | 0.01 UFD |
| C5 | 100 UFD |
| C6 | 0.1 UFD |
| C7 | 100 PFD |
| C8 | 0.022 UFD |
| C9 | 0.022 UFD |
| C10 | 0.022 UFD |
| C11 | 0.1 UFD |
| C12 | 0.1 UFD |
| C13 | 100 UFD |
| C14 | 0.1 UFD POLYESTER |
| C15 | 3.3 UFD |
| C16 | 47 UFD |
| C17 | 0.022 UFD |
| C18 | 0.1 UFD |
| C20 | 0.022 UFD |
| C22 | 270 PFD |

-continued

| | |
|---|---|
| C23 | 270 PFD |
| C24 | 270 PFD |
| C25 | 270 PFD |
| CR1 | 4.0 Mhz Ceramic Resonator |
| D1 | 1N4148 Diode |
| D2 | 1N4148 Diode |
| D3 | 1N4148 Diode |
| D3A | 1N4148 Diode |
| D5 | 1N4004 Diode |
| D6 | 18V 1N4746A Zener Diode |
| D7 | 1N4004 Diode |
| D8 | 1N4004 Diode |
| D9 | 1N4004 Diode |
| D10 | 1N4148 Diode |
| D11 | 1N4148 Diode |
| D12 | 6.2V 1N4735A Zener Diode |
| D13 | 1N4148 Diode |
| D14 | Photodiode |
| D15 | LED |
| D16 | LED |
| D17 | LED |
| D18 | 1N4004 Diode |
| D19 | 1N4004 Diode |
| D20 | 1N4004 Diode |
| D21 | 1N4148 Diode |
| D25 | 1N4148 Diode |
| D26 | 9.1V 1N4739A Zener Diode |
| D27 | 1N4004 Diode |
| D28 | LED |
| D29 | LED |
| L1 | Ferrite Bead |
| Q1 | MPSA06 NPN |
| Q2 | MPSA06 NPN |
| Q2A | MPSA06 NPN |
| Q3 | 2N3906 PNP |
| Q4 | MPSA06 NPN |
| Q5 | PN2222A NPN |
| Q6 | 2N3904 NPN |
| Q7 | PN2222A NPN |
| Q8 | TIP30B PNP |
| Q9 | MPSA56 PNP |
| Q10 | 2N3906 PNP |
| Q11 | MPSA06 NPN |
| Q13 | 2N3906 PNP |
| Q14 | MPSA56 PNP |
| Q15 | 2N3904 NPN |
| Q16 | 2SC3852A Sanken Super Beta |
| Q19 | 2N3904 NPN |
| Q21 | MPSA06 NPN |
| Q22 | 2N3904 NPN |
| R1 | 100K ohm |
| R2 | 22K ohm |
| R3 | 47K ohm |
| R4 | 100K ohm |
| R4A | 100K ohm |
| R5 | 22K ohm |
| R5A | 22K ohm |
| R6 | 47K ohm |
| R6A | 47K ohm |
| R7 | 33K ohm |
| R8 | 82K ohm |
| R9 | 4.7K ohm |
| R10 | 2K ohm pot |
| R11 | 1.5K ohm |
| R12 | 10K ohm |
| R13 | 10K ohm |
| R14 | 3.9 ohm |
| R15 | 100 ohm |
| R16 | 100 ohm |
| R17 | 2.2K ohm |
| R18 | 470 ohm |
| R19 | 1.8 ohm |
| R20 | 3.9 ohm |
| R21 | 2.2K ohm |
| R22 | 10K ohm |
| R23 | 270 ohm |
| R24 | 820 ohm |
| R25 | 1.2K ohm |
| R26 | 100K ohm |
| R27 | 270K ohm |
| R28 | 1K ohm |
| R29 | 4.7K ohm |

-continued

| | |
|---|---|
| R30 | 150 ohm |
| R31 | 26.7K ohm |
| R32 | 330K ohm |
| R33 | Back Photocell |
| R37 | 15K ohm |
| R38 | 33K ohm |
| R39 | 27K ohm |
| R40 | 27K ohm |
| R41 | Front Photocell |
| R42 | 2.7M |
| R43 | 100K ohm pot |
| R44 | 1K ohm |
| R45 | 1K ohm |
| R46 | 1K ohm |
| R47 | 15K ohm |
| R48 | 6.8K ohm |
| R49 | 47K ohm |
| R50 | 470 ohm |
| R51 | 0.68 ohm |
| R52 | 47K ohm |
| R54 | 2.2K ohm |
| R55 | 10K ohm |
| R56 | 1M ohm |
| R57 | 470 ohm |
| R58 | 33K ohm |
| R59 | 68K ohm |
| R61 | 1K ohm |
| R63 | 33K ohm |
| R64 | 68K ohm |
| R65 | 4.7K ohm |
| R66 | 470 ohm |
| R67 | 820 ohm |
| R68 | 1K ohm |
| R69 | 1K ohm |
| S1 | Momentary Switch |
| S2 | Momentary Switch |
| S3 | Momentary Switch |
| U1 | LM2901N Quad Comparator |
| U2 | COP840C Microcontroller - National |
| U3 | 93C46 EE Memory |
| U4 | TLC271P Operational Amplifier |

It will be understood that these values and/or descriptions may be varied depending upon the particular application of the principles of the present invention.

While preferred embodiments of the invention have been illustrated and described, it will be understood that various changes and modifications may be made without departing from the spirit of the invention.

What is claimed is:

1. In an electronic control system for controlling automotive vehicle vision related equipment, said vision related equipment including a rearview mirror comprising an electrochromic variable reflectance member the reflectivity of which varies as a function of electrical signal levels applied thereto, said system including microcontroller means, ambient light sensing means effective to sense ambient light and generate a corresponding analog electrical signal indicative of the ambient light level, glare sensing means effective to sense glare causing light and generate a corresponding analog electrical signal indicative of the glare causing light level, means digitizing each of the analog signals and converting each of the digitized analog signals to a corresponding logarithmic signal representation which is accessible to said microcontroller means, means for supplying electrical power to said system, and means electrically connected to said microcontroller means and operable to apply an electrical control signal to said electrochromic variable reflectance member to change the reflectance thereof as a function of the logarithmic signal of the sensed ambient light level and the logarithmic signal of the sensed glare causing light level.

2. The combination as set forth in claim 1, said vision related equipment including a second rearview mirror comprising an electrochromic variable reflectance member the reflectivity of which varies as a function of the electrical signal levels applied thereto, and means electrically connecting said electrochromic variable reflectance members of said rearview mirrors whereby said variable reflectance members change reflectivity substantially simultaneously under the control of said microcontroller means.

3. The combination as set forth in claim 1, said vision related equipment including an electrically energizable vehicle headlamp, said system including sky light sensing means effective to sense sky light and generate a corresponding electric signal indicative of the sky light level, means connecting said sky light sensing means to said microcontroller means, and means electrically connected to said microcontroller means and operable to effect energization of said vehicle headlamp as a function of the sensed sky light level.

4. The combination as set forth in claim 3, said vision related equipment including a windshield wiper, means for electrically actuating said windshield wiper, and means electrically connected to said microcontroller means and operable to effect energization of said vehicle headlamp when said windshield wiper is actuated.

5. An electronic control system for controlling automotive vehicle vision related equipment, said vision related equipment including an electrochromic mirror having a full reflectance mode and a partial reflectance mode and the reflectivity of which varies as a function of an electrical control signal applied thereto, and an electrically energizable vehicle headlamp, said system including a microcontroller, forwardly facing sensor means effective to detect light forward of the vehicle and generate a corresponding analog forward electrical signal indicative of the forward light level, backwardly facing sensing means effective to detect light rearward of the vehicle and generate a corresponding analog rearward electrical signal indicative of the rearward light level, an upwardly facing sky light sensor means effective signal indicative of the rearward light level, an upwardly facing sky light sensor means effective to sense sky light and generate a corresponding electrical signal indicative of the sky light level, means converting the analog electrical signal indicative of the forward light level and the analog electrical signal indicative of the rearward light level to corresponding logarithmic signals, means connecting the logarithmic signals indicative of the forward light level and the rearward light level to said microcontroller, means including an unswitched power supply path and an ignition switched power supply path for applying electrical power to said system, means electrically connected to said microcontroller and operable to apply an electrical control signal to said electrochromic mirror to change the reflectivity thereof as a function of the logarithmic signal of the sensed forward light level and the logarithmic signal of the sensed rearward light level, and means electrically connected to said microcontroller and operable to effect energization of said vehicle headlamp as a function of the sensed sky light level.

6. The combination as set forth in claim 5 including means for delaying the energization of said vehicle headlamp for a predetermined period of time.

7. The combination as set forth in claim 5 including means for de-energizing said headlamp at a predetermined time after the vehicle ignition switch as been turned off.

8. The combination as set forth in claim 5 including means effective to de-energize said vehicle headlamp without substantial delay when the vehicle is taken from reverse gear and the headlamp day condition is simultaneously sensed.

9. The combination as set forth in claim 5 including a second electrochromic mirror, and means electrically connecting said electrochromic mirrors whereby said electrochromic mirrors change reflectivity substantially simultaneously.

10. The combination as set forth in claim 9, one of said electrochromic mirrors being disposed in the interior of the vehicle, the other of said electrochromic mirrors being disposed on the exterior of the vehicle.

11. The combination as set forth in claim 10 including means effective to maintain each of said electrochromic mirrors in its full reflectance mode when said vehicle is in reverse gear.

12. The combination as set forth in claim 5, said vision related equipment including an electrically actuatable windshield wiper, said system including means electrically connected to said microcontroller and operable to effect energization of said vehicle headlamp when said windshield wiper is actuated.

13. The combination as set forth in claim 12 including time delay means effective to delay energization of said vehicle headlamp for a predetermined period of time following actuation of said windshield wiper.

14. The combination as set forth in claim 13 including means for de-energizing the vehicle headlamp as a function of the sensed sky light level and deactivation of the windshield wiper.

15. The combination as set forth in claim 5, said system including a vehicle ignition switch, and means for resetting said microcontroller when said vehicle ignition switch is turned on.

16. The combination as set forth in claim 15 including means effective to prevent deenergization of said headlamp when said microcontroller is reset.

17. The combination as set forth in claim 5, including means for de-energizing said headlamp as a function of the sensed sky light level.

* * * * *